(12) United States Patent
Sirat et al.

(10) Patent No.: US 11,921,042 B2
(45) Date of Patent: Mar. 5, 2024

(54) OPTICAL MEASURING DEVICE AND PROCESS

(71) Applicant: Bioaxial SAS, Paris (FR)

(72) Inventors: Gabriel Y Sirat, Paris (FR); Lionel Moisan, Paris (FR)

(73) Assignee: Bioaxial SAS, Paris (FR)

( * ) Notice: Subject to any disclaimer, the term of this patent is extended or adjusted under 35 U.S.C. 154(b) by 315 days.

(21) Appl. No.: 17/176,528

(22) Filed: Feb. 16, 2021

(65) Prior Publication Data

US 2021/0208073 A1 Jul. 8, 2021

Related U.S. Application Data

(62) Division of application No. 15/533,725, filed as application No. PCT/FR2015/000224 on Dec. 9, 2015, now Pat. No. 10,921,255.

(30) Foreign Application Priority Data

Dec. 9, 2014 (FR) .................................. 14/02798
Feb. 3, 2015 (FR) .................................. 15/00204
(Continued)

(51) Int. Cl.
G01N 21/64 (2006.01)
G01N 21/63 (2006.01)
G02B 21/00 (2006.01)

(52) U.S. Cl.
CPC ....... G01N 21/6456 (2013.01); G01N 21/636 (2013.01); G01N 21/6458 (2013.01);
(Continued)

(58) Field of Classification Search
None
See application file for complete search history.

(56) References Cited

U.S. PATENT DOCUMENTS 7,324,273 B2   1/2008  Gweon et al.
7,541,600 B2   6/2009  Neuhauser et al.
(Continued)

FOREIGN PATENT DOCUMENTS

DE   20 2009 007 250   12/2009
WO   WO 2009/066253    5/2009
(Continued)

OTHER PUBLICATIONS

Fallet, Clément, et al. "Conical diffraction as a versatile building block to implement new imaging modalities for superresolution in fluorescence microscopy." Nanoimaging and Nanospectroscopy II. vol. 9169. SPIE, 2014 (Year: 2014).*
Abdolvand et al., "Conical refraction Nd:KGd(WO$_4$)$_2$ laser," *Opt. Exp.*, vol. 18, No. 3, pp. 2753-2759 (Feb. 2010).
Berry et al., "Conical diffraction: observations and theory," *Proc. R. Soc. A*, vol. 462, pp. 1629-1642 (Feb. 2006).
(Continued)

*Primary Examiner* — Luke D Ratcliffe
(74) *Attorney, Agent, or Firm* — Sunstein LLP

(57) ABSTRACT

An achromatic 3D STED measuring optical process and optical method, based on a conical diffraction effect or an effect of propagation of light in uniaxial crystals, including a cascade of at least two uniaxial or conical diffraction crystals creating, from a laser source, all of the light propagating along substantially the same optical path, from the output of an optical bank to the objective of a microscope. A spatial position of at least one luminous nano-emitter, structured object or a continuous distribution in a sample is determined.
Reconstruction of the sample and its spatial and/or temporal and/or spectral properties is treated as an inverse Bayesian problem leading to the definition of an a posteriori distribution, and a posteriori relationship combining, by virtue of the Bayes law, the probabilistic formulation of a noise model, and possible priors on a distribution of light created in the sample by projection.

16 Claims, 15 Drawing Sheets

(30) Foreign Application Priority Data

| Feb. 9, 2015 | (FR) | 15/00241 |
|---|---|---|
| Apr. 15, 2015 | (FR) | 15/00760 |
| Apr. 15, 2015 | (FR) | 15/00761 |
| Jun. 9, 2015 | (FR) | 15/01183 |
| Aug. 4, 2015 | (FR) | 15/70017 |

(52) U.S. Cl.
CPC ......... *G02B 21/00* (2013.01); *G02B 21/0056* (2013.01); *G02B 21/0072* (2013.01); *G02B 21/0076* (2013.01); *G02B 21/008* (2013.01)

(56) References Cited

U.S. PATENT DOCUMENTS

| 8,084,754 | B2 | 12/2011 | Hell et al. |
| 8,514,685 | B2 | 8/2013 | Sirat |
| 8,542,712 | B2 | 9/2013 | Rafailov et al. |
| 9,250,185 | B2 | 2/2016 | Sirat |
| 10,247,931 | B2 * | 4/2019 | Sirat ..................... G02B 21/16 |
| 2002/0141052 | A1 | 10/2002 | Iketaki |
| 2003/0137645 | A1 | 7/2003 | Fluckiger |
| 2003/0210405 | A1 | 11/2003 | Feldman |
| 2004/0212799 | A1 | 10/2004 | Hell |
| 2007/0070496 | A1 | 3/2007 | Gweon et al. |
| 2008/0068588 | A1 | 3/2008 | Hess et al. |
| 2009/0168613 | A1 | 7/2009 | Sirat |
| 2009/0242798 | A1 | 10/2009 | Bewersdorf et al. |
| 2011/0249866 | A1 * | 10/2011 | Piestun ..................... G06T 7/77 382/103 |
| 2012/0104279 | A1 | 5/2012 | Reuss et al. |
| 2012/0223061 | A1 | 9/2012 | Atsumi et al. |
| 2013/0176574 | A1 | 7/2013 | Sirat |
| 2014/0145093 | A1 | 5/2014 | Hendriks et al. |
| 2014/0347723 | A1 | 11/2014 | Rafailov et al. |

FOREIGN PATENT DOCUMENTS

| WO | WO 2010/133678 | 11/2010 |
| WO | WO 2011/086519 | 7/2011 |

OTHER PUBLICATIONS

Berry, "Conical diffraction from an N-crystal cascade," *J. Opt.*, vol. 12, 9 pages (2010).
Boruah, "Lateral resolution enhancement in confocal microscopy by vectorial aperture engineering," *Appl. Optics*, vol. 49, No. 4, pp. 701-707 (Feb. 2010).
Haeberlé et al., "Saturated structured confocal microscopy with theoretically unlimited resolution," *Opt. Comm.*, vol. 282, pp. 3657-3664 (2009).
Hell, "Far-Field Optical Nanoscopy," *Science*, vol. 316, pp. 1153-1158 (May 2007).
Keller et al., "Efficient flourescence inhibition patterns for RESOLFT microscopy," *Opt. Exp.*, vol. 15, No. 6, pp. 3361-3371 (Mar. 2007).
Lau et al., "STED super-resolution microscopy in *Drosophia* tissue and in mammalia cells", *Proceeding of SPIE*, Reports Markers, Dyes, Nanoparticles, and Molecular Probes for Biomedical Applications III; 9pp. (Feb. 11, 2011).
Lunney et al., "The ins and outs of conical refraction," *Europhysics News*, vol. 37, No. 3, pp. 26-29 (2006).
Oron et al., "The formation of laser beams with pure azimuthal or radial polarization," *Applied Physics Lett.*, vol. 77, No. 21, pp. 3322-3324 (Nov. 2000).
Peet, "Biaxial crystal as a versatile mode converter," *J. Opt.*, vol. 12, pp. 1-4 (2010).
Phelan et al., "Conical diffraction and Bessel beam formation with a high optical quality biaxial crystal," *Opt. Exp.*, vol. 17, No. 15, pp. 12891-12899 (Jul. 2009).
Vlokh et al., "Appearance of Optical Vortex at Conical Refraction. Examples of $NaNO_2$ and $YFeO_3$ Crystals," *Ukr. J. Phys. Opt.*, vol. 4, No. 2, pp. 90-93 (Jan. 2003).
Zhang, "Generation of three-dimensional dark spots with a perfect light shell with a radially polarized Laguerre-Gaussian beam," *Applied Optics*, vol. 49, No. 32, pp. 6217-6223 (Nov. 2010).
Züchner, et al., "Light Microscopy with Doughnut Modes: A Concept to Detect, Characterize, and Manipulate Individual Nanoobjects," *Angew. Chem. Int. Ed.*, vol. 50, pp. 5274-5293 (2011).

\* cited by examiner

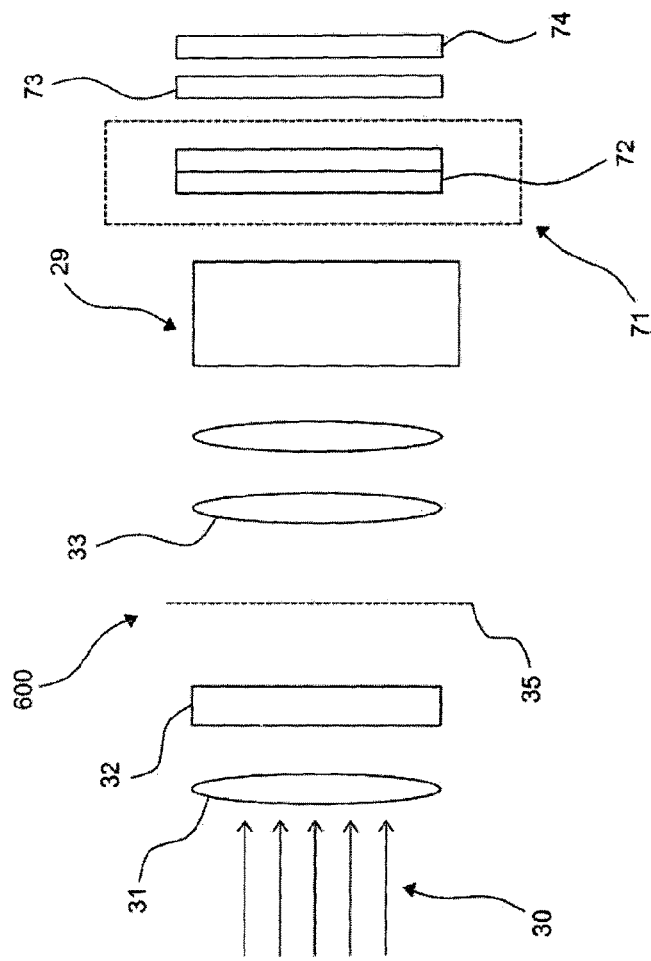
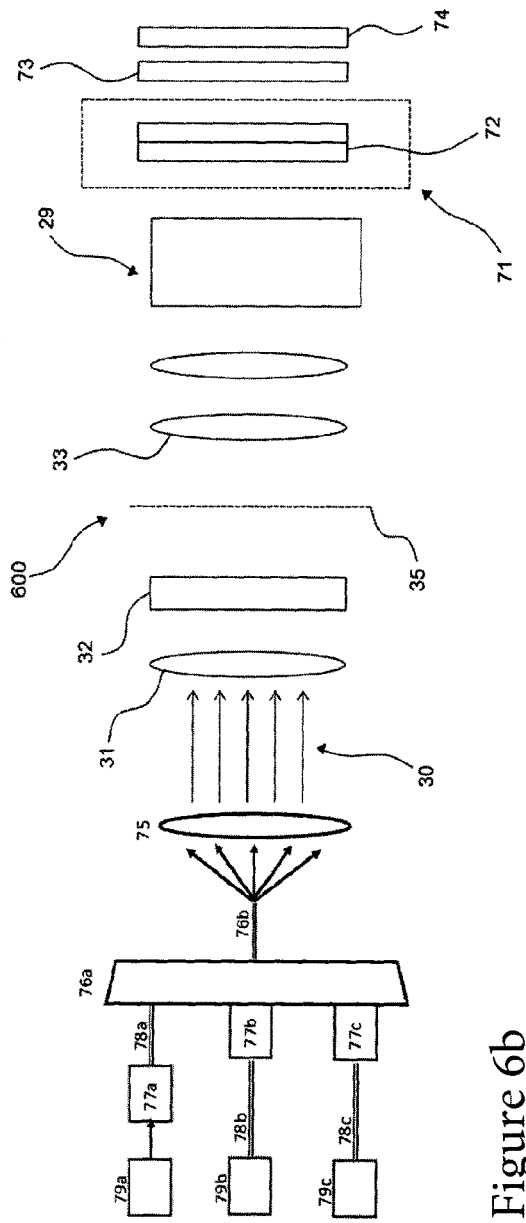
Figure 6a
Figure 6b

OPTICAL MEASURING DEVICE AND PROCESS

CROSS-REFERENCE TO RELATED APPLICATIONS

The present application is a divisional application of and claims priority to U.S. patent application Ser. No. 15/533,725, filed Jun. 7, 2017 and issuing as U.S. Pat. No. 10,921,255 on Feb. 16, 2021, which is a U.S. National Stage Application under 35 U.S.C. § 371 of International Application No. PCT/FR2015/000224, filed Dec. 9, 2015, which claims the benefit of the following applications filed in France: 14/02798, filed Dec. 9, 2014; 15/00204, filed Feb. 3, 2015; 15/00241, filed Feb. 9, 2015; 15/00760, filed Apr. 15, 2015; 15/00761, filed Apr. 15, 2015; 15/01183, filed Jun. 9, 2015; and 15/70017, filed Aug. 4, 2015. Each of the foregoing applications is hereby incorporated herein by reference in its entirety.

INTRODUCTION

The present invention relates to an optical measuring method and device. It applies to all fields of imaging, in particular, though not limited to, the field of Microscopy, including, but not limited to, the fields of Biology, Medicine, Pharmacy, Semiconductors, materials study, Metrology, control, measurement and observation and to all processes for acquisition of information from optical observations, in the macroscopic or microscopic field.

Many definitions, used for all this invention, are combined into a later chapter: "Definitions and technical additions".

Microscopy

An optical microscope is an instrument generally used to view, analyse or measure objects too small for the naked eye. Refer to FIG. 1, which shows an illustration of the paradigm of Microscopy, 100.

Optical microscopes including illumination, by a light source, not shown, using a microscope, 10, of a biological or non-biological sample, 11, and the time-dependent measurement, using either visual observation or a detection module 12, of the light emitted, re-emitted, diffused or reflected or transmitted by the sample. In Biology, the sample comprises a single—or a plurality—of different biological entities, 13 and 14, positioned at different positions. Examples of such objects are, among others, a cell, a virus, a protein or a DNA fragment. In artificial industrial vision the sample can be, for example, a semi-conductor element.

Microscopy is segmented into different modalities having different characteristics and purposes. Many descriptions of the different modalities, their characteristics and their advantages exist extensively in the literature and are found for example on the company web sites of Zeiss, Leica, Nikon, or Olympus.

Microscopy applications can be segmented in different ways: one of these is distinguishing the modalities of Microscopy for the displaying of minuscule point sources of those allotted to the measure of continuous objects.

The case of the minuscule point sources is a priori much simpler. The object consists of a small number of light points; the latter can be described by a small number of parameters—the descriptors defined hereinbelow—greatly simplifying the physical problem and the algorithmic complexity. The case of a continuous object describes that spatial distribution—or space-time, if the dynamic is considered—continuous, is different and is also described in this patent application.

Fluorescence Microscopy

Fluorescence microscopy is one of the modalities of microscopy, it has replaced in many applications, the other microscopy techniques. A fluorescence microscope is an optical microscope used to study properties of objects or of organic or inorganic substances by using the phenomena of fluorescence instead of, or in addition to other modalities such as reflection and absorption.

We refer again to FIG. 1, describing this time a fluorescence microscope either used in biology or artificial vision to characterize, for example, materials; in fluorescence microscopy, tiny point sources, 15 to 18, for example fluorophores, based on the physical phenomenon of one photon fluorescence, are fixed at specific positions of predetermined biological objects, 13 and 14; the light emitted by the point sources is observed instead of observing the light emitted by the objects, 13 and 14, themselves.

The sample is illuminated by light of wavelength, or specific wavelengths, which is absorbed by the point sources, thereby inducing the emission of light at different, higher, wavelengths. During the collection of the light emitted by fluorescence, the illumination light is separated from the emitted fluorescence, which is lower, by the use of a spectral emission filter.

Fluorescence Microscopy studies the light emitted by small point sources, fluorophores. However, when the density of fluorophores is high, fluorophores are no longer analysed individually but treated as a continuous object. It is important to note, from this stage, that the same system enables observation of continuous objects, and is not limited to the observation of point sources.

Fluorophores have become an important tool for the visualization of biological objects. The activity and the biological information including details above the limit of resolution of 200-250 nm are systematically viewed and measured using fluorescence microscopy. This resolution limit is derived from the Rayleigh criterion, which in the best case, reaches 200-250 nm in systems designed specifically. For a long time, until the emergence of superresolution techniques described below, it was recognized that optical techniques, including fluorescence microscopy, are unable to visualize details smaller than the Rayleigh criterion, which is about 200-250 nm.

The main implementations of fluorescence microscopy, as described in detail in the literature, are the confocal microscope, often used in a scanning configuration or spinning disk configuration, and the wide-field imaging microscope.

Confocal Microscopy

Referring now to FIG. 2 which is a simplified representation of a confocal fluorescence microscope of the prior art 200.

A confocal fluorescence microscope, FIG. 2 is an optical instrument. Its main hardware components are shown in FIG. 2. They include:

a light source, 20,
an optomechanical frame not shown
a cube filter, 21,
a microscope objective 22, and,
a detector assembly, 23,
a processing unit, not shown.

The light source 20, which may be an arc lamp or a laser, creates light energy necessary for fluorescence.

The Optomechanical frame, not shown, is the support of all the optical components and auxiliary optics and includes alignment capacities. It also includes optical elements, not shown, capable of shaping the beam to allow its focus point of a minimum size by means of the microscope objective.

It can also comprise, in a confocal microscope having scanning fluorescence, a spatial or angular scanning mechanism, not shown, to change the position of the point source with respect to the object to be measured.

The cube of filters, 21, channels the different optical signals and avoids contamination of the fluorescence signal by the excitation light. The cube is composed of filters: excitation filter, 210 dichroic mirror, 211, and emission filter 212.

The microscope objective 22 focuses the light created by the source in the focal plane of the objective lens 24, a light distribution pattern of small size, and the light distribution considered as optimum consisting of the Airy disk. The microscope objective 22, also collects back fluorescent light emitted by the fluorophores.

For a confocal microscope having scanning fluorescence, the system can be descanned, i.e., the return light can pass through the scanning mechanism to compensate for the translation due to scanning.

A detector lens, 25, creates, in the image plane of the detector 26, a magnified image of the focal plane of the objective lens 24.

A confocal hole, 27, is theoretically placed in the image plane of the detector 26.

In most practical systems, the confocal hole, 27, is placed in an intermediate imaging plane, not shown, and reimaged onto the image plane of the detector 26.

The assembly of the detector, 23, detects the fluorescent intensity in the overall illuminated volume, and converts it into digital signal. For a confocal scanning microscope, the assembly of the detector consists of a detector of a single element, such as a PMT or SPAD. For a confocal microscope with rotary disk, the assembly of the detector consists of a matrix of detector elements, such as a CCD, an EMCCD, a CMOS or a matrix of SPAD.

All components mounted from the light source to the dichroic filter are the illumination path, 201. The detection channel, 202, represents all the components mounted from the dichroic filter to the assembly of the detector.

The elementary optical process of a standard confocal microscope can be segmented into six parts:
Projecting light on the volume analysed
Fluorescent light emission by fluorophores
Imaging of the fluorophores in the focal plane
Limitation in the focal plane of light analysed by confocal hole
Integration of light analysed by a photoelectric detector
Display of the measured intensity as a pixel value in an image.

Fluorescence microscopes are available from several manufacturers, such as Nikon, Zeiss, Leica and Olympus. Fluorescence microscopes can be either standard microscopes suitable for fluorescence or microscopes optimised specifically for fluorescence. Modern microscopes are versatile instruments capable of operating in many different modalities, including, but not limited to, fluorescence modalities, using the same optomechanical platform and most of the components. Most fluorescence microscopes are developed as an open platform, capable of performing several additional features with minimal modifications. Other fluorescence microscopes are instruments dedicated, adapted for a specific task, such as medical or pharmaceutical diagnostic.

However, other fundamental biological activities also occur at scales smaller than 200 nm in biological samples. At this level of spatial resolution, important phenomena can be observed: the biological processes at the scale of intracellular, cell information transfer, the folding and unfolding of the proteins and changes in the DNA and RNA. Thus, for example, the measurement of this intracellular information opens new avenues for understanding biological activity, and leads to progress in understanding and monitoring of research and medical diagnostic.

However, the different existing methods of microscopy and existing microscopes, not incorporating the superresolution, allow microscopic observation up to the optical diffraction limit. This reduces their field of use to a limited set of applications.

Superresolution

New optical methods, the superresolution methods, are capable of obtaining images at a resolution greater than the diffraction limit. These methods are being developed by several companies, laboratories and researchers and some of the instruments using these methods, the superresolution microscopes, are commercially available. A synthesis of superrsolution techniques was published by the Swedish Academy of Sciences, on the occasion of the award of the Nobel Prize in Chemistry 2014 [38]. Several comparative analyses of superresolution methods have recently been published in the literature, as the articles by Schermelleh et al. [1].

An updated bibliography on the superresolution is on the website of the company Zeiss, and on the website of the company Nikon.

New superresolution techniques obtain information beyond the resolution limit. The main problem of all existing superresolution techniques is that the envelope limit of the performance, expressed in terms of resolution, lateral and longitudinal, speed, light intensity necessary, and phototoxicity in the biological object, and therefore of ability to measure different biological objects. This point has also been emphasized by Eric Betzig during his class presentation at the awards ceremony of the Nobel Prize in Chemistry 2014.

In addition, most of the methods and instruments can provide superresolution either a good lateral resolution or a good longitudinal resolution, but rarely both.

In addition, all these instruments are complex and require a highly skilled operator.

In addition, these instruments can generally observe a small part of biological specimens because of strong operational limitations, such as, for some of them, a shallow depth of field or a requirement of very high light intensities, harmful to cells.

Another problem with the methods and instruments of superresolution, is that most of them are able to recover in the illuminated volume, the attributes of a single fluorophore, but fail to recognize the presence of simultaneously several fluorophores and measuring their attributes.

An additional problem with certain existing methods and instruments of superresolution is that these methods and instruments are presented to users and perceived by them as a general tool, able to replace the standard or confocal microscopes. However, existing superresolution methods and instruments lack the simplicity, robustness, ease of use and are expensive relative to the standard microscopes, which hinders their use as research tools or as general diagnostic tools.

Another problem with certain existing superresolution methods and tools is that most of these methods and tools are designed as stand-alone instruments designed to replace standard microscopes. Such an approach requires the replacement of existing instruments and the renewal of all systems and devices all the knowledge and know-how related to microscopy platforms and developed over many years.

Another problem with most methods and fluorescence microscopy instruments and superresolution is that these methods and tools are designed on a paradigm of image acquisition, the entity for which basic information is—either more images, or—or more—ROI regions—bi- or three-dimensional Region Of Interest. Algorithmic, systemic and superresolution methods described later in the context of the invention will, by their inherent flexibility, the development of new strategies of acquisition. These acquisition procedures, dynamic and selective, will be defined by optimised sequence acquisition and interactive and deferred processing. They allow a more sophisticated optimisation of useful information, as defined by criteria based on the shape, geometry and dynamics of one or more fluorescent objects, separately or relative one to the other.

Another problem with the majority of existing methods and instruments of fluorescence microscopy and superresolution is that these methods and instruments are designed for studying samples on microscope slides. However, the confocal microscope is used today in many medical fields as an instrument of in-vivo diagnosis for internal and external examinations on the human body by means of fiber optics used to illuminate and display fluorescence emitted by tissue to be diagnosed. Superresolution does not currently perform such in-vivo diagnostics. Algorithmic, systemic and superresolution methods described later in the context of the invention will allow the development of novel methods of in-vivo diagnostics which will reduce the need to take biopsies and will shorten wait times for patients.

So there is still an urgent need to provide superresolution methods and tools and algorithm methods capable of measuring an object or a biological stage with high accuracy.

SUMMARY OF THE INVENTION

A first aspect of the invention relates to an optical measuring device for determining the spatial distribution or the location of re-emitting sources on a sample, the sample comprising at least one re-emitting source, excited by light and re-emitting light according to a law determined as a function of light projected on the sample, the device comprising
  an achromatic projection module, containing a laser, whereof the wavelength is aligned to the excitation wavelength of said at least one re-emitting source, to create either a compact light distribution or a sequence of compact light distributions of different topology
  a scanning module for scanning the sample optically,
  a detection module for detecting the light re-emitted by said at least one re-emitting source of the sample for the or for each of the compact light distributions of different topology and for each of the scanning points of the sample;
  an image acquisition module for acquiring for each scanning point either an image or a sequence of images, for the sequence of images, each image corresponding to one of the compact light distributions of different topologies,
  an algorithm module in which formulation of the reconstruction of the sample and of its spatial and/or temporal and/or spectral properties is considered as a reverse Bayesian problem and leads to the definition of a distribution a posteriori.

By way of the Bayes law, a law a posteriori can combine the probabilistic formulation of a noise model, as well as any a priori on a light distribution created in the sample by projection.

In an embodiment, the algorithm module is configured for estimating the light distribution in the sample by the use of clouds of specific emitters which favours sparse solutions;
  estimating the average a posteriori, and
  representing the results, based on the average a posteriori, either in the form of an image or in the form of digital or graphic data.

According to an embodiment the estimation of the average a posteriori is performed by means of an algorithm of Monte-Carlo Markov Chain (MCMC) type.

Another aspect of the invention relates to an optical measuring device for determining spatial distribution or location of re-emitting sources on a sample, the sample comprising at least one re-emitting source, excited by the light and re-emitting light as per a law determined as a function of the light projected on the sample, the device comprising
  an achromatic projection module, containing a laser, whereof the wavelength is aligned to the excitation wavelength of said at least one re-emitting source, to create either a compact light distribution or a sequence of compact light distributions of different topology,
  a scanning module for scanning the sample optically, integrated or not into the device,
  a detection module for detecting the light re-emitted by said at least one re-emitting source of the sample for the or for each of the compact light distributions of different topology and for each of the scanning points of the object;
  an image acquisition module for acquiring for each scanning point either an image or a sequence of images for the sequence of images, each image corresponding to one of the compact light distributions of different topologies,
  a module of MAP algorithm not regularized with positivity restriction for processing data and reconstructing the sample,
  the representation of results based on the results of the MAP algorithm, either in the form of an image or in the form of digital or graphic data.

According to an embodiment, the MAP algorithm also contains a frequency band limitation restriction.

According to an embodiment, the MAP algorithm uses an accelerated digital diagram of Nesterov type.

According to an embodiment for a sequence of images, the redundancy in the frequency information is used, due to the different frequency characteristics of the different distributions projected on the sample, for compensating and considerably reducing the impact of missing points or scanning irregularities.

According to an embodiment, the MAP algorithm is adapted to resolve an inverse problem relating to a sum of a small number of terms, such as a low-frequency component and a more sparse component.

According to an embodiment, the MAP algorithm is adapted to impose a non-local redundancy restriction of the solution, for example by calculating weights on the images or on the different digital masks and the non-local tree of similarities being applied to the solution as regularization.

According to an embodiment, a mask of variable size is used in the plane of the detector to obtain images having either different axial characteristics, or different or optimised rejection capacities of parasite light, overall or locally.

According to an embodiment, a computer program is configured for executing the embodiments described previously.

Another aspect of the invention relates to an optical measuring process for determining the spatial distribution or the location of re-emitting sources on a sample, the sample comprising at least one re-emitting source, excited by the light and re-emitting light as per a law determined as a function of light projected on the sample, the process comprising achromatic projection by a laser whereof the wavelength is aligned to the excitation wavelength of said at least one re-emitting source to create either a compact light distribution or a sequence of compact light distributions of different topology, optical scanning of the sample, detection of the light re-emitted by said at least one re-emitting source of the sample for the or for each of the compact light distributions of different topology and for each of the scanning points of the sample;

image acquisition for acquiring for each scanning point either an image or a sequence of images, for the sequence of images each image corresponding to one of the compact light distributions of different topologies, application of an algorithm in which formulation of the reconstruction of the sample and its spatial and/or temporal and/or spectral properties is considered as a reverse Bayesian problem and leads to the definition of a distribution a posteriori.

By way of the Bayes law a law a posteriori can combine the probabilistic formulation of a noise model, as well as any a priori on a light distribution created in the sample by projection.

In an embodiment the algorithm comprises estimating the light distribution in the sample by the use of clouds of specific emitters which favour sparse solutions; and estimating the average a posteriori, representing the results based on the average a posteriori either in the form of an image or in the form of digital or graphic data.

According to an embodiment, the estimation of the average a posteriori is performed by means of an algorithm of Monte-Carlo Markov Chain (MCMC) type.

Another aspect of the invention relates to an optical measuring process for determining the spatial distribution or the location of re-emitting sources on a sample, the sample comprising at least one re-emitting source, excited by the light and re-emitting of the light as per a law determined as a function of the light projected on the sample, the process comprising achromatic projection by a laser whereof the wavelength is aligned to the excitation wavelength of said at least one re-emitting source, to create either a compact light distribution or a sequence of compact light distributions of different topology, optical scanning of the sample, detection of the light re-emitted by said at least one re-emitting source of the sample for the or for each of the compact light distributions of different topology and for each of the scanning points of the sample;

image acquisition for acquiring for each scanning point either an image or a sequence of images, for the sequence of images, each image corresponding to one of the compact light distributions of different topologies, application of MAP algorithm not regularized with positivity restriction, representation of results based on the results of the MAP algorithm either in the form of an image or in the form of digital or graphic data.

According to an embodiment, the MAP algorithm also contains a frequency band limitation restriction.

According to an embodiment the MAP algorithm uses an accelerated digital diagram of Nesterov type.

According to an embodiment for a sequence of images, redundancy in the information frequency is used due to the different frequency characteristics of the different distributions projected on the sample, for compensating and considerably reducing the impact of missing points or scanning irregularities.

According to an embodiment the MAP algorithm is adapted to resolve an inverse problem relating to a sum of a small number of terms, such as a low-frequency component and a more sparse component.

According to an embodiment the MAP algorithm is adapted to impose a non-local redundancy restriction of the solution, for example by calculating weights on the images or on the different digital masks and the tree of non-local similarities being applied to the solution as regularization.

According to an embodiment a mask of variable size is used in the plane of the detector to obtain images having either different axial characteristics, or different or optimised rejection capacities of parasite light, overall or locally.

According to an embodiment, a computer program is configured to execute the embodiments described previously.

In another embodiment of this invention, an optical measuring process is used to determine the spatial distribution or the location of re-emitting sources on a sample, the sample comprising at least one re-emitting source, said at least one re-emitting source re-emitting light as a function of light projected on the sample, as per a determined law, by a first light source comprising a first laser, whereof the wavelength is aligned to the excitation wavelength of the re-emitting source and the re-emitting source which can be depleted or activated by the action of one or more light sources, comprising at least one second laser whereof the wavelength is aligned to the depletion or activation wavelength of said re-emitting source, the process comprising:

the two compact light distributions spreading along the same optical path for all lasers, the compact light distribution of the first excitation laser being of a regular topological family, ideally a Gaussian distribution or an Airy spot, the compact light distribution of the depletion or activation laser consisting of superposition of a singular distribution, of vortex type, on a first polarization, linear or circular, and of a distribution known as black sphere or "top-hat" on the polarization orthogonal to the first polarization, said compact light distributions being created by a cascade of at least two crystals of conical diffraction, or a set of uniaxial crystals, optionally separated by a control element of chromatic polarization or not, dynamic or static, detection of the light re-emitted by said at least one re-emitting source of the sample;

generation of at least one image, from the detected light; and direct detection or algorithmic analysis of the images to obtain spatial distribution information or location of said at least one re-emitting source.

In a particular arrangement of the previous embodiment of this invention, the polarization control element described is an optical element consisting of a set of one or two achromatic quarter-waves and a chromatic wave plate, the whole being designed such that the optical element creates, between the two conical crystals or between two uniaxial crystals, a difference in rotation of the polarization between the excitation beam and the depletion beam close to 180 degrees and not differing by more than 30 degrees from this value.

In a particular arrangement of the previous embodiment of this invention, the polarization control element is an optical element whereof the material has a property of optical activity and the thickness of the optical element is selected such that the natural dispersion of the optical activity of the material creates, between the two conical crystals or between two uniaxial crystals, a difference in rotation of the polarization between the excitation beam and the depletion beam close to 180 degrees and not differing by more than 30 degrees of this value.

In a particular arrangement of the previous embodiment of this invention, no polarization control element is used, but the two conical crystals are made of different material and the natural dispersion of these two materials compensates the conical diffraction approximately at the excitation wavelength and not at the depletion wavelength.

In another embodiment of this invention, an optical device is used to determine the spatial distribution or the location of re-emitting sources on a sample, the sample comprising at least one re-emitting source, said at least one re-emitting source re-emitting light as a function of light projected on the sample, as per a determined law, by a first light source comprising a first laser, whereof the wavelength is aligned to the excitation wavelength of the re-emitting source and the re-emitting source which can be depleted or activated by the action of one or more light source(s), comprising at least one second laser, whereof the wavelength is aligned to the depletion or activation wavelength of said re-emitting source, the process comprising:
- the two compact light distributions spreading along the same optical path for all lasers,
- the compact light distribution of the first excitation laser being of a regular topological family, ideally a Gaussian distribution or an Airy spot,
- the compact light distribution of the depletion or activation laser consisting of superposition of a singular distribution, of vortex type, on a first polarization, linear or circular, and of a distribution known as black sphere or "top-hat" on the polarization orthogonal to the first polarization,
- said compact light distributions being created by a cascade of at least two crystals of conical diffraction, or a set of uniaxial crystals, optionally separated by a control element of chromatic polarization or not, dynamic or static,
- detection of the light re-emitted by said at least one re-emitting source of the sample,
- generation of at least one image, from the detected light; and
- direct detection or algorithmic analysis of the images to obtain spatial distribution information or location of said at least one re-emitting source.

In a particular arrangement of the previous embodiment of this invention, the polarization control element described is an optical element consisting of a set of one or two achromatic quarter-waves and a chromatic wave blade, the whole being designed such that the optical element creates, between the two conical crystals or between two uniaxial crystals, a difference in rotation of the polarization between the excitation beam and the depletion beam close to 180 degrees and not differing by more than 30 degrees from this value.

In a particular arrangement of the previous embodiment of this invention, the polarization control element is an optical element whereof the material has a property of optical activity and the thickness of the optical element is selected such that the natural dispersion of the activity optical of the material creates, between the two conical crystals or between two uniaxial crystals, a difference in rotation of the polarization between the excitation beam and the depletion beam close to 180 degrees and not differing by more than 30 degrees from this value.

In a particular arrangement of the previous embodiment of this invention, no polarization control element is used, but the two conical crystals are made of different material and the natural dispersion of these two materials compensates the conical diffraction approximately at the excitation wavelength and not at the depletion wavelength.

Another implementation of this invention describes an optical method for locally evaluating the spherical aberration in each place of the sample, or each place of the object being imaged, by using conical diffraction and its phase and polarization effects. The sample is illuminated with uneven light distribution, which can be for example but non-limiting, a black sphere (or top hat) such that 3D distribution presents two lobes of the same intensity below and above the focal plane. In the presence of spherical aberration in the system these two lobes are not of the same intensity. This effect can be used to take an image, in particular a confocal image, by illuminating above and below the focal plane (by uncoupling the illumination and the imagery). By then analysing the intensity ratio of the two images, the quantity of spherical aberration of the system can be deduced therefrom.

Another implementation of this invention describes an optical device for locally evaluating the spherical aberration in each place of the sample, or each place of the object being imaged, by using conical diffraction and its phase and polarization effects. The sample is illuminated with uneven light distribution which can be for example but non-limiting, a black sphere (or top hat) such that 3D distribution presents two lobes of the same intensity below and above the focal plane. In the presence of spherical aberration in the system these two lobes are not of the same intensity. This effect can be used to take an image, in particular a confocal image, by illuminating above and below the focal plane (by uncoupling the illumination and the imagery). By then analysing the intensity ratio of the two images, the quantity of spherical aberration of the system can be deduced therefrom.

Another implementation of this invention describes an optical method for locally evaluating the spherical aberration in each place of the sample, or each place of the object being imaged, by using conical diffraction and its phase and polarization effects. Forming a light beam by conical diffraction via a cascade of crystals produces a distribution of intensity connected directly to the spherical aberration. This distribution can be obtained, for example but non-limiting, between crossed linear polarizers and two biaxial crystals whereof the optical axes are aligned. A half-wave plate is inserted between the two crystals. By way of characteristic form this distribution will be called "four-leaf-clover". In the absence of spherical aberration, this distribution comprises four lobes perfectly equal and all at the same focus. The spherical aberration caused by an optical system breaks the symmetry of this distribution at the same time in the focus and the distribution of intensity in the four lobes. Fine measuring of the value of spherical aberration is possible by an offset estimator of focus of lobes and ratios of intensity at different focal planes.

Another implementation of this invention describes an optical device for locally evaluating the spherical aberration in each place of the sample, or each place of the object being imaged, by using the conical diffraction and its phase and polarization effects. Forming a light beam by conical diffraction via a cascade of crystals produces a distribution of intensity connected directly to the spherical aberration. This distribution can be obtained, for example but non-limiting, between crossed linear polarizers and two biaxial crystals whereof the optical axes are aligned. A half-wave plate is inserted between the two crystals. By way of characteristic form, this distribution will be called "four-leaf clover". In the absence of spherical aberration, this distribution comprises four lobes perfectly equal and all at the same focus. The spherical aberration caused by an optical system breaks the symmetry of this distribution at the same time in the focus and distribution of intensity in the four lobes. Fine measuring of the value of spherical aberration is possible by an offset estimator of focus of lobes and ratios of intensity on different planes of focus.

Another implementation of this invention describes an optical method for calibrating in real time a beam scanning system by point monitoring generated by a laser diode in near infrared. An optical method is executed for monitoring in real time on a camera a point scanned by a beam scanning system (galvanometric mirrors, bidirectional piezo-electric mirror or any other system). Using a wavelength in the near infrared dispenses with chromatic effects of optics which makes this system useable for calibrating several wavelengths projected in a confocal microscope. Also, using a laser diode in the near infrared ensures that low passage of the calibrating laser in the microscope will have a highly marginal effect only, the wavelength being far greater than the usual excitation wavelengths of fluorescence.

Another implementation of this invention describes an optical device for calibrating in real time a beam scanning system by point monitoring generated by a laser diode in near infrared. An optical method is executed for monitoring in real time on a camera a point scanned by a beam scanning system (galvanometric mirrors, bidirectional piezo-electric mirror or any other system). Using a wavelength in the near infrared dispenses with chromatic effects of optics which makes this system useable for calibrating several wavelengths projected in a confocal microscope. Also, using a laser diode in the near infrared ensures that low passage of the calibrating laser in the microscope will have a highly marginal effect only, the wavelength being far greater than the usual excitation wavelengths of fluorescence.

Another implementation of this invention describes an optical method, modified Wollaston prism, for duplicating a set of light distributions without modifying the relationships between them, which can be used in terms of the methods described in this invention or within the scope of STED methods described in this invention or other standard STED methods. Using several Wollaston prisms in cascade can separate an incident beam into many emerging beams. The same effect can be obtained by modifying the Wollaston prism, to create the composed Wollaston prism, by adding to it pieces of uniaxial crystal whereof the index and orientation of the birefringence are suitably selected. In this way a prism can be made from a single block of uniaxial crystal which can separate an incident beam into $2^n$ emerging beams (for example eight or sixteen) which are contained in one plane and separated by equal angles. Once focused on the sample, the result is $2^n$ points aligned and equally separated. If the incident beam has passed through a LatSRC module, these $2^n$ points are not $2^n$ Airy patches, but the distributions created by the module are all identical. The advantage of using this beam splitter is to scan the sample faster since there are $2^n$ light points in place of a single one.

Another implementation of this invention describes an optical device, modified Wollaston prism, for duplicating a set of light distributions without modifying the relationships between them, which can be used in terms of the devices described in this invention or within the scope of STED device described in this invention or other standard STED devices. Using several Wollaston prisms in cascade, it is thus possible to separate an incident beam into a large number of emerging beams. The same effect can be obtained by modifying the Wollaston prism to create the composed Wollaston prism by adding pieces of uniaxial crystal whereof the index and orientation of the birefringence are suitably selected. In this way a prism can be made from a single block of uniaxial crystal which can separate an incident beam into $2^n$ emerging beams (for example eight or sixteen), which are contained in one plane and separated by equal angles. Once focused on the sample, the result is $2^n$ points aligned and equally separated. If the incident beam has passed through a LatSRC module, these $2^n$ points are not $2^n$ Airy patches, but the distributions created by the module are all identical. The advantage of using this beam splitter is to scan the sample faster since there are $2^n$ light points in place of a single one.

Another implementation of this invention describes an optical method, and an optical procedure using a property of Poisson noise for generating from a realisation of a Poisson VAR of parameter I (average), two independent realisations of a Poisson VAR of parameter ½, because of processing a posteriori. Due to a process for generation of random or pseudo-random numbers, a binomial law is simulated. Analysis or reconstruction of the two measurements generated in this way, called Split Photon method, provides two independent results in terms of probabilities, and the differences between these two results illustrate dependence on the reconstruction algorithm relative to the measuring noise. Using a local comparison criterion of these two reconstructions, when there is a significant difference between the two reconstructed images or signals, it is possible to apply locally or overall different parameters in the reconstruction algorithm applied to the original measurements. It is also possible to use another algorithm such as a MAP algorithm with restriction of overall or local regularity by using the similarity map or any other comparison criterion to optimise the regularization parameter(s). It is also possible to consider the similarity map or of the criterion used in the Split Photon method, graphically or digitally, to illustrate local or overall dependence on reconstruction to the measuring noise. It is also possible to generate, rather than a couple of measurements, an n-tuple of measurements, by using a multinomial law of parameters rather than a binomial law.

Finally, it is possible to iterate the Split Photon method by generating several couples or n-tuples of measurements, still by processing a posteriori of measurements, but by modifying the grain in the pseudo-random generator.

Another implementation of this invention describes an optical device, and an algorithmic device using a property of Poisson noise for generating from a realisation of a Poisson VAR of parameter I (average), two independent realisations of a Poisson VAR of parameter ½, by way of processing a posteriori. Because of a generation process of random or pseudo-random numbers a binomial law is simulated. The analysis or reconstruction of the two measurements generated in this way, called Split Photon method, provides two independent results in terms of the probabilities, and the differences between these two results illustrate the dependence of the reconstruction algorithm on the measuring noise. By using a local comparison criterion of these two reconstructions, when there is a significant difference between the two reconstructed images or signals, it is possible to locally or overall apply different parameters in the reconstruction algorithm applied to the original measurements. It is also possible to use another algorithm such as a MAP algorithm with overall or local regularity restriction, by using the similarity map or any other comparison criterion to optimise the regularization parameter or the regularization parameters. It is also possible to consider the similarity map or of the criterion used in the Split Photon method, graphically or digitally, to illustrate the local or overall dependence of the reconstruction at the measuring noise. It is also possible to generate, rather than a couple of measurements, an n-tuple of measurements by using rather than a binomial law, a multinomial parameter law. Finally, it is possible to iterate the Split Photon method by generating several couples or n-tuples of measurements, still by processing a posteriori of measurements, but by modifying the grain in the pseudo-random generator.

Another implementation of this invention describes an optical method and an algorithmic method using the ICE algorithm, which replace calculation of the expectancy of the law a posteriori effected by LSE via iteration of explicit calculation of the average of the law a posteriori of a pixel conditionally to its neighbours.

Another implementation of this invention describes an optical device and an algorithmic device using the ICE algorithm which replaces the calculation of the expectancy of the law a posteriori effected by LSE via iteration of the explicit calculation of the average of the law a posteriori of a pixel conditionally to its neighbours.

Another implementation of this invention describes an optical method, and an algorithmic method for measuring the signal proportion which belongs to the region of interest (pinhole), for each image This measurement, called Pinhole Ratio, consists of comparing in a spatial region of the object the proportion of photons which are resent and images in the region of interest of each image issue of this region relative to the total number of photons resent by the object in all images considered. This ratio gives information locally on the nature of the object image. In the event where the Pinhole Ratio deviates from the above value it is possible to modify the characteristics of the reconstruction algorithm.

Another implementation of this invention describes an optical device, and an algorithmic device for measuring the signal proportion which belongs to the region of interest (pinhole), for each image This measurement, called Pinhole Ratio, consists of comparing in a spatial region of the object the proportion of photons which are resent and images in the region of interest of each image coming from this region relative to the total number of photons resent by the object in all images considered. This ratio gives information locally on the nature of the object image. In the event where the Pinhole Ratio deviates from the above value it is possible to modify the characteristics of the reconstruction algorithm.

Another implementation of this invention describes an optical method, and an algorithmic method for measuring the position of the emitter by using the particular features of distributions called offset half-moons, described in this invention, by using an appropriate optical method, by measuring the intensity ratio between the lobes. This 3D location can be used either in projection, i.e., by projecting one or more distributions with offset half-moons on the object and by using an adapted algorithm, for example the algorithms described in this invention, or in emission by having light sent by the emitter pass through an optical module creating this distribution and by analysing the return PSF.

Another implementation of this invention describes an optical device, and an algorithmic device for measuring the position of the emitter by using the particular features of distributions called offset half-moons, described in this invention, by using an appropriate optical device, by measuring the intensity ratio between the lobes. This 3D location can be used either in projection, i.e., by projecting one or more distributions with offset half-moons on the object and by using an adapted algorithm, for example the algorithms described in this invention, or in emission by having light sent by the emitter pass through an optical module creating this distribution and by analysing the return PSF.

Another implementation of this invention describes an optical method, and an algorithmic method for measuring the position of the emitter by using the particular features of distributions called "dark helix", described in this invention, by using an appropriate optical method, by measuring the angle of the axis connecting the two zeros. This 3D location can be used either in projection, i.e., by projecting one or more distributions with offset half-moons on the object and by using an adapted algorithm, for example the algorithms described in this invention, or in emission by having light sent by the emitter pass through an optical module creating this distribution and by analysing the return PSF.

Another implementation of this invention describes an optical device, and an algorithmic device for measuring the position of the emitter by using the particular features of distributions called "dark helix", described in this invention, by using an appropriate optical device, by measuring the angle of the axis connecting the two zeros. This 3D location can be used either in projection, i.e., by projecting one or more distributions with offset half-moons on the object and by using an adapted algorithm, for example the algorithms described in this invention, or in emission by having light sent by the emitter pass through an optical module creating this distribution and by analysing the return PSF.

BRIEF DESCRIPTION OF THE DRAWINGS

The invention will now be described in connection with certain embodiments with reference to the following illustrative figures so that it can be better understood.

With specific reference to the figures, it is emphasized that the indications represented are presented as an example and for purposes of illustrative discussion of the embodiments of the invention and are presented only in order to provide what is considered to be the description of the most useful and easy to understand principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a simplified view of a confocal fluorescence microscope of the prior art also used as support of the invention;

FIG. 2 is a simplified pictorial representation of a fluorescence microscopy system;

FIG. 3 is a simplified schematic illustration of a conical diffraction module in accordance with one embodiment of the present invention;

FIGS. 4a to 4f are simplified pictorial representations of the measurement paradigms and containment volume according to embodiments of the invention and of the confocal microscopy;

FIG. 5 is a simplified pictorial representation of a particular embodiment of the SRCDP microscopy platform;

FIG. 6a is a simplified schematic illustration of a module lateral superresolution in accordance with an embodiment of the present invention;

FIG. 6b is a simplified schematic illustration of another embodiment of a lateral superresolution module, according to an embodiment of the present invention;

Figure 7A:
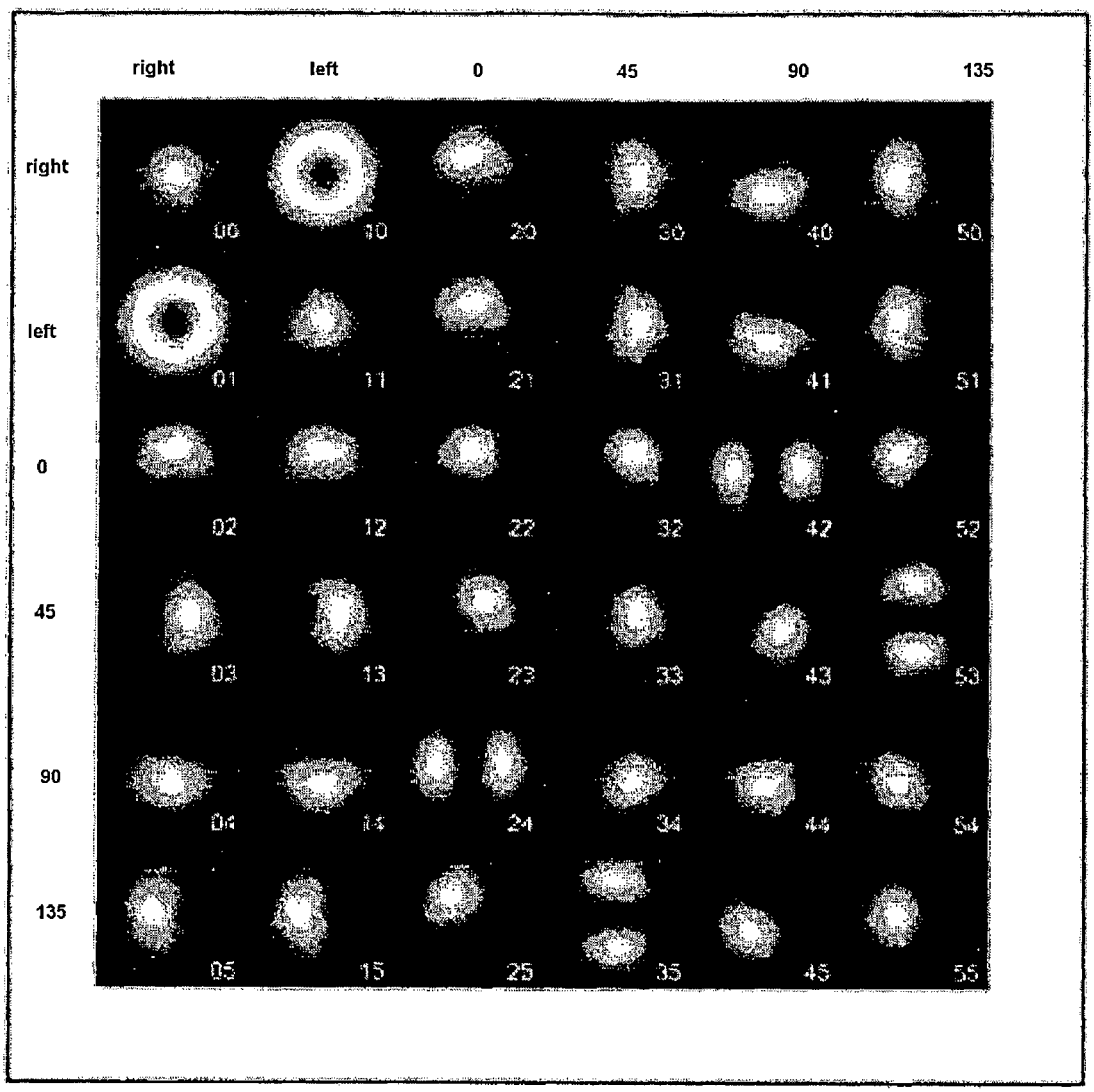
Figure 7B:
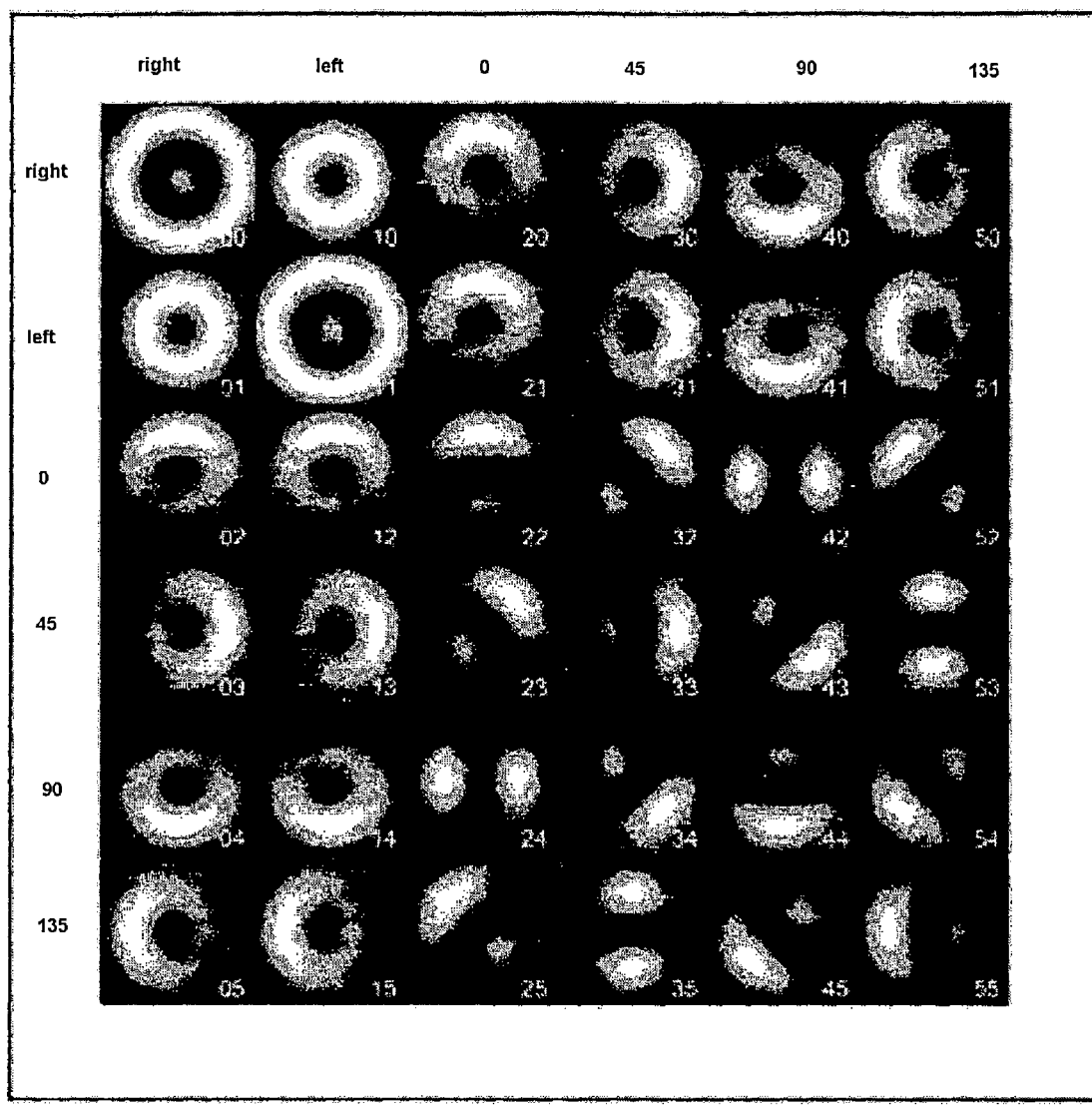
Figure 7C:
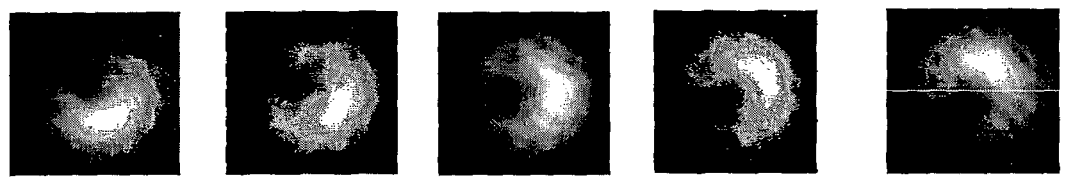
Figure 7D:
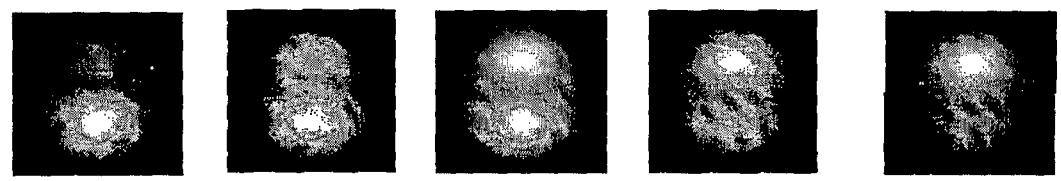
Figure 7E:
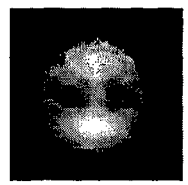
Figure 8:
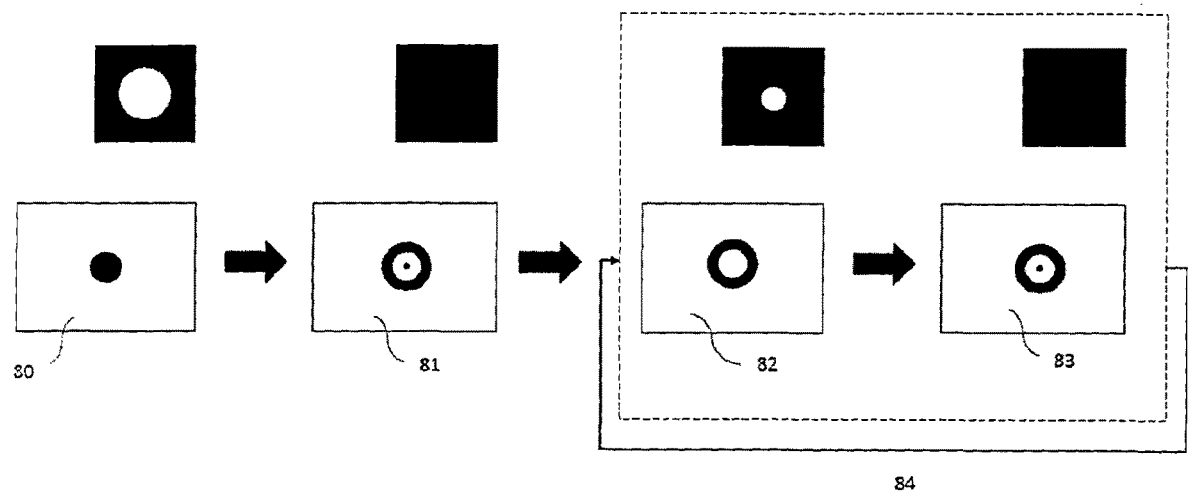
Figure 9:
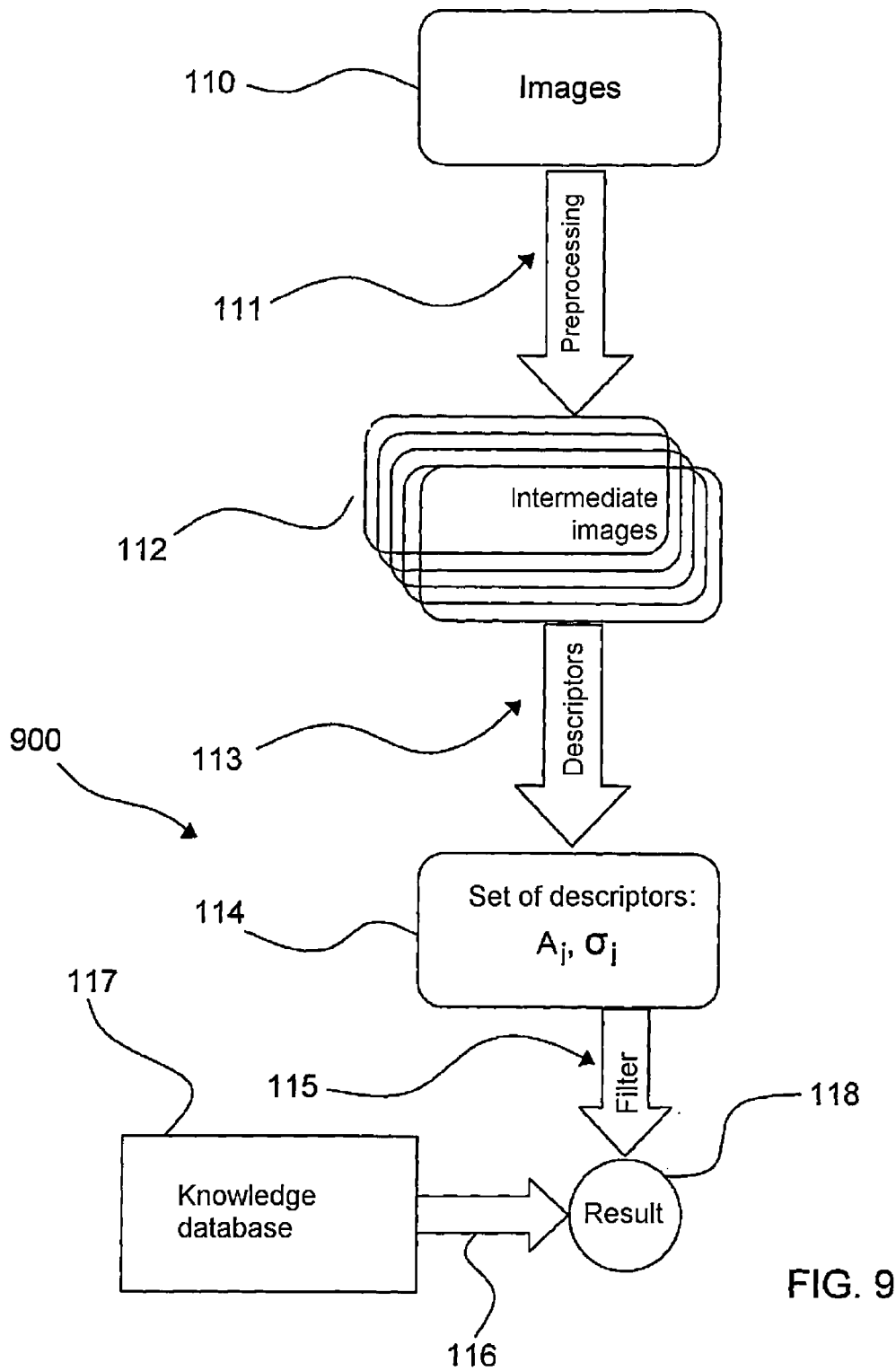
Figure 10:
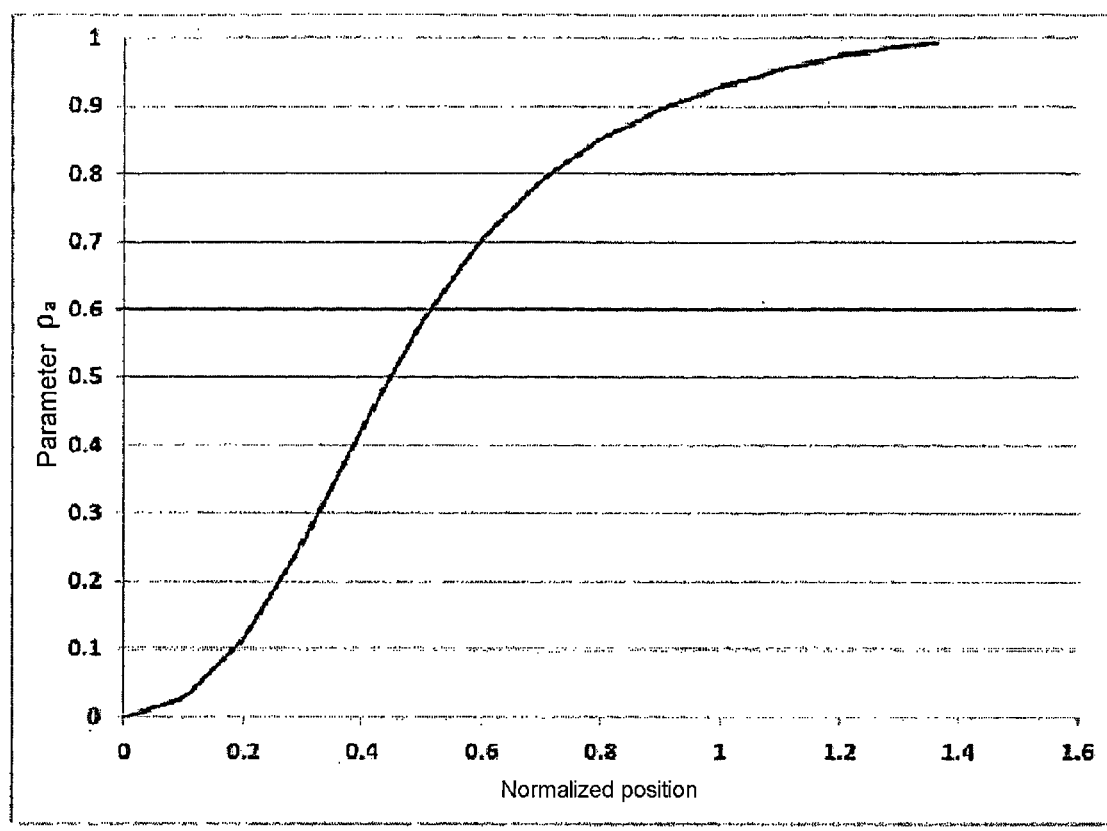
Figure 11:
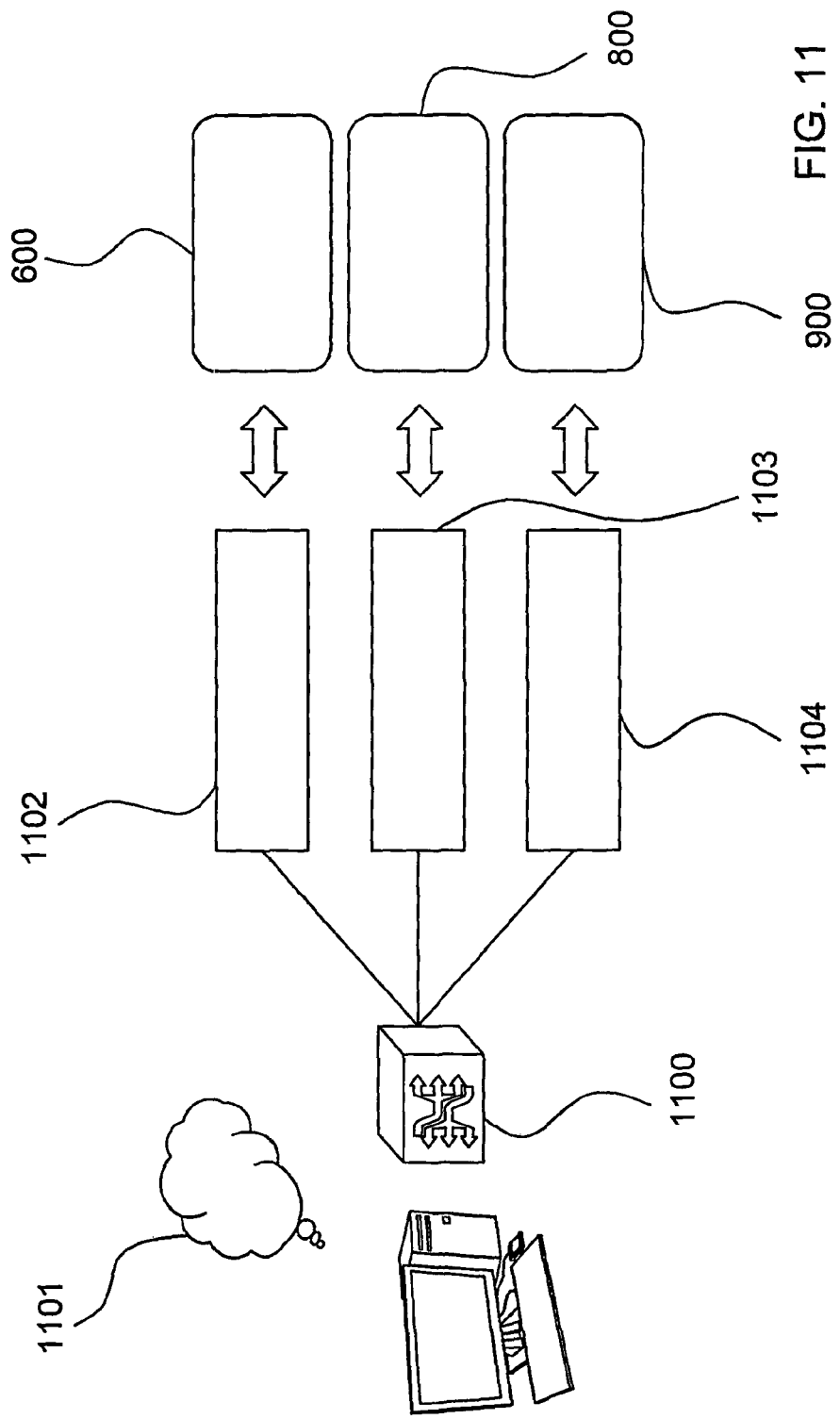

FIGS. 7a to 7c shows tables of light distributions of a conical diffraction module according to the polarization of the polarizers of the input and output for several values of the parameter of conical diffraction, $\rho_0$. These light distributions were calculated by simulation of equations developed by Berry, [2]; FIG. 7d complete these dispatch tables by presenting the variation of distributions called offset half-moons depending on the axial position (z-axis); FIG. 7e shows a new distribution "dark helix" comprising two zeros, the axis connecting the two zeros rotates depending on the spread;

FIG. 8 is a simplified schematic illustration of one of the embodiments of dark tracking;

FIG. 9 is a simplified schematic illustration of a method for superresolution algorithm of fluorophores data, in accordance with an embodiment of the present invention;

FIG. 10 is a simplified schematic illustration of the calculation of descriptors;

FIG. 11 is a simplified schematic illustration of the control module of the SRCDP platform.

Figure 12:
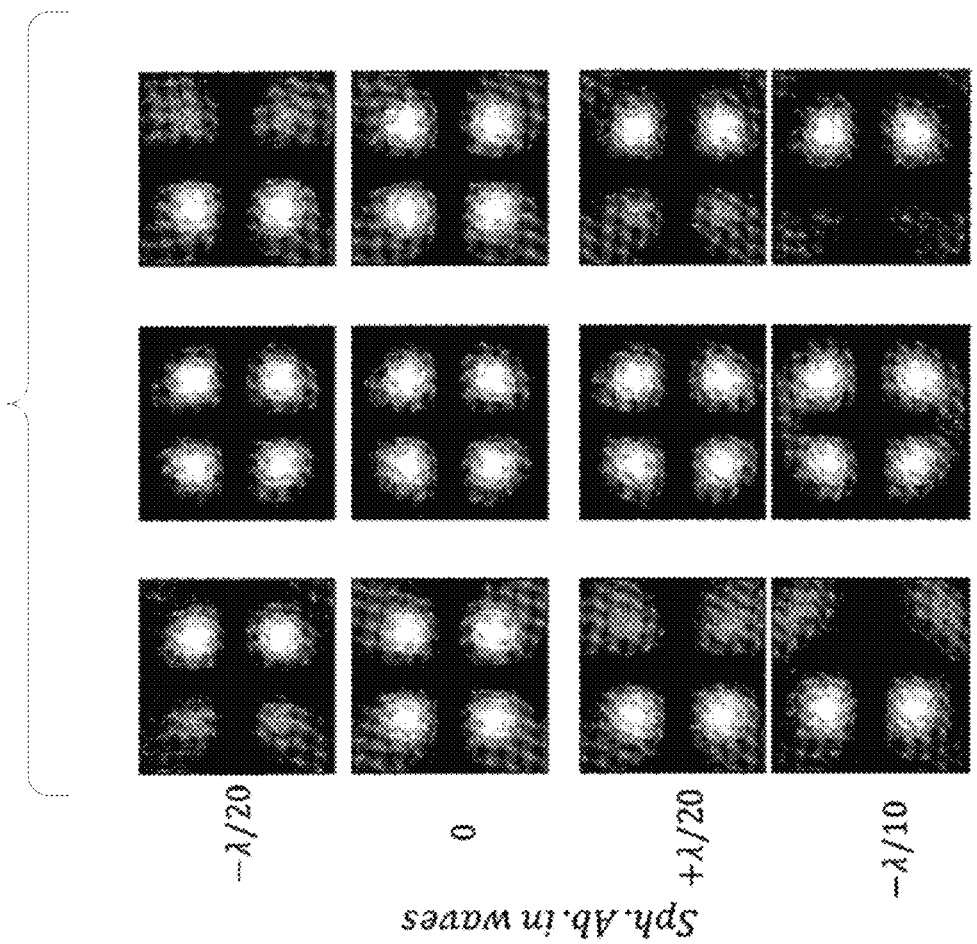

FIG. 12 shows the light distribution obtained, "Four-leaf-clover" distribution in different spherical aberration values.

In all the figures, like reference numerals identify like parts.

DEFINITIONS AND TECHNICAL SUPPLEMENTS

We use the term biological to describe any biological entity in Life Science, regardless of its origin, human, animal or plant and the purpose of his observation, research, diagnosis or treatment. This term includes the medical uses of the technique described. Microscopy is used in the field of biology, for example, to observe, study and measure biological entities (objects) and their dynamics.

By extension, the term artificial Vision will be used to describe all measuring applications, Metrology or observation of objects or elements produced or constructed or made by a human being or machine, for example, to observe, study and measure Semiconductors or to characterise materials.

The usual definitions are used for the description: phase and polarization, polarimetry, vectors and Jones matrices, Stokes parameters and measurement techniques Stokes and Jones parameters.

The usual definitions are used for: optical diffraction limit, Rayleigh criterion, Airy disk and its radius and diameter. We use in the context of the invention, the terms of superresolution, superresolved, superresolution imaging and superresolution microscopy to describe optical data acquisition, optical imaging, microscopy and artificial vision at a resolution higher than the optical diffraction limit. The usual definitions are used for fluorescence and for fluorophores.

The terms longitudinal and axial will be used alternatively to describe the dependence of the light along the axis of propagation, which is referred to as the axis z or longitudinal axis. The term lateral will be used to describe the dependence of light in the axes orthogonal to the optical axis of the system, referred to as the axes x and y.

The usual definitions are used in the description for the mode $TEM_{00}$ of a fiber and the English terms, "Photonic Crystal Fiber"—PCF—, "few modes fiber"—FMF, vortex Fiber and "dual core Photonic Crystal Fiber" for specific fibers.

Reference is made to a device for coupling several lasers having different wavelengths or the same wavelength, with the same polarization or with different polarizations, in one or more fiber optics, using the term laser bank.

The definition of superoscillations is that by Yakir Aaronov and Sir Michael Berry. Superoscillation is a phenomenon in which a signal which is limited overall in bandwidth can contain local segments which oscillate faster than its fastest Fourier components. [26]

The centre or centroid of a light distribution is the centre of gravity of the intensity. The diameter of a light distribution is the diameter of the first zero intensity, both for regular and singular waves, without taking into account the central zero of a singular wave.

Two light distributions are collocated if their centres coincide or are separated by a low spatial value relative to the dimension of the distribution of light.

In this patent application, we use the emission wavelength, as the basic metric system.

In this patent application, the usual definitions are used for the following optical components: lens whose definition has been broadened to include all optical means which transmit, refract or reflect the light, auxiliary optics—optical submodule to interface and adjust either the geometric parameters or the parameters of phase and/or polarization between two other optical sub-modules or modules—, polarizer, analyser, retardation plate, beam splitter, polarizing and non-polarizing, beam combiner, polarizing and non-polarizing.

In this patent application, the usual definitions are used for azimuthal and radial polarizers. This means, implicitly or explicitly, some developments described later for azimuthal and radial polarizers, all polarizing elements variable in space.

In this patent application, the usual definitions, [3] and [38], are used for different superresolution techniques; these techniques can be combined into families:

REversible Saturable OpticaL Fluorescence Transitions (RESOLFT), combining the techniques: Stimulated Emission Depletion microscopy (STED), Ground state depletion (GSD), Saturated Structured Illumination Microscopy (SSIM) and SPEM (Saturated Pattern Excitation Microscopy), Localisation Microscopy, combining the techniques of Photoactivated localization microscopy (PALM), FPALM (3D Localization in Fluorescence Photoactivation Localization Microscopy), Stochastic optical reconstruction microscopy (STORM), dSTORM (direct STORM), SPDM (Spectral Precision Distance Microscopy), "stochastic blinking", Ground state depletion (GSD), and similar techniques (irrespective of the acronym used)
Structured Image Microscopy (SIM)
FRAP (Fluorescence Recovery After Photobleaching),
TIRF (Total Internal Reflection Fluorescence Microscopy).

In this patent application, the usual definitions are used for different techniques of Microscopy, standard resolution or superresolution, fluorescent or not, such as "Computational Microscopy", "Correlative Microscopy", "Cross-platform-microscopy, FCS—Fluorescence Correlation Spectroscopy", FCCS—"Fluorescence Cross-Correlation Spectroscopy", or PCH—Photon Counting Histogram, RICS "Raster Imaging Correlation Spectroscopy" or FRAP—"Fluorescence Recovery after Photobleaching analysis".

In this patent application, the usual definitions are used for the Hough Transform, for the MAP algorithms—"Maximum A Posteriori estimation", LSE "Least Squares Estimation", ICE "Iterated Conditional Expectation". Reference is made to the E-LSE algorithm, "Emitter-Least Square Error3 a new algorithm described in this patent application.

We refer to a partial polarizer to describe a component or a module whose absorption is different for the two linear polarizations—linear dichroism—or for the two circular polarizations—circular dichroism.

We refer to dynamic polarization or phase elements, to describe the optical means, which polarization or phase varies over time in a controlled manner, discrete or continuous.

These dynamic polarization or phase elements include, but are not limited to: rotating on their axes wave plate, light valves based on liquid crystal technology, electro-optical devices, also known as Pockels cells, Kerr cells, for example by using components of PLZT material, electro-optical resonant devices, magneto-optic devices, also known as Faraday cells, acousto-optic or elasto-optic devices or any combination of these means.

Reference is made to dispersive polarization or phase elements to describe elements whereof the polarization state depends on the wavelength. The simplest of the dispersive polarization sub-modules is the multimode or thick wave plate.

We refer to "centroid algorithm" to describe the standard procedure for measuring the centroid and possibly the width (FWHM—Full width Half Maximum) of a light distribution.

In this document, the usual definitions are used for following optoelectronic components: photoelectric detector, CCD, EMCCD, CMOS, SPAD—Single Photon Avalanche Diode and SPAD matrix.

We use the terms:
optical image for the spatial distribution of light intensity,
electronic image to describe the spatial distribution of charges of a CCD, of current for a CMOS, of events or for a SPAD, created by the optical image, at a given moment, in a detection plane,
digital image to describe a matrix of numbers created by conversion of the electronic image.

To simplify the reading and understanding of the text we will use the term image to the output of a single pixel detector such as PMT or SPAD, considering it as an image consisting of a single pixel.

Where no ambiguity exists, or where the distinction between the three types of images is not necessary, we will use the simplified generic term of image.

For the images is used the terminology used for the matrix detectors, such as CCD, EMCCD and CMOS. For SPAD and SPAD arrays, the measurement result is an ordered list in time of photons impact detailing, for each photon, the time of impact and the position of the impact. To simplify the presentation of this document, we will include this case in our definition of images.

The images described in this document, in many cases, may be characterized as microimages, images of size substantially equal to a small number of the Airy disk diameters, typically less than 5 diameters, and/or low number of pixels, typically 4*4 to 32*32.

In a digital image Aj, the indices m and n represent the indices of the pixels, and the origin of the pixels will be selected as the projection of the centre of the analysis volume defined in a later paragraph.

Stokes Vectors Polarimetry

Polarimetry refers to the measurement of the polarization state of incident light. The polarization state of the incident light can be described by the Stokes parameters, a set of values introduced by George Gabriel Stokes in 1852 and used in optics.

Copropagation of Two Optical Beams

Many systems and optical devices uses two beams—or more—having different properties. The beams can interact or not, or be projected sequentially or simultaneously. In the majority of these systems and devices, the two optical paths are separated physically from each other. This physical separation creates, at the level of engineering of the system a set of constraints, which although resolvable, substantially emphasise the complexity of the system and its cost. Reference is made to systems of common path, to reference a set of devices in which the two differentiated beams spread along the same physical path, at minor variations.

In this invention, by extension, reference will be made to systems of almost common path to reference a set of devices in which the two differentiated beams spread along the same physical path but separate and rejoin in an optical module, the optical path in the optical element being negligible relative to the total optical path. This definition introduces the case of an optical module, containing a polarization separator monitored at a short distance by an element combining the two polarizations, or any similar element. The introduction of such a module does not significantly modify the functionality and the advantages of a common path system. Throughout this invention, for clearer understanding when a common path system is referred to it will include the case of an almost common path system.

Electric Field in Polar Coordinates and Angular Modes $$E(\rho,\theta)=A(\rho,\theta)\times\exp[i\varphi(\rho,\theta)]u(\rho,\theta) \qquad (\text{EQ. 1})$$

It is customary in Optics to decompose the field components, i.e. its amplitude, phase and polarization in orthogonal modes, Cartesian or polar.

Many decompositions in orthogonal polar modes, such as Gaussian, Hermite-Gaussian, HGG and "Elegant" and Laguerre-Gaussian modes, are known to those skilled in the art.

We mainly use in this paper, the decomposition of the amplitude of the field.

Singular Waves

This research topic in optics, initiated by the seminal article by J. F Nye and M. Berry in 1974 [4], is now known as "singular optics". Examples of regular and singular waves are presented in the following.

The term beam shaping is used to describe the transformation of a wave in given form and topology into a wave of another form or topology, and in particular transformation of a regular wave into a singular and vice versa.

Topology and Compact Light Distributions

A point-source light distribution will be considered compact if it satisfies one of the conditions of compactness defined below, as two alternative and not exclusive conditions:
- either more than 75% of the energy is contained in a circle of radius less than 1.75 times the radius of Airy,
- or a light domain, defined by a line of zero intensity and containing more than 65% of the energy is within a circle of radius less than twice the radius of Airy, We distinguish different families of point light distributions, of different topologies:
- Regular distributions in their usual definition in Optics,
- Singular distributions or waves, otherwise known as optical vortices, of topological charge (azimuthal order) l, where the phase varies from 0 to $2\pi l$ around the direction of propagation, l being an integer,
- Amplitude distributions with azimuthal variation of order f, also referred to as Laguerre-Gaussian distribution,
- Polarization, and optionally phase distributions, with azimuthal variation of order referred to as radially polarized Laguerre-Gauss modes.

Two compact light distributions will be deemed being of different topological families if they meet at least one, and any of the following conditions:
- One is regular and the other is singular,
- One is point-source and the other is a ring-source,
- Azimuthal orders l of the amplitude of the two different light distributions differ,
- Azimuthal orders l of the polarization or the phase of the two different light distributions differ.

Alternatively, two light distributions projected onto a given volume will be considered of different topologies if a significant portion of the surface illuminated together, the gradients are of reversed direction.

Light Nanoemitters

A light nanoemitter is a small secondary emitter attached to an object, and it is significantly smaller than a fraction of a wavelength, typically but not limited to a size smaller than one fifth of the wavelength; a light nanoemitter absorbs the incident energy and re-emits light at the same wavelength as the incident light or different wavelengths; the light emitted by the nanoemitter may be coherent, partially coherent or incoherent with the absorbed light. The main examples of nanoemitters are fluorophores and nanoparticles, but also include many other elements.

The definition in the context of the invention of nanoemitters light is determined by the following two conditions:
- creating a secondary point-source light emitter, and
- predetermined positioning of the emitter with respect to an artificial, biological or organic entity.

The physical mechanisms that can create a nanoemitter are numerous, and include but are not limited to absorption, scattering or reflection, fluorescence, emission-depletion, [5], for example using RESOLFT, photo activation phenomena and photo depletion techniques, fluorescence of two or more photons, or non-elastic scattering, Raman scattering, or any other physical mechanisms known to those skilled in the art. We use the term light emission to describe the emission of electromagnetic waves by a light nanoemitter, the light being coherent, incoherent or partially coherent.

We extend our definition of nanoemitters by including scattering particles, absorbent or reflective, attached to a biological or organic entity; the action of a scattering, diffusing, reflecting or absorbing particle on the electromagnetic field can indeed be described, for an absorbing particle, following Babinet's principle, as a creation, with a reverse phase of an auxiliary secondary field emerging from the particle, superimposed on the incident electromagnetic field.

We refer to in this patent application to descriptors of a single nanoemitter to denote the set of information describing a nanoemitter as a point source at a given moment. Since the nanoemitter is considered as a point source, all the information representing it contains a limited number of parameters, namely: its position in space, its intensity, its spectral characteristics of the intensity, coherence, phase and polarization of the light emitted by the fluorophore as a function of the incident light.

Reference is made in this patent application to the descriptors of a structured object. For example, for a uniform line, all of the information representing it contains a limited number of parameters, either its orientation in space, its intensity, spectral characteristics, intensity, coherence, phase and polarization of the light emitted by the object, as a function of incident light.

For continuous distribution, the object is represented, as usual in image processing, by a matrix of intensities.

However, in most cases, and in the description of the invention, we refer, under the designation of descriptors, a subset of descriptors of a nanoemitter or of a single geometric object, including its geometric position, its intensity, and the type of fluorophore, whether several populations of light nanoemitters, differentiated for example by their emission spectrum, are present in the same sample. This simplification used in the description does not alter the scope of the invention which will include in its scope all the descriptors of light nanoemitters.

To simplify the understanding of the context of the invention, the following description refers only the simplest case, one in which the nanoemitter is a fluorophore and physical interaction is the one photon fluorescence. However, this description should be understood as a simplified illustration of a general description of the methods and concepts applicable to all light nanoemitters mentioned previously or known to those skilled in the art, regardless of the underlying physical phenomenon.

It is striking that the nanoemitter samples the incident light intensity field at a three-dimensional position accurately without influence of the complete spatial distribution of the incident intensity. We will reference this remarkable property in this patent application as the sampling ability of light nanoemitter.

However, the embodiment of the invention as described also measures structured objects and continuous distributions having no sampling capacity of the light nanoemitter.

Figure 1:
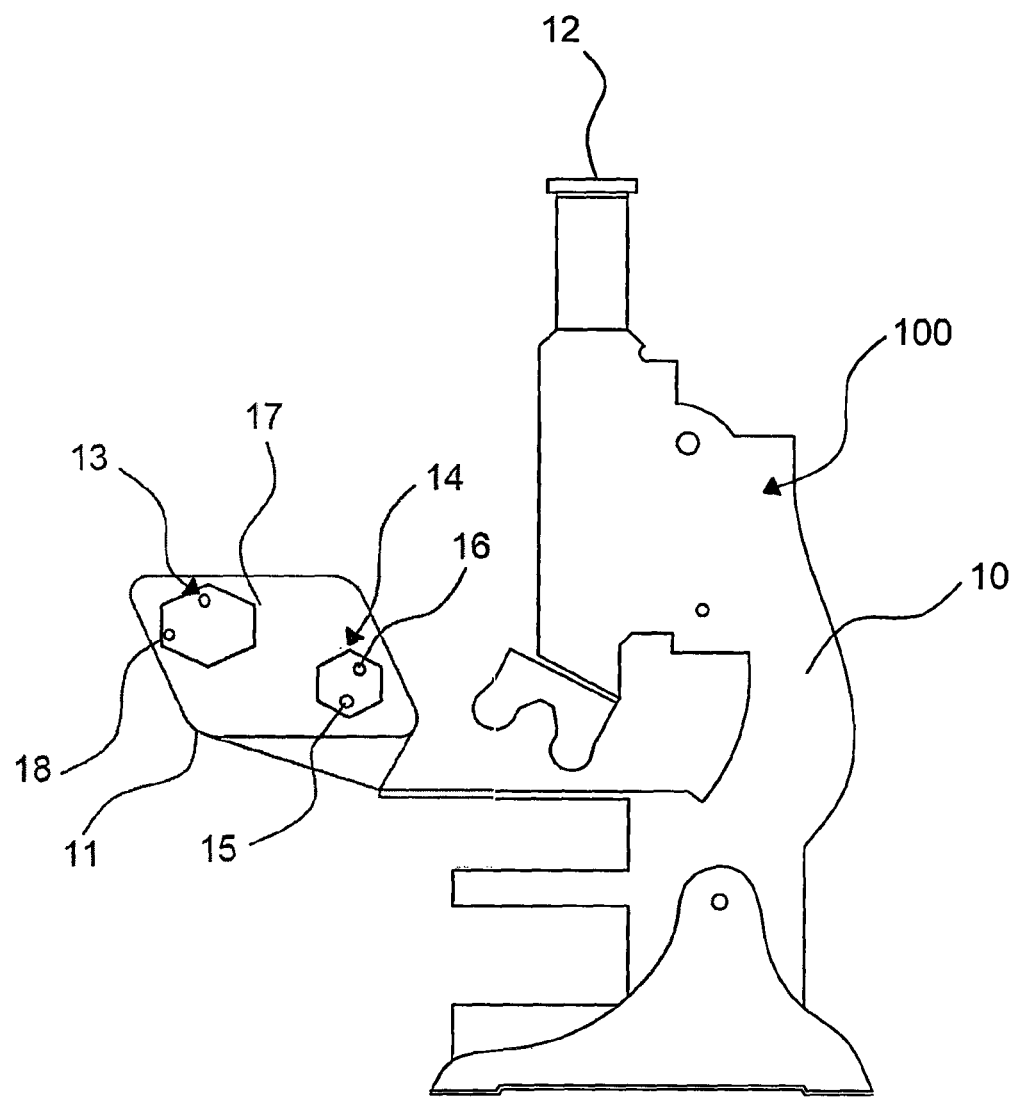

We refer again to the FIG. 1 which represents a set of nanoemitters or structured objects positioned on a given biological object, 15 and 16 on the one hand and 17 and 18 on the other hand. Alternatively, the light emitted can consist of continuous distribution, not shown in FIG. 1, or in any combination of nanoemitters, structured objects or continuous distributions. The set of nanoemitters, structured objects or continuous distributions is referenced as a set "bright biological objects", they represent a map of the biological object, in the sense defined by Alfred Korzybski in general semantics. However, it is common practice to simplify the description, reference the object as the luminous-biological object itself, when no ambiguity can arise. The luminous biological object contains information that is relevant to the biological object, mainly spatiotemporal information, the object position and orientation with respect to time, and morphological information, for example in the case of division of a cell in two.

The measurement system according to at least one embodiment of the invention will calculate the measured map, and carry out evaluation of the descriptors of any combination of nanoemitters, structured objects or evaluation of the spatial distribution of continuous distributions. This measured map differs from the original map, due to noise, measurement conditions, the system limits or measurement uncertainty. This information of the measured map can be developed later into different levels of abstraction. This first level of abstraction, which presents the results of direct measurement, contains a priori no biological information but is the results of a physical measurement described by nanoemitters, by structured objects or by continuous distributions which could also represent any marked entity.

The second level, the geometric level of abstraction, structures nanoemitters of structured objects or continuous distributions in the form of geometric objects. It comprises a description of luminous objects and their dynamic characteristics, such as their position or orientation, or their morphology. At this level, the information is still physical and geometric information describing a set of objects. The geometrical information uses the measured card and auxiliary information, potentially external to the system, the relation between light spots and objects.

The biological level of abstraction, allows some understanding of the biological reality through a constitutive relationship between objects measured and corresponding biological entities. It contains a set of information on the biological object, mainly the position and its dynamics, its shape and morphology. The biological information uses the measured card and the geometrical information and auxiliary information, potentially external to the system, the relation of the light spots and objects with biological entities. A number of conclusions on the biological functionality of the sample can be obtained at this level.

The level of functional abstraction allows apprehension of the biological reality. It consists of functional information, decorrelated from geometric information, and responding to interrogations in terms and biological jargon, such as: "has the virus penetrated the cell?".

An additional level of information can be defined including the control and instrumentation process; in fact, a more evolved control and instrumentation process can be defined to reach more structured biological information, via automation of the process of data acquisition. An example of such processes is described by Steven Finkbeiner, under the name of "Robotic Microscopy Systems".

This description of levels of abstraction, defined in this application, has been redacted, for the sake of simplicity, for Biology. It is applicable, mutatis mutandis, to all fields of Vision, biological and medical, artificial and industrial.

Conic Diffraction

Conical diffraction or refraction is an optical phenomenon predicted by Hamilton [6] in 1832, and two months later confirmed experimentally by Lloyd [7]. Conical diffraction describes the propagation of a light beam in the direction of the optical axis of a biaxial crystal.

In fact, in a biaxial crystal, the optical axis is positioned in the plane created by the crystallographic axes x and z; the angle relative to the axe z is 00, depending on the three indices of refraction as per the law, $$\tan\theta_0 = \sqrt{\frac{n_1^{-2} - n_2^{-2}}{n_2^{-2} - n_3^{-2}}}.$$

Hamilton predicted that the light emerges in the form of a hollow cone of rays. Conical refraction is an important phase in the history of science and has played a role in the demonstration of the theory of electromagnetic waves.

A renewed interest in the conical diffraction occurred in the last years of the twentieth century has led to a complete theory by Berry et al. [2], validated experimentally in 2009 [8]. Here we follow the theory, terminology and definitions of Berry, including, from this point, the name change of the physical effect, using the more rigorous term of conical diffraction.

However, it is important to note that the term "conical diffraction" is also used for two other techniques not relating to the technique we describe:

Oblique incidence diffraction is also called conical diffraction

"Conical diffraction mounting" references mounting a diffraction network in which the network is mounted on a curved surface.

Conical diffraction has attracted considerable theoretical and experimental, but "no practical application seems to have been found", [9].

Historically, conical diffraction was observed in biaxial crystals. We refer to a conical crystal to describe a biaxial crystal inorganic or organic, exhibiting the phenomenon of conical diffraction. Some non-limiting examples of biaxial crystals include Aragonite, KTP, KTA, KBiW, LBO, KNbO3, MDT, YCOB, BIBO, DAST, POM, NPP, LAP, and LiInS2 LiInSe2.

Other effects exist, creating either inherently weaker conical diffraction effects or creating slighter conical diffraction along a shorter optical path. However, these effects can be used within the scope of the devices described. These effects include polymers, liquid crystals and induced externally birefringence effects. The polymers include but are not limited to: stretched polymer sheets and cascade polymerisation, [10]; liquid crystals include but are not limited to: thermotropic biaxial nematic phase, [11]; the external effects induced birefringence include, but are not limited to: applying an electric field creating an electro-optical effect on a non-centrosymmetric cubic crystal, and the photo-elastic modulator.

The phase in the vortex created by conical diffraction is a geometric phase and is therefore intrinsically achromatic.

The additional chromatic effects are dispersion of the optical axis and dependence on the different parameters present in the equations of conical diffraction as a function of the wavelength.

The dispersion chromatic of the optical axis creates an angle of the optical axis of the crystal, dependent on the wavelength, relative to the optical axis of the system. It is due, in the majority of cases, to dispersion of the refraction indices.

The refraction indices depend on the wavelength, as per Sellmeier equations. The angle of the optical axis varies therefore as a function of the wavelength, and it creates an angle of chromatic inclination of the optical axis in the plane created by the crystallographic axes x and z.

It depends considerably on the type of crystal. In an MDT crystal, the least dispersive crystal in the visible spectrum, the direction of the optical axis varies by less than 0.1 degrees between 540 nm and 700 nm. In a KTP crystal, the most achromatic crystal in the telecommunication IR, the angle varies by 0.05 degrees, between 1.350 nm and 2.100 nm, and less than 0.02 degrees on the telecommunication window—1450 nm to 1650 nm. On the other hand, angle $\theta_0$ can vary considerably as a function of the wavelength in some organic crystals such as DAST.

The compensation of chromatic dispersion of the optical axis can be carried out using the geometric optic. The chromatic dispersion of the direction of the optical axis can be compensated by using the natural dispersion of glass or other optical materials, or by using networks or prisms. The achromatisation procedure does not differ, in this case, from the standard procedure of correction of any chromatic aberration on geometric optics. This procedure can be designed and optimised using one of the commercial optical software packages available in defining adequate target functions.

A different achromatisation concept is based on the use of two different materials, having effects of inverse conical diffractions, at high and low chromatic dispersions.

The dependence of different parameters present in the equations of conical diffraction as a function of wavelength modifies the parameters of efficacy of the effects of conical diffraction.

For conical linear crystals, defined later, the fundamental transfer function is identical to the unit and trivially independent of wavelength. By contrast, the vortex transfer function depends on the wavelength and can be shown by a chromatic factor equal to $\tau(\lambda)$.

For sinusoidal conical crystals, defined later, the behaviour is different to that of conical linear crystals: the fundamental wave depends on the wavelength and the wave vortex is almost independent of the latter. In fact, simulations show that the form of the wave vortex is modified only slightly by a variation of the parameter, $\theta_0$ from 0.5 to 0.75. By contrast, the form of the fundamental wave depends on wavelength and this effect must be taken into account in the design of systems using the two waves, fundamental and vortex.

Figure 3:
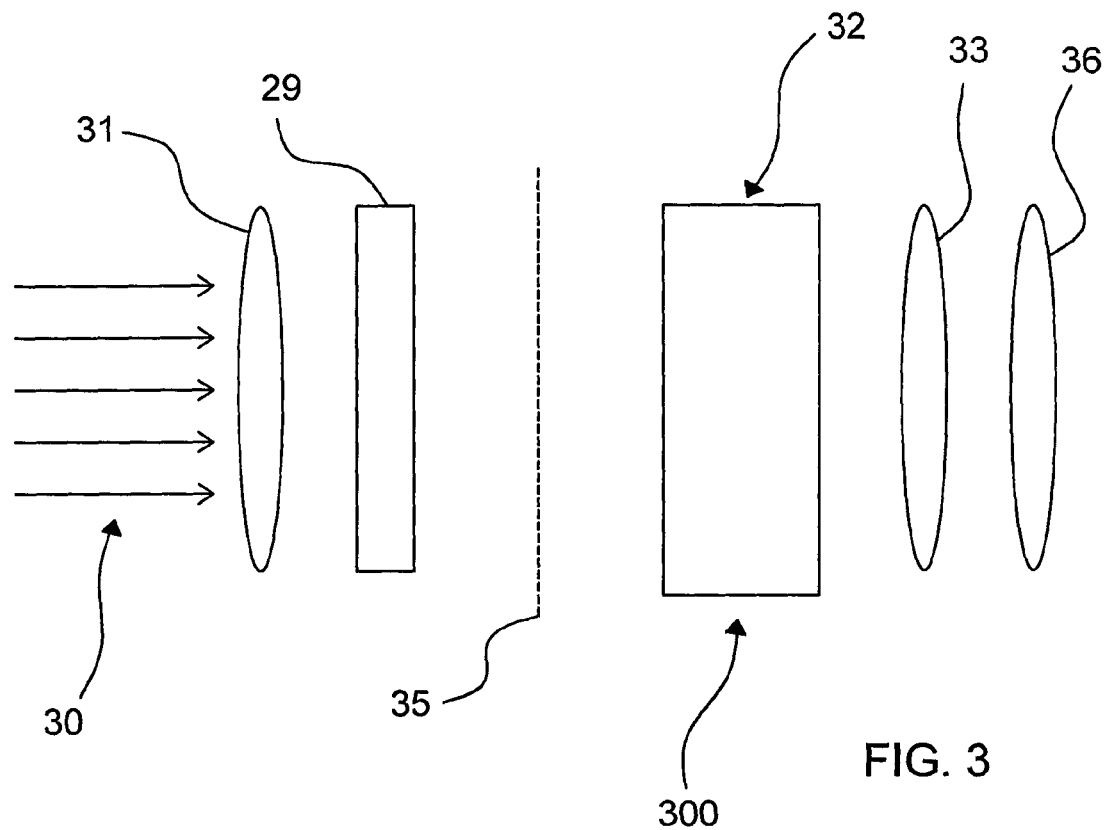

We refer now to FIG. 3, which is a simplified schematic illustration of a configuration of a conical diffraction module 300, in accordance with an embodiment of the present invention.

Incident light, 30, is assumed to be collimated, although other conditions can be adapted using simple optical means.

The setup itself comprises a first lens 31, a conical crystal 32 and an optional lens 33. The first two lenses 31 and 33 are preferably configured in the form of a Kepler telescope 1:1. The numerical aperture of the first lens 31 in the image space, represented below by $U_0$, determines the parameters of the conical [diffraction] effect through the conical radius, defined below. An imaging plane conical, 35, is placed in the focal plane of the first lens 31, a polarizer or a partial polarizer part 29, described above, may also be added. However, in some optical systems where incident light is already polarized this element is unnecessary. A focusing lens, 36, determines the size of the final light spot. It can be a microscope objective external or can be merged with the second lens 33, as implemented in another embodiment of this invention. The distribution of the light projected on the sample is in a first approximation, neglecting the vectorial effects, a reduced image of the light distribution in the image plane. The influence of vectorial effects will be discussed below. The scale ratio or the magnification is determined by a microscope objective.

Given the spatial variable, R, the conical imaging plane, and the wave vector, U, represented by cylindrical coordinates R, $\theta_R$ and U, $\theta_U$ and given $\lambda$, the wavelength of light.

The behaviour of the electric field emerging from the conical crystal 32 is fully characterized by a single parameter, the radius conical Ro; the conical radius depends on the material and the thickness of the crystal.

We introduce standardized parameters for the description below of the light distribution, to be valid in both conical imaging plane and at the focus of the microscope objective, in the limits of the scalar theory of diffraction. An example of introduction of the standardised parameters is described in reference [2].

The normalized radial position, $\rho$, the wave vector normalized, u, represented by cylindrical coordinates by $\rho$, $\theta_R$ and u, $\theta_U$, and the normalized radius conical $\rho_0$ are given by:

$$\rho = 2\frac{R}{\lambda}U_0, u = \frac{U}{U_0}; \rho_0 = 2\frac{R_0}{\lambda}U_0 \quad \text{(EQ. 2)}$$

$U_0$ is the numerical aperture of the system.

Different regimes exist for all volumic optical diffraction effects of minimal interaction. The volumic diffraction effects of minimal interaction have the following properties:
modification of incident light is created by perturbation of Maxwell equations,
the scale of the interaction far greater than the wavelength, typically over 10 µm.

The fact that these different regimes create totally different optical effects has been studied mainly for acousto-optical interactions, but is present in all optical effects, including conical diffraction. Terminology adapted from works by Raman on acousto-optics will be used and the following cases will be differentiated:
$\rho_0 \leq 1$, linear Raman Nath regime, referenced earlier, [37], "linear thin conical crystal", in which a simple surface approximation of the effect can be used,
$\rho_0 \leq 1$ and $>0.5$, sinusoidal Raman Nath regime, referenced earlier, [37], "sinusoidal thin conical crystal", in which a surface approximation of the effect can be used,
$\rho_0 \leq 3$ and $>1$, intermediate regime, referenced earlier, [37], "average conical crystal", in which complex effects couple the effects of Raman Nath regimes and the Hamilton-Lloyd regime to be described later on,
$\rho_0 \geq 3$, regime to be called Hamilton-Lloyd regime referenced earlier, [37], under the name of "thick crystal", similar to the Bragg regime in acousto-optics, in which the effects described by Hamilton and Lloyd are present. Only the crystals of the Hamilton-Lloyd regime, or thick conical crystals, $\rho_0 \geq 3$, can be described by the Hamilton theory and have the particular feature of spreading beams inside the crystal in the form of an "obscure cone", or "conefringent", diffracting in the form of a cone, a term used by some authors.

Since 1832 Hamilton [6] had already noted this condition on the amplitude of the effect of biaxial crystals, necessary for validity of his description of conical refraction, by showing the necessity of "sufficient biaxial energy".

"29 New consequences of Fresnel's principles. It follows from those principles, that crystals of sufficient biaxial energy ought to exhibit two kinds of conical refraction, an external and an internal: a cusp-ray giving an external cone of rays, and a normal of circular contact being connected with an internal cone».

The wave emerging crystal thin conical, $E(\rho, \theta_R)$, expressed in normalized coordinates for a wave circularly polarized, is constituted by the superposition of two waves, referred to herein as the fundamental wave, $E_F(\rho)$, a regular wave, and vortex wave, $E_V(\rho,\theta_R)$, a singular wave; these two waves are coherent one with another, collocated, and circularly polarized with an inverse direction of chirality:

$$E(p, \theta_R) = \quad \quad \quad \quad \quad \quad \quad \quad \quad \quad \text{(EQ. 3)}$$

$$E_F(\rho) + E_\nu(\rho, \theta_R) = E_F(\rho)\begin{pmatrix} 1 \\ -i \end{pmatrix} + F_V(\rho)\exp(-i\theta_R)\begin{pmatrix} 1 \\ i \end{pmatrix}$$

In this equation, $E_F(\rho)$ is the scalar fundamental amplitude, $F_V(\rho)$ is the reduced scalar magnitude of vortex and they are given by:

$$E_F(\rho)=2\pi\int u\,\cos(\rho_0 u)J_0(\rho u); F_V(\rho)=2\pi\int u\,\sin(\rho_0 u)J_1(\rho u). \quad \text{(EQ. 4)}$$

For a thin linear conical crystal, the fundamental wave can be approximated by an Airy disk and the vortex wave can be approximated to a linear vortex, represented by:

$$F_V(\rho)=2\pi\rho_0\int u^2 J_1(\rho u). \quad \text{(EQ. 5)}$$

Assuming that the action of partial polarizer, 29, is the scaling of the vortex wave by a parameter α, the Stokes parameters can be deduced from the above equations, β being the angle of the linear polarization:

$$S_0=(E_F(\rho))^2+(\alpha^2 F_V(\rho))^2$$

$$S_1=2\alpha E_F(\rho)F_V(\rho)\sin\theta_R; S_2=2\alpha E_F(\rho)F_V(\rho)\cos\theta_R;$$

$$S_3=(E_F(\rho))^2-(\alpha^2 F_V(\rho))^2$$

$$\beta=\theta_R; \quad \quad \quad \quad \quad \quad \quad \quad \quad \quad \text{(EQ. 6)}$$

As described previously, the wave emerging from the conical crystal, for a wave polarized circularly, consists of superposition of two waves, the fundamental wave, a regular wave, and the vortex wave, a singular wave. All incident beams of homogeneous polarization can be decomposed on the orthogonal base composed of circular right and circular left polarizations. The incident beam is therefore the coherent superposition of two beams, one polarized in circular right polarization and the second in circular left polarization. The emerging beam is the coherent superposition of four beams; two fundamental waves, the first created by the beam polarized in circular right polarization and the second by the beam polarized in circular left polarization and two vortex waves created by the beams polarized in circular right and left polarization. However, if the two fundamental waves have the same spatial distribution and can interfere but retain their topology, the two vortices have opposite chiralities and create complex distributions. Different combinations of these waves can be made by selecting polarizations at input and output, which produces PSF of different forms.

Sparse Object

We use the terms of "sparse object" to describe either a set of sparse emitters, or parsimonious, specific light emitters, or a set of sparse objects, sparsity being defined in the references [41-43] and not being limited to specific objects but including filaments, for example. For sparse emitters, the selected limit is a number less than twelve, positioned in a volume whose size in each dimension is less than 3 wavelengths, at the wavelength of transmission or at the wavelength of the reflection of the emitters. The volume of a size less than 3 wavelengths that contains the sparse object is referred to as an analysis volume of reduced size.

We will use the term of continuous object to describe a set of light point or continuous emitters which do not fulfil the conditions described earlier in the definition of the sparse object. The transition between these two regimes is not straightforward and many experimental cases will be intermediate cases between these two types of object.

Figure 4A:
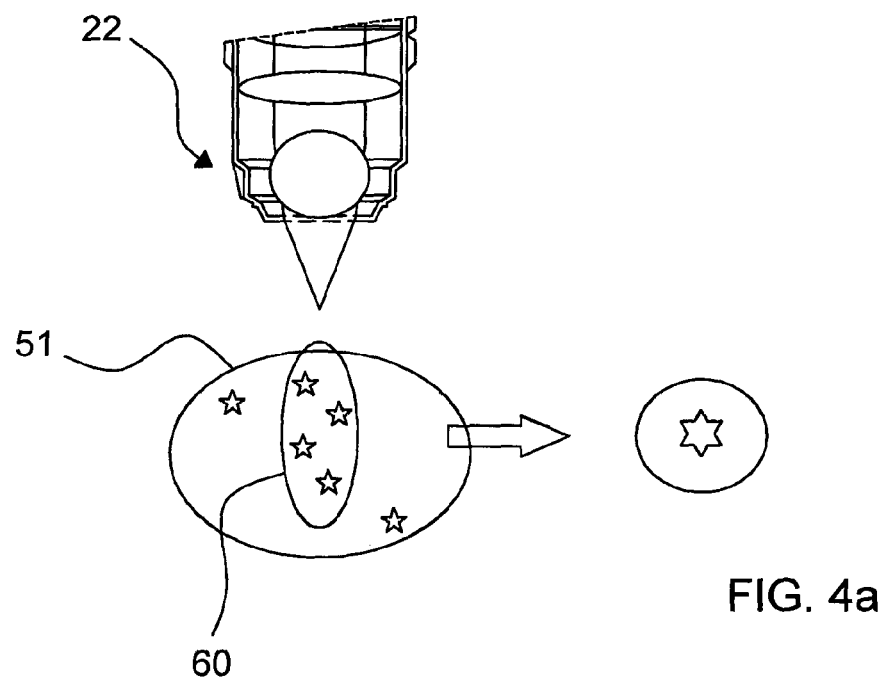
Figure 4B:
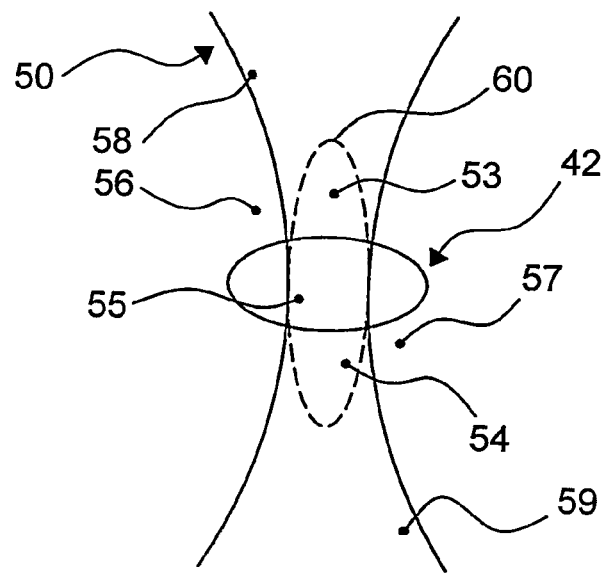
Figure 4C:
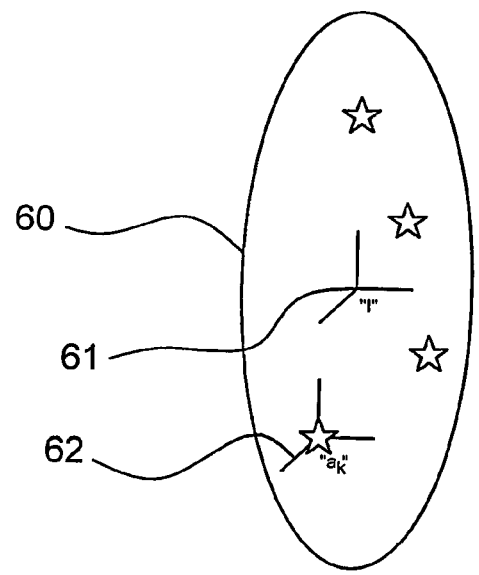

We refer now to FIGS. 4a to 4c, which are a simplified representation of the concept of volumic containment in the confocal microscope.

The functionality of the volumic containment is limited in all three spatial dimensions, the observed region of the sample volume to a size as small as possible, analysis volume. The functionality of the volumic containment limits the analysis volume by the combination of two effects: the confinement of the light projected onto a small area, ideally the size of the Airy spot, 50, and the elimination of defocused light by the confocal hole, 28, of FIG. 2. The superposition of these two effects creates a small volume, the analysis volume, 60. This volume determines the size of the elementary region detected by the system.

Figure 2:
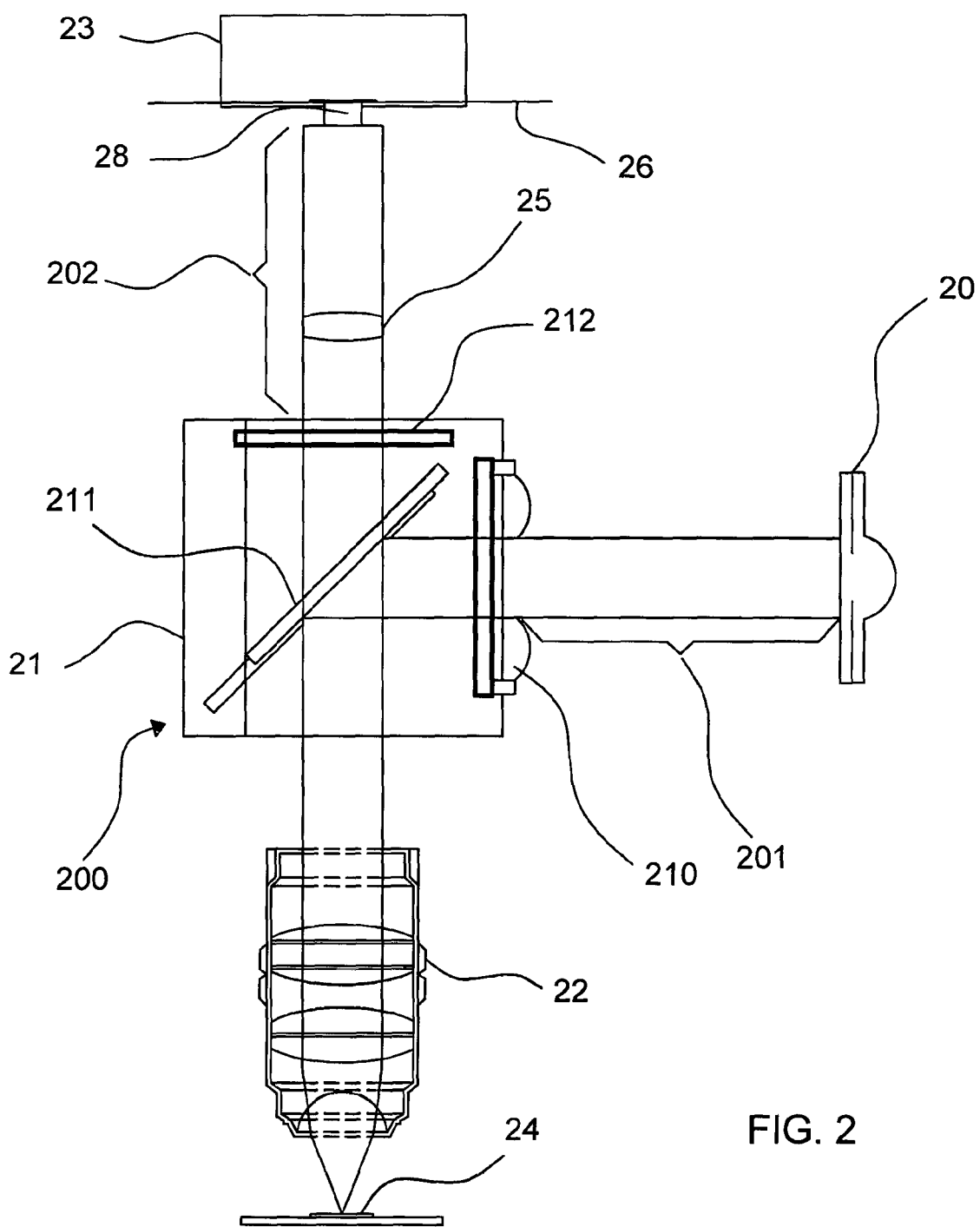

Consider a sparse or continuous object, 51, consisting of a plurality of nanoemitters, 53 to 59. The nanoemitters from 53 to 55 positioned in the test volume 60, and only they are both excited by the light source and the photons emitted by them arrive at the detector module. The nanoemitters not located in the cone of illumination, 56 and 57 are not illuminated by the incident light. The light emitted by the nanoemitters 58 and 59, located at the conjugate plane of the confocal hole, 28 of FIG. 2, is blocked almost entirely by the confocal hole, 28 FIG. 2.

Two different Cartesian coordinates are defined in the system, FIG. 4c:

The reference "i": The axes referenced "i" represent a Cartesian reference system centred on the centre of the analysis volume, 61.

The reference "a": the axes referenced "a" represents a Cartesian reference centred for each light nanoemitter on the nanoemitter considered as a discrete point, 62.

When using another embodiment of the invention, described later, if a vortex is projected on the sample being analysed, the centre of the vortex will be generally defined as the centre of the analysis volume.

At least one embodiment of the invention uses conical diffraction to realize the fundamental optical modules of the technique. However, alternative implementations, replacing the modules based on conical diffraction by modules based on other optical concepts, are able to provide the same functionality. They are intrinsically part of the scope of this invention. Alternative optical concepts include but are not limited to uniaxial crystals, sub wavelength gratings, structured laser modes, holographic components and other techniques known to those skilled in the art.

The concepts, techniques and optical and optoelectronic devices are described for example in the book written by D. Goldstein, "Polarized Light", [12], the "Handbook of Confocal Microscopy", [13], "Handbook of Optics", [14].

Optical Semaphore

In this embodiment of the invention we use the term optical semaphore to describe an optical, passive or active element capable of channelling incident light to different channels or detectors as a function of a property of light. The simplest case is a dichroic blade which separates the light into two channels as a function of wavelength.

In this embodiment of the invention we use the term, "Position dependent Optical Semaphore"—PDOS—or optical semaphore dependent on position—to describe an optical semaphore which channels light as a function of the position of the emitter point. The PDOS will be determined by a series of transfer functions, Ti(x,y,z) dependent, for each channel or detector i, on the position of the emitter (x,y,z), in a reference volume. The order of the PDOS will be the number of channels or detectors. The PDOS will be "lossless", in an analysis volume, if the sum of the transfer function, Ti(x,y,z) is equal to the unit in the analysis volume.

The confocal hole, described by Minsky, [15], could be considered in this embodiment of the invention as a degenerated PDOS of order 1.

In the majority of cases dependence of the PDOS is a complex function of the lateral and longitudinal positions. However, in embodiments of the invention we use the term, "Longitudinal Position dependent Optical Semaphore"—LPDOS—or optical semaphore dependent on the longitudinal position—to describe an optical semaphore which channels light as a function of the longitudinal position of the emitter point. The LPDOS will be determine by a series of transfer functions, Ti(z) dependent, for each channel or detector i, on the longitudinal position of the emitter (z), in a reference volume. The order of the PDOS will be the number of channels or detectors. The LPDOS will be often coupled to a stop, limiting the lateral field of the system.

Transmission by Fiber Optics

A main use of fiber optics is the exclusive transmission of the $TEM_{00}$ mode. However, some configurations of fiber optics such as FMF or vortex Fibers, mainly but not exclusively based on fibers called "Photonic Crystal Fiber"—PCF—and fibers called "vortex fiber allow simultaneous transmission or not of more complex modes, including vortex modes, having equal vorticity or less than 2. It would therefore be possible to deport the optical distributions created by conical diffraction by means of fiber optics, allowing major simplification of the optical system.

The possibility of deporting the optical distributions created by conical refraction by means of fiber optics allows application of the embodiments of the invention to many additional applications, for example but not limited to gastric or gastroenterological observation, and to observation of the colon and urinary tracts.

Also, some fibers "dual-core photonic crystal fibers", [16], allow interaction between two modes, one of them being a vortex, and providing an additional physical mechanism to create diversified transfer functions.

Measurements of Several Wavelengths

In embodiments of the invention, the object can be lit by monochromatic light and by using for example a classic laser or a monochromatic lamp. Also, in some configurations a broad-spectrum laser—called "white laser" can be used. This configuration is simple, since one of the main parameters of the system is fixed and clearly determined. However, in other embodiments of the invention the object can also be lit by several wavelengths, either discretely using several lasers for example, or continuously using a lamp or a laser having a wider spectrum for example.

Many existing superresolution systems measure simultaneously or sequentially at several wavelengths. In fact, it is possible to mark similar or different elements with fluorophores having different spectral, responses so they can be recognised and separated. It is important to present the two different cases:

The use of fluorescent markers, emitting at two different wavelengths, excited by the same wavelength;
The use of fluorescent markers emitting at two different wavelengths or the like, excited by two different wavelengths.

It should be noted that in the case of the use of fluorescent markers, emitting at two different wavelengths, excited by the same wavelength, the problem of recalibration between the measurements of a wavelength relative to the second, are intrinsically inexistent since the superresolution position information is derivative of the projection of light, which is perfectly identical for the different wavelengths.

This allows relative calibration of the position of fluorophores at two different wavelengths, with precision limited only by the experimental calibration system, eliminating the major problem of recalibration between two images of different wavelength.

The possibility of achromatising optical systems based on conical diffraction makes a tool of choice for implementation of optical systems, of common path, in many applications, and more particularly for embodiments of the invention described.

Achromatisation is also possible for optical systems based on uniaxial crystals, and for almost all alternative implementations of this invention, with, for each of them, almost more or less substantial complexity.

Other existing fluorescence systems uses light having a wider spectral content to reduce artefacts, and principally the effects of speckle.

Equally, the spectral properties of fluorescent proteins measure the potential of intracellular molecular interactions by using the Förster energy transfer technique—Förster (Fluorescence) Resonance Energy Transfer (FRET).

In some implementations of PSIT systems the light of an incident laser beam or beams is separated by means of a light separator into two beams, the main beam which will accomplish the functionality of the PSIT system and an additional low-intensity beam used to measure the position of the laser beam by means of a camera or a position detector. This device measures highly precisely and in real time the position of the laser independently of any wobble error or other mechanical error.

Information a Priori and Complementary Information

Embodiments of the invention described enable integration and merging of additional information external to the platform described, optical or contextual, to obtain improvement in precision of information taken from the sample for any one of the cited levels of abstraction: map, the geometric level of abstraction, the biological level of abstraction and the functional level of abstraction.

More generally, spectral diversity, information obtained at several wavelengths, polarization diversity, and information obtained by projecting different states of polarization, expands the extent of available information.

The fact that the absence of energy, for example in the case of the zero of the vortex, is pertinent information, opens additional possibilities to the acquisition of information without "cost" in a number of photons. This situation has major importance for detection of low fluorescence phenomena, such as for example self-fluorescence.

One of the modalities described for some embodiments of the invention will be referenced by the name dark tracking.

We introduce the concept of optical integral information, information which could be retrieved from optical measurements or by electromagnetic waves, on a target, by an observer, from a given viewpoint. This information contains many parameters of the object, related to its position, the materials which comprise it, its temperature, or its orientation.

Optical integral information on the contrary does not contain information on regions of the object having no optical path to the observer, for example an element positioned in an opaque box, or physical information which has no optical transcription.

Superresolved Measurements and Diffraction Limit

It has been long considered that optics intrinsically limited resolution of any optical system, via the diffraction limit. The appearance of superresolution techniques—in different fields and under different names—has shown that it is possible to exceed this diffraction limit, by different means.

Embodiments described in this invention, such as detection of the presence of two points of the same intensity, by projection of a vortex at the centre of gravity of light distribution created by the fundamental wave, are not limited in resolution a priori and could ideally—with an infinite number of photons—obtain any resolution, as will be described later for a specific case.

Use of Non-Linear Interactions in Superresolution and Family of RESOLFT and STED Techniques The use of non-linear interactions in a material medium between two light beams was proposed in 1994 by Hell, [5] and [17], as the basis of a superresolution system. Many different techniques flowed from the works of Hell to create several families of techniques, such as RESOLFT and "localization microscopy". Several reviews of these techniques have been published ([1] or [38]).

These non-linear interactions include, though are not limited to, interaction phenomena having two photons, emission-depletion, blinking and photoactivation effects on which are based the RESOLFT technology family and the family of "localization microscopy" technologies.

The family of RESOLFT technologies is well known and is described in several references, such as the article initial by Hell [5] and the initial patent [17], or by Schermelleh et al. [1], or in recent publications, Vicidomini et al. [18], or by Willig et al. [19].

In the STED technique described in the initial article by Hell [5], two beams are projected sequentially onto the object: a standard excitation beam, modelled in most cases by distribution of light described by an Airy function, and a depletion beam—having a doughnut or vortex form; the effect of depletion is to prevent fluorescence of fluorophores found on the surface of the distribution of depletion light, but not modifying emission of fluorophores positioned at the centre of the distribution of light outside the distribution of depletion light; this creates distribution of equivalent emission light smaller than the distribution of initial excitation light. This technique has produced equivalent distributions of emission light of very small size, but needing considerable light depletion energies.

Several variants of STED have been developed: "CW STED", [20], "gated STED", [21], and "modulated STED", [22]. In CW STED the pulsed laser used in the first version of STED is replaced by a simpler continuous laser. In "gated STED" emitted photons are discriminated as a function of their emission time for moving away emitted photons from fluorophores not having received during enough time the depletion beam; "modulated STED" uses an excitation beam modulated in intensity, in combination with synchronous detection dependent on modulation frequency. This discriminates the signal fluorescence created by the excitation beam of the residual fluorescence caused by the depletion beam.

Another variant, proposed by Gould et al. [45], uses a SLM for creating either separately or jointly the lateral and/or axial depletion distributions.

The doughnut—or vortex—was created in the first version of STED by means of a phase plate spatially varying. This implementation requires the use of two separate optical paths for the two beams, the excitation beam and the depletion beam. This optical assembly is complex, highly dependent on any mechanical derivative and creates complex optical alignments. The updated system needs technical strength and the cost of the system is high. Also, this implementation is chromatic, as the phase plate adapted to a wavelength no longer will be to another wavelength. With the optical system not being achromatic, the use of STED having two depletion wavelengths needs an even more complex optical system.

To simplify implementing the STED, several authors have proposed solutions for producing a STED in which the two beams, the excitation beam and the depletion beam would spread along the same optical path:

Wildanger et al. have proposed a STED Microscope with common optical path, insensitive to the mechanical derivative, based on properties of dispersion of different optical materials, [23], This technology is marketed under the name EasyDONUT by the company Abberior [28].

Bokhor et al. [24], propose the use of chromatic annular separation of prealigned beams; however this solution blocks some of the depletion light, Hoeffman [25], proposes the use of a module containing the prealigned optical elements creating the vortex in the optical path of the depletion laser to simplify alignment, Menon et al. [26], propose diffractive lenses for creating zeroes of amplitude without phase singularities, Reuss et al. [27] introduce a device for beam formation placed directly opposite the objective lens. This device is based on the use of birefringent crystals, mounted in the form of a segmented wave plate, consisting of four segments. Via choice of the thickness parameter of the lame it is possible to make an element consisting of a phase lame for depletion and a neutral lame for excitation.

Gould et al. [45], uses a SLM for creating separately the lateral and/or axial distributions of depletion. This solution varies the parameters dynamically for adapting to different wavelengths. Other works integrate lateral and axial distributions on a single SLM.

However, the proposed solutions described above are all highly chromatic and are designed for a single excitation and depletion wavelength. However, in many cases biological applications need a system having two or more excitation wavelengths. In fact, it is current practice to mark different biological objects with fluorescent markers differentiated by their excitation or emission wavelength. The most highly evolved fluorescence systems can utilise four to six differentiated markers. The presence of a single superresolution path substantially limits use of the systems. STED systems having two wavelengths are also available commercially.

It is clear that for an achromatic STED microscope or 3D STED microscope with several wavelengths, use of the same optical path for two depletion beams having two different wavelengths will simplify superresolution on different fluorophores.

In the prior art for all solutions proposed for STED, the initial laser beams are in the form of regular distribution and in most cases Gaussian distribution. These initial laser beams will be later transformed into an excitation beam, a regular wave, and into a depletion beam, a singular wave, by an adequate optical system, as described by various inventors. Collocating these beams upstream when they are still in the form of Gaussian distribution is relatively simple. Collocating these beams downstream when they have been transformed into a regular and singular wave is much more complex. Collocating these beams upstream can be done commercially by laser bank systems using techniques based on fiber optics. It is therefore relatively easy as is also done in all confocal microscopes to create a set of laser outputs at different wavelengths of the same fiber optic and therefore collocated highly precisely.

The solution proposed in embodiments of the present invention is based on this upstream collocation, greatly simplifying the system and carrying out STED at several wavelengths intrinsically. For this, it is preferable to use an optical system combining the properties of common optical path, achromaticity and "beam shaping". It is preferable to produce different beam shaping for the different beams, or a regular wave for the excitation beam and a singular wave for the depletion beam, and this at any wavelength in the visible or infrared spectrum. The capacity for performing achromatic beam shaping, producing for polarization a regular wave and for another polarization a singular wave over the entire range of visible or infrared light, different for different polarizations, is novel. The PSIT module creates such an optical system which combines the properties of common optical path, achromaticity and "beam shaping". As far as is known there is in fact no system in the literature having a path common, which is achromatic and which enables beam different shaping for different beams. Such a system would definitely improve the simplicity of design and use of STED.

3D STED

Many systems have been proposed to extend the concept of the STED in the third dimension. The solution used for the set of STED-3D is the "depletion ring" proposed by the Stefan Hell team, reference 36. The "depletion ring" creates a "black sphere", distribution in which the intensity is zero at the centre of the focus field, and increases relatively rapidly with defocusing. Implementation of the "black sphere" has been described by Zhang, [29], creating a black spot enclosed in three dimensions by a light sphere, and by one of the authors of this patent in reference 37.

Acronyms

In this patent application we use the acronym, SRCD, "Super Resolution using Conical diffraction" to name the platform, modules and systems specific to the implementation of this invention.

In this patent application we use the acronym PSIT "Projected Sequence of Intensities with various topologies" method; the PSIT method can also be used to project sequences of light intensities differing topologically, at two or more wavelengths, sequentially or simultaneously.

In this patent application we use the acronym, PDOS, "Position Dependent Optical Semaphore".

The SRCDP platform, "Conical diffraction using Super Resolution Platform" is a platform for microscopy using optical modules based on conical diffraction.

In this patent application we use the acronym LatSRCS to name the optical module implementing the PSIT method for the implementation of this invention.

In this patent application we use the acronym LongSRCS to name the optical module implementing the PDOS method.

The SRCDP platform, described in detail hereinbelow, comprises mainly two hardware modules, two new and complementary optical modules, the LatSRCS and LongSRCS optical modules, mounted on a microscope, and an algorithmic module SRCDA "Super Resolution using Conical Diffraction Algorithm", to reconstruct the information of the superresolved sample. Additionally, the SRCDP platform includes an improved detection module, a control module of the system, and software support.

In addition, certain embodiments of the invention relate to a large number of variants of implementations of the PSIT and PDOS methods, platform SRCD, LatSRCS and LongSRCS optical modules and SRCDA algorithmic.

DETAILED DESCRIPTION OF THE INVENTION

Light Distributions
Light Distributions Created by Conical Diffraction

Referring to FIG. 7a, this figure shows the light distribution, created through a conical crystal with a normalized conical parameter $\rho_0$ of 0.388, calculated by a scalar approximation for different input and output polarization states, including at input or output either a circular or linear polarizer or a radial or azimuthal polarizer. These light distributions were calculated in an imaging intermediate plane and not at the focus of the objective to separate the conical refraction from vectorial effects. The input and output states of polarization are characterized by their angle for linear polarizations and their chirality for circular polarizations.

Referring to FIG. 7b, this figure shows the light distribution, created through a conical crystal with a normalized conical parameter $\rho_0$ of 0.818, calculated by a scalar approximation for different input and output polarization states, including at input or output either a circular or linear polarizer or a radial or azimuthal polarizer. These light distributions were calculated in an imaging intermediate plane and not at the focus of the objective to separate the conical refraction from vectorial effects. The input and output states of polarization are characterized by their angle for linear polarizations and their chirality for circular polarizations.

These figures present a large number of different transfer functions, including the case including at input or output circular, linear, azimuthal or radial polarizers. This description has to be completed by including circular, linear, azimuthal or radial polarizers described in the figures, the case of elliptical, dichroic or partially dichroic polarizers, and polarizers varying spatially. Also, as illustrated in FIGS. 7a and 7b, these transfer functions vary considerably as a function of the standardised conical parameter $\rho_0$. Also, the introduction of two conical crystals, or one conical crystal and one uniaxial or biaxial crystal (in which light propagates in one direction of propagation different to that of conical diffraction) in cascade allows an even greater number of transfer functions as illustrated for two conical crystals in FIG. 7c.

In summary, in this patent application we reference under the term of conical diffraction transfer function the set of transfer functions which can be obtained by means of a low (<6) number of crystals in cascade, and polarization elements, static or dynamic, uniform or varying spatially.

We denote mainly the following light distributions:
- The fundamental, FIG. $7a_{00}$ and FIG. $7a_{11}$ obtained between parallel circular polarizers, which is a distribution close to the Airy distribution
- The vortex: FIGS. $7a_{01}$ and $7a_{10}$ obtained between crossed circular polarizers
- The distribution that we called the "crescent moon" distribution or Stokes; subfigures $7a_{0,2\text{-}5}$, $7a_{1,2\text{-}5}$, $7a_{2\text{-}5,0}$ and $7a_{2\text{-}5,1}$, and FIG. 7c describing the axial variation in distributions by "crescent moon" or Stokes. These distributions are obtained between a circular polarizer and a linear polarizer with a variable angle; this distribution is antisymmetric and the axis rotates following the linear polarizer axis.
- The distribution that we called the "half-moons" distribution; subfigures FIGS. $7a_{42}$, $7a_{35}$, $7a_{24}$ and $7a_{53}$, is obtained between two crossed polarizers; this distribution is symmetric.

The distribution called "offset half-moons" distribution, FIG. 7d, showing "offset half-moons" distribution at different axial positions, is obtained between two elliptical polarizers for some ellipticity values.

In reference to FIG. 7e, this invention describes a novel distribution, the distribution called "Dark Helix", created by positioning a half-wave plate between two equal crystals of conical diffraction. The particular feature of this distribution is that it can be performed either with circular input polarization and without analyser, or without input polarizer and with a circular analyser. This property simplifies the optical system and reduces photon loss inherent in many systems based on polarization.

The more complex light distributions, FIG. 7b, for a crystal with a normalized conical parameter, $\rho_0$, greater than 0.5.

The creation of additional light distributions using two— or more—crystal cascading conical crystals (not shown) with or without static or dynamic polarizing elements between the crystals.

The different light distributions are carried out by modification of the input or output polarization. The different light distributions follow the same optical path and the optical system creating these distributions is an optical system of common path, such as defined previously. There is a number of polarization elements having different polarization at different wavelengths. The use of one of these elements creates two waves compact, either regular or singular at two wavelengths or a regular wave at one wavelength and a singular wave at another wavelength. Such a device enables far simpler implementation of emission-depletion concepts limited in some cases by tolerances or by vibrations of the optical system.

The above description, although valid for any optical beam, mainly describes for the optical LatSRCS Module, described later, the forming of an excitation beam or a depletion beam.

Yet, conical diffraction can be used for forming the emission beam, as for example in the LongSRCS module, described later. A novel variant of this module consists of forming the PSF such that it presents lateral and mainly axial variations. This modification of the PSF of the emission beam, referenced as "PSF" has many applications in different disciplines. For example, a module based on conical diffraction modifying the PSF to create axial dependence can enable measuring of longitudinal and lateral position of one or more nanoemitters, as described hereinbelow.

Redundancy and Random Phase Variations

The elementary light distributions described in FIG. 7 can be obtained in several ways. In addition, some of them can be obtained as a linear combination of other elementary light distributions, e.g. the vortex can be obtained by the sum of any two orthogonal "half-moons" light distributions.

This redundancy allows some averaging of random phase errors inevitably present in many measurement process of biological objects.

New light distributions can also be obtained as mathematical combinations of elementary light distributions. The "pseudo-vortex", light distribution, calculated from arithmetic combinations of the four distributions "in crescent moon" has the feature of having a strong curve at the origin.

Vector Effects and Direction of the Fluorescent Dipole

The theory developed so far describes the light distribution in the imaging plane of the microscope, 35. The distribution of the light projected on the sample is, according to the theory of the geometrical imaging, a reduced image of the light distribution in the image plane.

However, as described extensively in the literature, for a high numerical aperture objective, the imaging geometric theory is not accurate and vector effects must be taken into account. These effects consist essentially in the presence of a component, longitudinally polarized.

Referring again to FIG. 6a, to mitigate vector effects, it may be advantageous to maintain the final analyser fixed and to add an additional element, fixed or variable, the output polarization adaptation submodule, 74, for controlling the output polarization. We found that an output polarization with circular symmetry substantially reduces vector effects and can be adapted to the direction of fluorescent dipole. Such polarization can be circular, radial or azimuthal or position dependent. For circular polarization, the output polarization adaptation submodule, 74, is simply a quarter wave retardation plate. In this case, the elements of longitudinal polarization have vortex symmetry and integrate harmoniously into the system with only a small change in the form of the Stokes parameters, even for microscope objectives with high numerical aperture.

Alternatively, the output polarization adaptation submodule, 74, may be variable and/or controllable and adapt to the topology and the symmetry of each of the compact light distribution.

*Modified Wollaston Prism

It is recalled that a Wollaston prism can be used for separating an incident beam into two emerging beams separated by an angle. By using several prisms in cascade, an incident beam can be separated into a large number of emerging beams. The same effect can be obtained by modifying the Wollaston prism to create the compound Wollaston prism by adding pieces of uniaxial crystal whereof the index and orientation of the birefringence are suitably selected. In this way a prism of a single block of uniaxial crystal can be constructed which can separate an incident beam into $2^n$ emerging beams (for example eight or sixteen) which are contained in one plane and separated by equal angles. Once focused on the sample, the result is $2^n$ points aligned and equally separated. If the incident beam has passed through a LatSRC module, these $2^n$ points are not $2^n$ Airy patches, but the distributions created by the module are all identical. The advantage of using this beam splitter is to scan the sample faster since there are $2^n$ light points in place of a single one.

The modified Wollaston prism can be coupled with methods described in this invention to duplicate all light distributions without modifying the relationships between them.

The modified Wollaston prism can be coupled with STED methods described in this invention or other standard STED methods to duplicate all light distributions without modifying the relationships between them.

Measuring Paradigms

The functionality of the confocal microscope is limiting in three spatial dimensions, the observed region of the sample volume to a size as small as possible, volume analysis.

As a corollary, in a confocal fluorescence microscope, the information retrieved is a single value of intensity for the entire volume analysis, considered as a single entity. More clearly, detailed information on the position of nanoemitters within the analysis volume is not available, a priori, in a confocal microscope. It was generally agreed that no additional optical information could be created that would allow further discrimination within the illuminated volume.

Figure 4D:
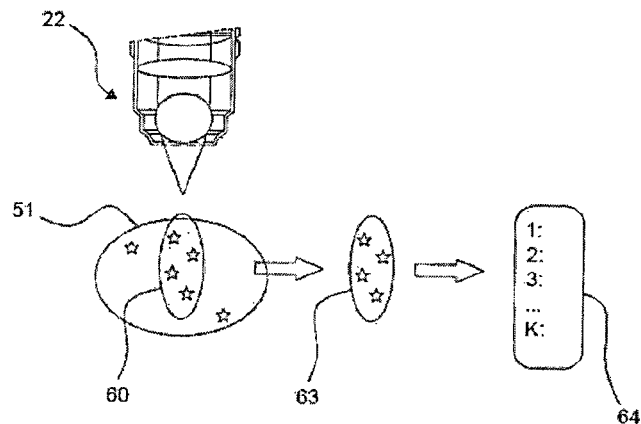

Referring now to FIG. 4d, which is a simplified conceptual representation of the paradigm of the measurement according to at least one embodiment of the invention. The paradigm is much more ambitious than that of the fluorescence confocal microscope, shown schematically in FIG. 4a. In FIG. 4d, a test volume, 60 is created at the focal plane of the microscope objective, 22; it contains a sparse object, 51, consisting of several nanoemitters, 53 to 59; the result of the system is a reconstructed sparse object, 63, and a list of nanoemitters and a list of their attributes, 64.

Figure 4E:
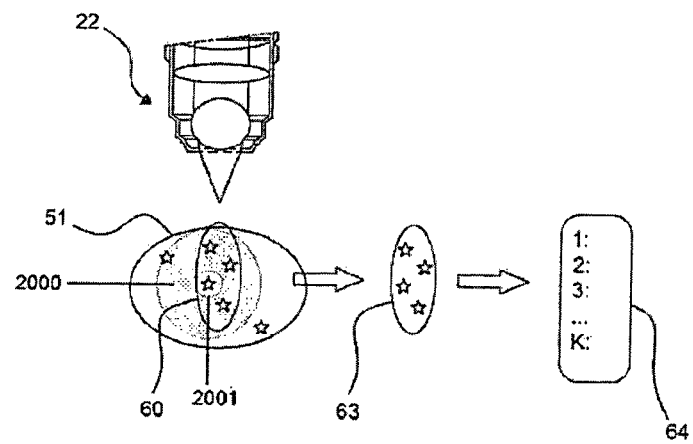

Reference is now made to FIG. 4e which is a simplified conceptual representation of another measuring paradigm, based on the concepts of STED, according to at least one embodiment of the invention. In two (STED 2D) or in the three spatial dimensions, (STED 3D), this measuring paradigm limits the observed region of the sample at the smallest possible volume of size, the analysis volume. In FIG. 4e an analysis volume, 60, is created at the focal plane of the lens of the microscope, and contains a sparse object, 51, comprising several nanoemitters, 53 to 59; via an depletion effect, one or more depletion waves, 2000, reduce the analysis volume to a lesser volume represented by 2001. In this paradigm, as in the confocal, superposition of all the effects creates a small volume, the analysis volume, 60. This volume determines the size of the elementary region detected by the system.

Figure 4F:
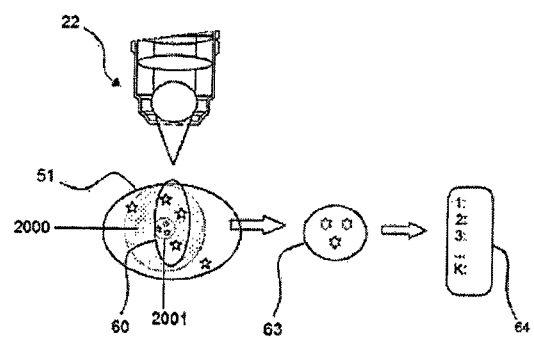

Reference is now made to FIG. 4f which is a simplified conceptual representation of a third measuring paradigm, combining the two previous paradigms and used according to at least one embodiment of the invention. In FIG. 4f an analysis volume, 60, is created at the focal plane of the lens of the microscope and contains a sparse object, 51, comprising several nanoemitters, 53 to 59; via a depletion effect, one or more depletion waves, 2000, reduce the analysis volume to a lesser volume represented by 2001. As in FIG. 4d, this volume contains a sparse object, 51, consisting of several nanoemitters, 53 to 59; but in contrast to FIG. 4d and similarly to FIG. 4e, the elementary volume is reduced by one or more depletion waves. The result of the system is a reconstructed sparse object, 63, and a list of nanoemitters and a list of their attributes, 64. The use of a sparse object in FIGS. 4d-f is for illustration and this figure would have been perfectly able to represent a continuous object, mutatis mutandis.

Measuring Methods
PSIT Measuring Method

A method of measurement PSIT according to one embodiment of the invention, projects a sequence of light distributions of different topologies, on the analysis volume.

The measurement PSIT method, performs the following functions:
  Projection of a sequence, the emission sequence of compact light distributions of different topological families on a sample; and
  For each compact light distribution:
    emission of light by nanoemitters on the sample,
    creation, by means of the microscope optics, of an optical image,
    acquisition of the optical image on a photodetector and creation of a digital image.
In more detail, it is noted that:
The transmission sequence comprises at least two point like light distributions, of different topological families.
The transmission sequence is projected onto a biological sample labelled with nanoemitter. The light emitted, emerging from each nanoemitter, is dependent for each nanoemitter of the light intensity, in the incoherent case or on the electromagnetic field, in the coherent case, incident on the three-dimensional spatial position of the light nanoemitter, the aforesaid light sampling property of the nanoemitter discussed previously.

For each light distribution pattern of the transmission sequence projected on the sample, an optical image is created. The set of images corresponding to all the light distributions of the transmission sequence is referred to as the sequence of images.

The PSIT method according to this embodiment can acquire mainly lateral information, i.e., the lateral position of each of the nanoemitters.

In an embodiment, the PSIT method is implemented by the projection of light distributions of different topologies created by conical diffraction and modified by a variation of the polarization states of input and output.

In an embodiment, the PSIT method can also be used to project sequences of light intensities differing topologically, at two or more wavelengths, sequentially or simultaneously.

PSIT Method and Axial Superresolution

PSIT method was originally designed to allow lateral superresolution, however PSIT method can also be used to obtain the longitudinal position of a nanoemitter. Indeed, some elementary light distributions are relatively insensitive—within reasonable limits—to a variation of the longitudinal position of the nanoemitter, others are rather sensitive. A sequence of compact light distributions, some of them independent and some of them depend on the longitudinal position would reveal the longitudinal position of nanoemitters.

In addition for the light distributions which are highly dependent on the longitudinal position of the nanoemitter, a series of elementary light distributions slightly shifted longitudinally, one relative to the other can be projected on the sample, allowing a set of images containing longitudinal information.

Original PDOS Method

The PDOS method according to an embodiment of the invention includes the distribution of an "optical semaphore" of the light re-emitted by the nanoemitters between at least two detectors. It has been described by one of the inventors, [37].

Ideally, the function of the optical semaphore is to separate different areas of the test volume on different detectors. Practically, the optical semaphore creates, for each detector, a transfer function of the light emitted by a light nanoemitter, depending on the position in space of the light nanoemitter and different for the different detectors.

In an embodiment, the PDOS method is implemented to separate on different detectors the collimated light, emerging from nanoemitters positioned at the focal plane of the objective lens, from non-collimated light emerging from nanoemitters lying within or beyond the focal plane.

The PDOS method, allows acquiring essentially longitudinal information, i.e., the longitudinal position of each of the nanoemitters. Mathematically, the method according to some embodiments of the invention provides a transfer function converting the spatial distribution of the nanoemitters in space in unprocessed information consisting of a set of images. The algorithmic performs the inverse operation: it reconstructs the spatial distribution of the nanoemitters in space from the set of images in the raw information.

Modified PDOS Method

The modified PDOS method is also presented, an optical method for forming the emission beam for the axial and/or lateral location of nanoemitters. This method implements a PDOS method on a single channel in which the variation of one of the parameters describing the distribution created is used for measuring axial or lateral parameters. The parameters used can be either a parameter of angle for a distribution having axial helicoidal variation, or the ratio between the lobes of the distribution—for a distribution having two lobes (or more) having axial variation. This method has a certain similarity with the original PDOS method described by one of the inventors in [37], but differs by the variation of the topology of the distribution created being used to measure the axial or lateral parameters and not by an intensity ratio between two detectors, as described in the original version of the PDOS method. This method, as for the original method, has applications as complementary method of the PSIT method, but also for the axial location of nanoemitters, for example for location modalities, such as for example PALM, STORM or GSDIM modalities or similar.

PDOS Method and Lateral Measurements

Method PDOS was originally designed to allow longitudinal superresolution, however PDOS method can also be used for measuring the lateral position of a nanoemitter. Indeed, the elementary light distributions are also sensitive to variation of the lateral position of the nanoemitter. For a plane sample, in the case where the light projection is not possible, the method PDOS may replace the PSIT method for performing superresolution measurements.

All these variants are considered part of the invention. The inventor has yet chosen in one of the implementations to separate into two disjoint, separated, but complementary optical modules the lateral measures from the longitudinal measures to reduce the complexity of each one of the complementary modules.

Information in Certain Embodiments of the Invention

In certain embodiments of the invention, the intermediate result, the raw information is obtained at the end of the detection step. Raw information comprises a set of images $A_{op}(m,n)$ representing for the o light distribution, the image from the detection channel p.

As in a confocal microscope, the measurement process analyses a small volume in a much larger object. It will therefore require the addition of additional modules, similar to those of a confocal microscope including a scanning process, a software module integration, analysis and visualization of data points in surfaces and/or three-dimensional objects.

In mathematical terms the algorithm solves an inverse problem or parameter estimation. The model equations are known and a model, parametric or not, is used a priori on the configuration of nanoemitters. The most natural model consists of supposing a low number of nanoemitters (sparse object), but continuous models can also be used, supposing the presence of unidimensional structures (lines, curves) or specific patterns. So we can use all the mathematical procedures known to those skilled in the art for solving inverse problems and parameter estimation. We describe later an example of algorithm adapted specifically to the measurement according to an embodiment of the invention.

In addition, we present, for its symbolic value, a new solution to the problem of discrimination of two points located at a small distance from each other. This problem studied by Lord Rayleigh, is the base of the resolution criterion in many areas of Optics.

It has thus been described, rather broadly, the characteristics of the embodiments of the invention in order that the detailed description thereof may be better understood, and in order that the present contribution to the art may be better appreciated. Many additional features of the invention will be described below.

System

Hardware and Algorithmic Platform

Figure 5:
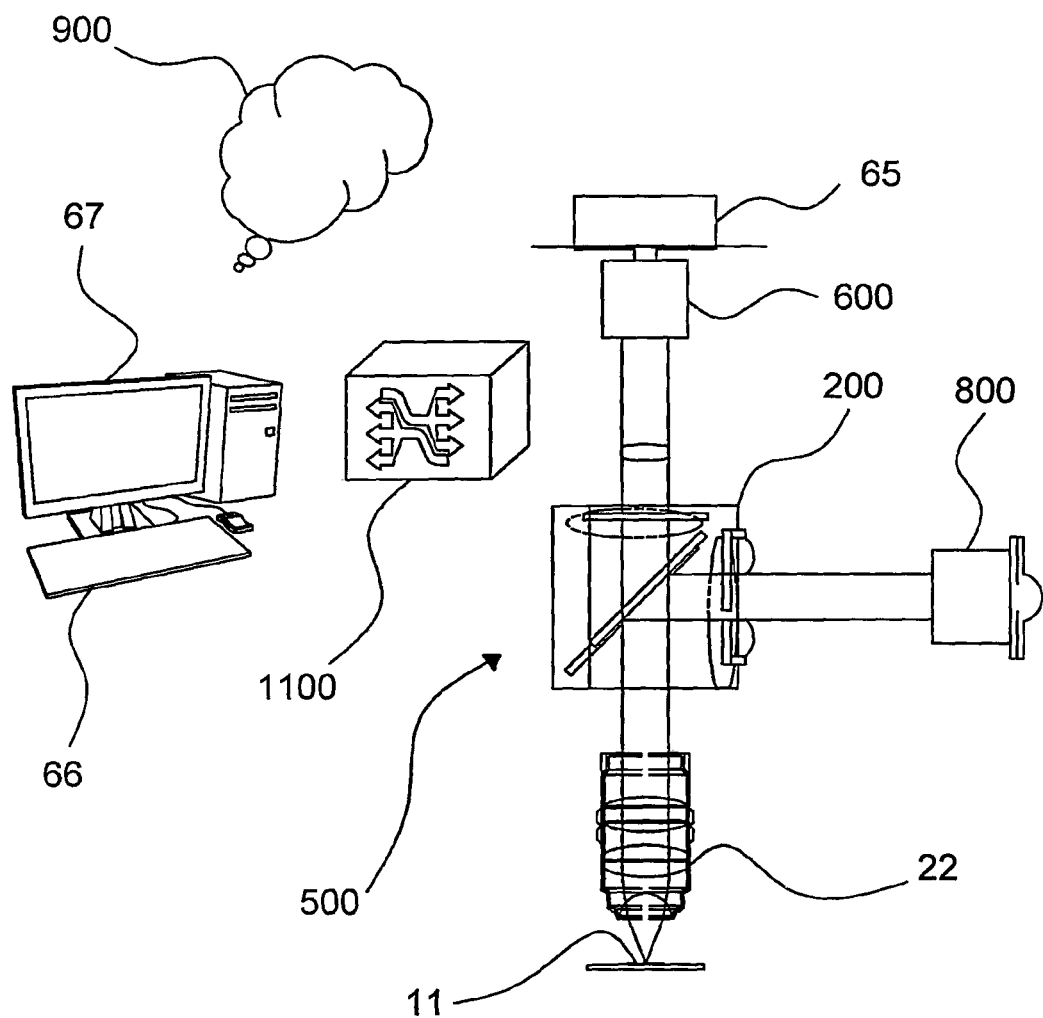

A method according to one embodiment of the invention is a hardware and algorithmic platform, referred to as the SRCDP platform, 500, shown in FIG. 5.

The SRCDP platform, 500, implements the method according to an embodiment of the invention, either by combining the two PSIT and PDOS methods, original or modified, described hereinabove, or by using STED techniques, or by combining STED techniques with PSIT or PDOS methods, original or modified.

In one of the embodiments, the SRCDP platform observes, FIG. 5, a biological sample, 11, including a plurality of nanoemitters. The result of the observation of the biological sample by the SRCDP platform is the acquisition of superresolution information, representative of the observed sample.

The SRCDP platform, 500, FIG. 5 includes mainly:

In its hardware part:

A confocal microscope 200, adapted or optimised, similar to the confocal microscope, described previously, and including all appropriate components, as previously described Two new and complementary optical modules, mounted on a standard microscope. The two new optical modules are LatSRCS, 700, and LongSRCS, 800, optical modules described in detail later with reference to FIGS. 6 and 8, respectively. The LatSRCS optical module 700, implements the steps of illumination required for implementing the PSIT method according to one embodiment of the invention. Alternatively, the optical LatSRCS module 700 implements the illumination steps necessary for implementation of a STED or RELSOFT technique according to another embodiment of the invention. The original or modified, optical LongSRCS module, 800, implements the steps of the light intensity distribution in a plurality of emerging images of the PDOS method or implements the variation of the emerging PSF as a function of lateral or axial parameters, according to an embodiment of the invention, and SRCDA algorithmic module, 600, is able to reconstruct superresolution information of the biological sample from images created by the SRCDP platform.

Other auxiliary elements, such as computer 66 and software 67, can be necessary for the realization of the platform, Detection Module In scanning confocal microscopy, the detector is a detector consisting of a single element as a PMT or SPAD. The acquisition time of the detector is determined by the scanning mechanism.

An improved detection module, 65, may be implemented using small detectors with low number of pixels. Such a module would not have been possible ten or twenty years ago, due to the lack of appropriate technologies. Today, small detectors with small number of pixels, at high speed, with low noise characteristics are available on the basis of several technologies. SPAD arrays with a small number of pixels, such as 32*32 have been shown recently with acquisition rates up to 1 MHz. The improved detector module 65, may also be implemented using CCD, EMCCD or CMOS sensors. CCD sensors, CMOS and EMCCD with a small number of pixels exist or can be specifically designed. In addition, CCD sensors, CMOS EMCCD can be used using features as region of interest, sub-windowing or "binning", "crop" or "fast kinetics" modes, available for some detectors.

The space-time information referenced herein is the position and the time of the impact of each fluorescent photon. In real systems, the space-time information is corrupted by the noise of the detector, which creates incorrect photons, and by inefficient detection, creating photons which are not detected, thereby reducing performance. In SPAD arrays, for each photon, the pixel that has detected it and the time of impact are received, i.e. the full spatiotemporal information is available. For CCD sensors, CMOS or EMCCD, the acquisition of multiple frames is necessary to approximate the space-time information.

In several implementations we will refer to separate detectors; in many cases the sensor can be either physically separated or consisting of different areas on a single detector, or a combination of the two previous cases.

Control Module

With reference to FIG. 11 and FIG. 5, in one preferred embodiment of this invention, the various control elements integrated into the SRCDP platform, 500 will be described:

The control module, 1100, using the procedure of systemic control, 1101, monitors and modifies the optical parameters of the SRCDP platform, 500, the electronic parameters of the improved detection module, 65, and the mathematical parameters of algorithmic procedures SRCDA, 900, to optimise the emerging information in accordance with criteria defined by the system or by the user. Control is achieved by varying control systems 1102, 1103 and 1104, of the various elements of the platform, 600, 800 and 900. The control system 1100, also use, if available, external information, 1105, relayed by computer support. Remark: 1105 is not present in FIG. 11.

It is understood that the invention is not limited in its application to the details specified in the description contained here or illustrated in the drawings. The invention is capable of other embodiments and being practised and carried out in various ways. Those skilled in the art will easily understand that various modifications and changes can be applied to the embodiments of the invention such as described previously without departing from the scope of this invention.

SRCDA Algorithmic

The reconstruction algorithm detailed above applies not only in the case of a given field analyzed by means of PSIT and PDOS methods, but also in the event where the measurements obtained by the PSIT and PDOS methods are enriched by additional measurements, using other Microscopy modalities. For example, measurements in confocal microscopy or wide-field, at the same lateral or axial positions, or at different positions can be taken for setting certain parameters of the model of the scene. In the case of confocal microscopy, the direct model is enriched by the fact that coverage between the different positions of signals projected takes into account, at a given point, more measurements. But considering offset projected signals brings no additional complexity, since these offset signals only add to the list of projected signals.

Reference is now made to FIG. 9 which is a simplified schematic illustration 900 of an algorithm method for super-resolution of fluorophore data, according to an embodiment of the present invention.

An algorithm procedure presented in FIG. 9 quantifies the number of fluorophores, retrieves the attributes of each fluorophore and quantifies the precision of each output parameter.

The pre-processing procedure, 111, reorganises the space-time information, 110, in sets of superresolution images, 112. This operation can be done by using a filter bank procedure. The intermediate set of data is a short series of small images, typically 16*16 pixels. The pre-processing procedure applies to a small number of space-time elements of the order of a few thousands, and can be executed in real time and using existing computer equipment.

The descriptor procedure, 113, the main calculation step, creates from each image a set of descriptors, 114, and their statistical pertinence. The descriptors comprise, but are not limited to: the intensity of each image, the presence on the image of distribution of light and its characterisation as regular distribution or a vortex, its centre of gravity and its moments of order one and more.

The third step is a filtering operation, 115, in which only the descriptors, which are statistically pertinent, are retained.

The classification operation, 116, is the final step of the algorithm. On the basis of the set of descriptors, 114, and a basis of knowledge, 117, the algorithm is capable of recognising the different measuring cases as a single fluorophore, two fluorophores separated longitudinally or laterally and three or more fluorophores.

The SRCDA algorithmic can utilise classic techniques of inverse problems. But three novel optical approaches, the modified MAP algorithm, the E-LSE algorithm and the ICE algorithm are described in this patent application and form part of this invention.

Optical Modules

LatSRCS Optical Module Implementing the PSIT Method

We describe, with reference to FIG. 6a, an optical module according to an embodiment of the invention, the LatSRCS optical module, 700, and its specific function in microscopy.

The LatSRCS optical module, 700, according to this embodiment is an optical module, projecting on a plurality of nanoemitters in a sample, a sequence of compact light distributions of different topology. Each nanoemitter fluoresces with a sequence of fluorescent light intensities dependent on the incident intensity on the nanoemitter and characterizing the lateral position of the nanoemitter. In most embodiments, the light compact distributions of different topologies are created by interference with variable amplitudes and phases between an ordinary wave and singular wave. In the preferred embodiment, the regular and singular waves are created by a thin conical crystal.

The LatSRCS optical module, 700, is positioned in the illumination path of the confocal microscope 200; it projects a sequence of compact light distributions of different topologies on the sample 11 using the confocal microscope objective 200. In the embodiment using the conical diffraction, the incident intensity at a specific position on the sample 11 will be proportional for each light distribution pattern, to a specific combination of the Stokes parameters.

The LatSRCS optical module, 700, uses an inherent feature described above, specific to the nanoemitter, which samples the intensity of light incident on its precise position (the nanoemitter), and re-emits fluorescent light dependent on the incident light. It is remarkable that the measured information is directly related to the position of the nanoemitter in the compact light distribution. This information is frozen by the functionality of the fluorophore, its ability to absorb and re-emit light, breaking the optical chain. This information is carried by the fluorescent light as an emerging light distribution recoverable by a detector assembly 65.

If the incident light varies temporally according to a sequence of compact light distributions of different topologies, the intensity of the fluorescent light re-emitted varies in the same proportions. The sequence of the re-emitted fluorescent light is proportional to the sequence of compact light distributions of different topologies. From this information, it is possible to retrieve the position of the nanoemitter, as explained below.

The PSIT method, according to embodiments of the invention, refers to the projection of a sequence of compact light distributions of different topologies in a microscope, the interaction with the sparse object and the continuous object, collecting the reflected light by the objective of microscope, 22, detecting the fluorescent light or not, by the improved detector assembly 65, and the analysis of the information by a suitable algorithm. In some embodiments, the improved detection assembly, 65, comprises a single detector, and recovers only the overall intensity as a function of time, while in other embodiments the improved detection assembly includes a small area of pixels and recovers also the spatial distribution of the fluorescent light. All retrieved information consisting of a plurality of images, the named as lateral superresolution images.

In one of the embodiments, the contribution of a nanoemitter in the illuminated volume positioned in a specific lateral superresolution image is proportional to a specific combination of the Stokes parameters of the incident light at the nanoemitter position.

This new information helps to refine the position of the nanoemitters or the spatial distribution of the continuous object, to quantify the number of nanoemitters present in the illuminated volume and to differentiate multiple nanoemitters present in the same volume.

We refer now to FIG. 6a, which is a simplified schematic illustration of a LatSRCS optical module, 700 in accordance with an embodiment of the present invention.

FIG. 6a shows a LatSRCS optical module, 700; it includes all the components of the module of conical diffraction, of FIG. 3, which are implemented in the same way as in the module 300 of conical diffraction. The optics of the light source of the scanning confocal microscope is assumed to be achromatic and infinite conjugate, although other conditions can be adapted using auxiliary optics. The incident light entering from the light source is parallel, 30. The optical module itself, 700, comprises a first lens 31, an achromatic 32, or a subset achromatically performing the functionality of a conical crystal as explained previously, and a second lens 33; a partial polarizer, 29, described above, may also be added. The first two lenses 31 and 33 are preferably configured in the form of a Kepler telescope of ratio of 1:1; the conical imaging plane, 35, is placed in the common focal plane of the objective lenses 31 and 33. The numerical aperture of the first lens, 31, determines the parameters of the conical diffraction effect through the conical normalized radius, defined below. The second objective 33, restores the parallelism of the light, to inject it in the microscope. It further comprises a sub-module of polarization control 71, including, for example, a rotating quarter-wave plate, a pair of liquid crystal light valves or a Pockels cell, 72 and an analyser 73. The information of the Stokes parameters can be converted into sequence information, through a sequence of light distributions spatially differentiated and carrying sequential information, as described above.

Modified LongSRCS Optical Module for Forming the Emission Beam

The modified LongSRCS module is also presented, an optical module for forming the emission beam, for axial and/or lateral location of nanoemitters. This module implements a PDOS method on a single channel, in which variation of one of the parameters describing the distribution created is used for measuring the axial or lateral parameters. The parameters used can be either a parameter of angle for distribution of helicoidal axial variation, or the ratio between the lobes of the distribution—for distribution of two lobes (or more) of axial variation. This module has a certain similarity with the original LongSRCS module, described by one of the inventors in [37], but differs in that the variation in topology of the created distribution is used to measure the axial or lateral parameters and not by an intensity ratio between two detectors, as described in the original version of the LongSRCS module, [37]. This module, as for the original module, has applications such as complementary module of the LatSRCS module, but also for the axial location of nanoemitters, for example for location modalities, such as for example the PALM, STORM or GSDIM modalities or similar.

The case where the input polarization and the output polarization are elliptical with orientation of the big axes of each ellipse having an angle of 90° between them is treated in more detail. Of distributions generated in these conditions some show substantial axial variations, and these variations can be exploited to measure the position of an emitter with considerable axial precision.

These distributions are separated into two groups, distributions which have a single lobe and those having two lobes. Distributions with a single lobe have a rotation effect along the axis Z. In this way, Stokes distributions, created from linear polarization (ellipticity=0°) and circular polarization (ellipticity=45°) show variations which appear in the table below. By using an appropriate algorithm the orientation of distribution can be detected and the position of the emitter deduced with considerable axial precision. (FIG. 7c).

In addition, some more complex elementary light distribution, consisting of more complex overlapping of waves with a strong longitudinal dependence exist, e.g. the "three-dimensional dark spot" described by Zhang, [29], which create a black spot surrounded in three dimensions by a luminous sphere. These "three dimensional obscure spots" consist of a superposition of Laguerre-Gauss functions, which can be achieved within a laser cavity or using a hologram or a phase plate, as suggested by Zhang, or using uniaxial or conical crystals as suggested by the inventor in [37].

3D Localisation

Certain distributions with two lobes or more have an offset effect of both lobes according to the axis Z. So, distributions called offset half-moons created from two elliptical polarizations oriented at 90° but with the same ellipticity have variations. By using an appropriate algorithm, the position of the emitter can be deduced with considerable axial precision by measuring the intensity ratio between the lobes, this variation being illustrated in FIG. 7d. This 3D location can be used either in projection, i.e., by projecting one or more distributions with offset half-moons onto the object and by using an adapted algorithm, for example the algorithms described in this invention, or in emission by having the light emitted pass through an optical module creating this distribution and by analysing the return PSF.

The "dark helix" distribution presents a rotation effect of the axis connecting the two zeros according to the axis Z. Using an appropriate algorithm the position of the emitter can be deduced with major axial precision by measuring the axis connecting the two zeros. This 3D location can be used either in projection, i.e., by projecting one or more distributions with offset half-moons onto the object and by using an adapted algorithm, for example the algorithms described in this invention, or in emission by having the light emitted pass through an optical module creating this distribution and by analysing the return PSF.

Spherical Aberration

In terms of optical fluorescence microscopy, or any optical system in which the illumination of the sample is uncoupled from the imaging of the sample, an invention is proposed which evaluates the spherical aberration locally in each place of the sample, or each place of the object being imaged.

It is known that the illumination beam can be formed by using conical diffraction and its phase and polarization effects. The sample is illuminated with uneven light distribution, which can also be a black sphere (or top hat) such that 3D distribution presents two lobes of the same intensity below and above the focal plane. In the presence of spherical aberration in the system these two lobes do not have the same intensity. This effect can be used to take an image, a confocal image in particular, by illuminating above and below the focal plane (by uncoupling the illumination and imaging). Analysing the intensity ratio of the two images then gives the quantity of spherical aberration of the system.

Another approach for measuring the spherical aberration uses another variant of systems based on conical diffraction.

Determination a Priori and Measuring of the Spherical Aberration

Forming a light beam by conical diffraction via a cascade of crystals obtains a distribution of intensity connected directly to spherical aberration.

This distribution is obtained between crossed linear polarizers and two biaxial crystals whereof the optical axes are aligned. A half-wave plate is inserted in between the two crystals. By way of characteristic form, this distribution will be called "four-leafed clover". In the absence of spherical aberration, this distribution comprises four perfectly equal lobes and al in the same focus.

Reference is made to FIG. 12 which describes the rupture of symmetry created in a "Four-leaf-clover" distribution in the presence of spherical aberration. FIG. 12 shows the simulated distributions under Matlab for different values of defocus and spherical aberration. The spherical aberration caused by an optical system breaks the symmetry of this distribution at the same time in the focus and the distribution of intensity in the four lobes as is evident in the figures below showing the "Four-leaf-clover" distribution of different values of spherical aberration. Simple qualitative observation allows a binary presence/absence test of spherical aberration. Fine measuring of the value of spherical aberration is possible by a focus-offset estimator of lobes and ratios of intensity at different focus planes.

Calibration in Real Time of a Beam Scanning System by Point Monitoring Generated by a Laser Diode in Near Infrared The optical system described in this invention can incorporate a module for tracking in real time on a camera a point scanned by a beam scanning system (galvanometric mirrors, bidirectional piezo-electric mirror or any other system). Using a wavelength in the near infrared dispenses with chromatic effects of optics which makes this system useable for calibrating several wavelengths projected in a confocal microscope. Also, using a laser diode in the near infrared ensures that low passage of the calibrating laser in the microscope will have a highly marginal effect only, the wavelength being far greater than the usual excitation wavelengths of fluorescence.

All these variants are considered part of the invention. The inventor has yet chosen in certain implementations to separate in two optical modules, disjoint but complementary, lateral measurement and longitudinal measurement to reduce the complexity of each of the complementary modules.

SRCDA Algorithm

Multi-Image System Including the E-LSE Reconstruction Algorithms

The name multi-image system refers to all optical and optoelectronic systems, in which a set of different and differentiated images, coming from the same spatial region of the object, bidimensional or three-dimensional—is registered and analysed via an adequate algorithm for analysing spatial—and/or spectral—distribution of the emitting spatial region. This differentiation can be due to the projection of spatially different illumination, such as described previously; it can also be due to variation in the spectral content of the illumination; it can also be due to natural movement or imposed from the exterior of the objects. Finally, it can be due to stochastic variation in the content of the spatial region of the object, bidimensional or three-dimensional, via a natural or imposed stochastic effect, such as systems used in superresolution based on stochastic detection, including the PALM and STORM process and their many variants, each bearing a different acronym.

Other means for differentiation of images of the same emitting spatial region are known to those skilled in the art and are deemed an integral part of this invention.

The name multi-image system including the E-LSE reconstruction algorithm refers to a multi-image system using the E-LSE algorithm described below.

Modified Reconstruction Algorithm MAP

This algorithm differs from existing algorithms in the literature known to those skilled in the art by presenting the following mathematic characteristics the combination of which is novel and differs from traditional MAP approaches:

Bayesian formulation no a priori on reconstruction, aside from positivity (in contrast to traditional MAP approaches, which in general incorporate a regularity a priori on reconstruction of total variation type, for example)

modelling of Poisson noise results in a term of attachment to data written in the form of a Csiszar divergence (well-known result)

the law a posteriori is exploited by a MAP, i.e., the aim is reconstruction of probability (a problem of maximal minimisation of energy must therefore be resolved digitally, done via an iterative approach of gradient descent type)

introduction to the model of a resolution gain factor (oversampling factor of reconstruction relative to the resolution of acquired images)

imposition of a "good sampling" restriction for reconstruction (the highest frequencies of the reconstruction spectrum are forced at 0)

introduction of a "pinhole" factor (digital confocal)

E-LSE Reconstruction Algorithm

From images registered by the camera (or cameras) following excitation of the sample by all of the selected illuminations the proposed algorithm reconstructs a high-resolution image, bidimensional or three-dimensional, of the sample. This algorithm rests on the combination of several principles:

formulation of the reconstruction as a reverse Bayesian problem which results in definition of distribution a posteriori. This law a posteriori combines, by way of the Bayes law, the probabilistic formulation of the noise model (Poisson noise inherent in the quantic nature of the emission of photons on which the modelling of other sources of noises is optionally superposed, especially the reading noise of the camera), as well as any a priori (positivity, regularity, etc.) on the distribution of light in the sample;

The E-LSE algorithm uses the same Bayesian formulation as the modified MAP algorithm, described previously, but exploited differently (more completely) the law a posteriori: in fact, the average of the law is calculated a posteriori and not its point of maximal value (which is known for being more adapted for problems of large dimensions) This approach, envisaged by Besag in 1984 [30], has recently been used digitally in the case of image denoising with an a priori of total variation type [31,32];

use of clouds of specific or simple geometry emitters which favours sparse solutions (samples with limited number of emitters, or whereof the emitters are concentrated on structures of small dimension such as curves or surfaces in the three-dimensional case (in fact the average of the law is therefore calculated a posteriori with a sparse a priori on the solution);

The fact of using the average of the law a posteriori (and not its point of maximal value) produces low dependency on the number of emitters used: it is therefore unnecessary for the number of emitters used to correspond to the number of fluorophores effectively activated in the sample;

estimation of the average a posteriori by means of an algorithm of Monte-Carlo Markov Chain type (MCMC) [33,34], as in references [31,32] mentioned above.

According to an embodiment of the algorithm, the sparse a priori by use of a restricted number of emitters is not used and the average of the distribution a posteriori is calculated on all of the possible images as in [31,32].

Poisson Noise

In the standard embodiment, where only the Poisson noise is modelled, the density of the law of probability a posteriori is written as $$p(x, \lambda) = \frac{1}{z} e^{-E(x,\lambda)} \quad \text{(EQ. 9)}$$

where Z is a standardisation constant—and not the axis of propagation of light—which does not occur in the algorithm, and $$E(x, \lambda) = \sum_{i,y} \left\{ \sum_k \lambda_k u_i(x_k, y) - m_i(y) \log \left( B + \sum_k \lambda_k u_i(x_k, y) \right) \right\} \quad \text{(EQ. 10)}$$

The cloud of emitters is represented here by the vectors $x = (x_1, x_2, \ldots, x_n)$ (n discrete positions in the field of the high-resolution image to be reconstructed) and the vector $\lambda = (\lambda_1, \lambda_2, \ldots, \lambda_n)$ which codes the intensities of the emitters located at points $x_1, x_2, \ldots, x_n$. Each quantity of type $u_i(x,y)$ is determined during the calibration step: it represents the intensity sent to the pixel y of the camera by an emitter located at the pixel x of the image high-resolution in response to index illumination (i therefore codes here both the position of the illumination signal and also its form). The real positive B corresponds to the intensity of the continuous background, resulting in general at the same time in the sample (diffuse fluorescence for example) and also the sensor. Finally, the quantities $m_i(y)$ correspond simply to measurements (images recorded by the camera): $m_i(y)$ is the intensity measured at the pixel y of the index image i, i.e., the image recorded after index illumination i).

The algorithm proposed consists of having the emitters represented by vectors x and $\lambda$ evolve in accordance with the law given by the density $p(x,\lambda)$. The algorithm is iterative: at each iteration one of the emitters is perturbed (in position or intensity) and this perturbation is accepted or not according to the principle of the Metropolis-Hastings algorithm [3]. The reconstructed image is obtained by averaging, with equal weight for each iteration, the emitters now constructed. If $x^i$ and $\lambda^j$ correspond respectively to the position and intensity of the emitters at iteration j of the algorithm then the image I reconstructed after N iterations is given by $$I(x) = \frac{1}{N} \sum_{j,k:x_k^j} \lambda_k^j \quad \text{(EQ. 11)}$$

Several improvements can be made to this algorithm: the introduction of a burn-in step (the first iterations are not used in the reconstruction), optimisation of the initialisation of emitters, optimisation of perturbations made at each iteration (law of proposition), the use of a post-filtering step (for example light Gaussian blur), etc.

The results of the algorithm can be transmitted to the user either in the form of an image or in the form of digital or graphic data.

The same reconstruction algorithm can be used in a second version including a set of additional parameters describing global parameters of spatial region of the object either known a priori or determined a posteriori.

This algorithm, in its two versions, can be used in all of the multi-image systems, in which a set of different and differentiated images, originating from the spatial same region of the object, bidimensional or three-dimensional, are recorded and analysed.

Dynamic E-LSE Algorithm

Also, in a variant of this algorithm, the dynamic E-LSE algorithm, the speed of emitters can be considered.

During observation of dynamic samples it is possible to simply incorporate into the E-LSE algorithm the speed of objects observed, either individually for each of the emitters or by defining populations of emitters having different speeds. In the case of imaging known as "time lapse" (i.e., successive observations over time of the same sample), this can be done naturally by forcing the simultaneous reconstruction of successive images from mobile emitters parameterized by their initial position and their speed. In the case of acquisition of a single image it is also possible to consider the dynamic character of the scene via its impact on the return PSF (movement blur), whereof the deformation is correlated with the multiple observation of the same emitter. The coverage, "overlap" of the different micro-images obtained during the scan ensures that the same emitter is solicited during acquisition of several micro-images (at different instants due to the time component of the scanning).

ICE Algorithm

The ICE algorithm has recently been introduced for denoising images in the case of regularization by total variation [39]. The ICE algorithm can also be used to resolve more complex inverse problems (deblurring, interpolation). This algorithm of fixed point type converges very rapidly and the resulting solution is extremely close to that associated with the LSE algorithm for this problem. The principle of the ICE algorithm is to replace calculation of the expectancy of the law a posteriori effected by LSE via iteration of the explicit calculation of the average of the law a posteriori of a pixel conditionally to its neighbours. However, application of the ICE algorithm to inverse problems for an image or for a multi-image system must be shown.

Calibration

In many case, SRCDA algorithms use as input measurements taken on the sample, but also data inherent to the system, which are based either on theoretical values or on values obtained after a step known as calibration. In this step, measurements are taken on a reference sample to precisely measure the functions of illumination and the function of return Transfer (PSF) of the optical system.

Specificities and Advantages of Different SRCDA Algorithms

Different SRCDA algorithms, described previously, present the following differentiations and advantages relative to the prior art:

Modified MAP:
production of images naturally well sampled due to introduction of resolution gain and forcing at 0 of highest frequencies (limits artefacts of "night sky" type)
good compromise between controlled optical complexity (which keeps acceptable calculation times) and good quality of reconstruction (resolution of the inverse problem by non-linear optimisation, more interesting than using linear methods of "reassignment" type, [40] for example)

E-LSE:
introduction of the sparsity hypothesis in a supple form (low sensitivity to the number of emitters)
reconstructions of very high quality, in particular for sparse samples
capacity of the method to adapt to the quantity of local information, good management of reconstruction uncertainties (phenomenon of averaging in case of possible multiple interpretation)
possibility of modelling sparsity differently according to a priori on the sample observed (use of emitters of point, segment, curve, surface, type etc., exclusively or in combination)

Algorithm of the Compound Optical Process

The compound optical process according to at least one embodiment of the invention is the logical complement of the SRCDA algorithm. Indeed, the reconstruction obtained by the SRCDA algorithm can lead to the conclusion that an additional image would improve performance of the measurement. The SRCDP microscopy platform allows the acquisition of one—or more additional images from a set of light distribution of the PSIT or PDOS methods.

Resolution, Sparsity, Topology of Illumination and Positivity

The capacity to exceed the resolution limit for nanoemitters by using PSIT methods based on the specific topologies of some illuminations created by these methods had already been described by one of the inventors in reference [37] and is described again in the next paragraph.

More generally, a microscopy system using no non-linear effect is limited, in general, to a superresolution factor of 2 relative to the limit imposed by optical diffraction [38] and [41]. But in the case of a sparse scene (real support of the sample substantially less than the size of the imaged zone, for example in the case of scenes composed of filaments and/or specific sources), and in the absence of an excessively large continuous background (such as a positivity restriction on the reconstructed or efficacious image), it starts to be recognised that this limit of 2 is no longer valid and can be exceeded [42-44]. An evident example is given by the case of observation of a single specific source, even by using a single image: in this case the resolution attainable for the reconstructed image (i.e., the precision with which the source can be located) is not limited by optical diffraction but by the quantity of photons (more precisely, by the signal-to-noise ratio of the measurement).

In the PSIT method, on the basis of acquisition of several images of different topologies used in this method, one of the inventors [37] had shown the capacity of extending this absence of intrinsic resolution limit, replaced by a resolution limit linked to the signal-to-noise ratio, in the case of detection of two close points (Rayleigh criterion) and of the measurement of their position. This demonstration can be extended by simple modifications in the case of three points, not positioned on a straight line. This demonstration is repeated in the next paragraph. This demonstration is based on a new mechanism for measuring position, described in the next paragraph, which is different and complementary to a centroid method used in conventional systems.

In the case of several specific sources, in the case of uniform illumination, apart from the signal-to-noise ratio, the maximal superresolution factor depends essentially on properties of the scene: number of sources (relative to the number of measurements), minimal distance between two sources, etc [43-44]. In the PSIT method the maximal superresolution factor will depend on selected illuminations, apart from the factors described previously.

Detection and Consideration of Light Out of Focus

The following point describes a step of previous or simultaneous analysis to the use of a reconstruction algorithm for a multi-image system.

The principle is based on exploitation of one of the characteristics of the algorithms described previously but not singly, which is that the signal of interest is located mainly where the excitation light has been projected.

It is possible to measure the signal proportion which belongs to the region of interest (pinhole) for each image i.e., each laser position, each light distribution and each orientation of this light distribution.

This measuring, called Pinhole Ratio, consists of the method as described, of comparing in a spatial region of the object the proportion of photons which are resent and imaged in the region of interest of each image coming from this region relative to the total number of photons resent by the object in all the images considered.

This ratio gives information locally on the nature of the imaged object, if it verifies a predefined model (for example: planar object) in terms of the Pinhole Ratio, or if it deviates sharply from this model.

The criterion defined here can assume values between 0 and 1, and a nominal value PR_ref in the event where the object verifies the model. Values lower than PR_ref are associated with an object which does not fully verify or does not at all verify the model as a function of a theoretical or empirical rule.

In the event where the Pinhole Ratio deviates from the aforesaid value, different parameters are applied to the associated reconstruction algorithm.

It is also possible to use another model and therefore an algorithm other than the initial algorithm, for example by considering additional measurements, which can initially require remeasuring the object with different parameters or light distributions.

It is also possible to change algorithm and add an a priori to the object to be reconstructed, for example an a priori of regularity as often found in reconstruction algorithms (standard H^1, sparsity 1^1, 1^0, total variation, standards of higher order) to reduce the influence of objects outside the model present in the measured field.

Variability of Reconstruction Relative to the Measuring Noise

A step is described here which is prior to or simultaneous with the use of a reconstruction algorithm for a system whereof the measurements are noised with a noise statistic of Poisson noise type.

A property of the Poisson noise is the possibility of generating from realisation of a Poisson VAR of parameter I (average) two independent realisations of a Poisson VAR of parameter I/2, via processing a posteriori.

Because of a process for generation of random or pseudo-random numbers a binomial law X1 of parameters (n, p) is simulated where n is equal to the measurement of the initial Poisson variable, and p a separation parameter of photons equal to 0.5 in this case.

$$X \sim P \quad \text{(I)}$$

$X_1 \sim Bin(X,p)$ if $X>0, X_1=0$ otherwise $X_2 = X - X_1$

Mathematically, this property is a consequence of the formula of total probabilities and the entire decomposition in series of the exponential on R.

At the optical level, this property illustrates the known fact that if a separator mirror 50/50 is placed in front of the camera which images the fluorescence, and if a second camera for imaging the second fluorescence beam is placed, in identical imaging conditions the two cameras acquire an average signal equal to half of the initial signal and always following a Poisson law.

Analysis or reconstruction of both measurements generated in this way and called Split Photon method provides two independent results in terms of probabilities, and the differences between these two results illustrate dependence on the reconstruction algorithm relative to the measuring noise, even though the signal-to-noise ratio is lower in each measurement generated than in the original measurement of a factor sqrt(2).

A local comparison criterion of these two reconstructions is used, here the local similarity criterion or Local Structural Similarity Index Method (LSSIM), but any other local or overall criterion for comparison of images can be used.

Whenever this criterion is poor in terms of the criterion in question, i.e., there is a significant difference between the two reconstructed images or signals, different parameters in the reconstruction algorithm applied to the original measurements are applied.

It is also possible to use another algorithm, such as a MAP algorithm with overall or local regularity restriction, which uses the similarity map or any other comparison criterion to optimise the regularization parameter or the regularization parameters.

It is also possible to take into account the similarity map or the criterion used in the Split Photon method, graphically or digitally, to illustrate local or overall dependence of reconstruction on the measuring noise.

It is also possible to generate, rather than a couple of measurements, an n-tuple of measurements, by using rather than a binomial law a multinomial law of parameters (n, p1, p2 . . . pk) where the photon separation probabilities p1, p2 . . . pk can be different.

Finally, it is possible to iterate the Split Photon method by generating several couples or n-tuples of measurements, still by processing a posteriori of measurements, but by modifying the grain in the pseudo-random generator. In the case of a random generator this produces couples or n-tuples of independent Poisson variables but the couples or n-tuples are not independent of each other. This can reduce false detections of variable zones or similar zones obtained with a single couple/n-tuple or a small number of couples/n-tuples.

Position Measuring Point by the PSIT Method

PSIT method can be used as a technique for measuring the position of a nanoemitter with high precision by using a different measuring mechanism and complementary to the method of the centroid.

Consider a nanoemitter positioned at the position x, y in Cartesian coordinates and p, θ in polar coordinates. A sequence of illumination consisting of a fundamental wave, and a couple of the so-called "half-moon" distributions aligned along orthogonal axes is projected onto the nanoemitter.

The pre-processing procedure created two images:

A "top hat" image consisting of the sum of the three images of the sequence and a vortex image consisting of the sum of the two half-moon images.

A first descriptor is the Cartesian position is calculated using the algorithm of the centroid of the image "top hat".

Referring to FIG. 10, the radial position p can be measured unambiguously by measuring a parameter, $\rho_a$, equal to the arctangent normalized by a factor π, of the intensity ratio between the normalized intensity emitted by illuminated by the nanoemitter wave vortex, $I_v$, and the normalized intensity emitted by the nanoemitter illuminated by the fundamental wave, $I_F$. In fact:

the normalized intensity emitted by the nanoemitter illuminated by the fundamental wave varies from 1, at the centre of the fundamental wave, to 0, at radius of Airy, the normalized intensity, emitted by the nanoemitter illuminated by the vortex wave varies from 0 for the centre of the vortex to 1 at the vortex maximum and reach 0 to a value slightly higher than the radius of Airy. The arc tangent of the ratio is a monotonic function.

The azimuth position can be measured by measuring the intensity ratio between the total intensity emitted by the nanoemitter illuminated by the first half-moon distribution, $I_H$, and the total intensity emitted by the nanoemitter illuminated by the second half moon distribution, $I_{ve}$. The ratio between these two intensities is a geometric tangent square law:

$$\frac{I_{VE}}{I_V} = \tan^2 \vartheta \quad \text{(EQ. 12)}$$

Both measures are redundant. This redundancy is a measure to qualify the observed object as a single point and separate it from other objects potentially present in the sample.

Direct application of the use of the PSIT method according to an embodiment of the invention for measuring the position of a nanoemitter with high precision is the integration of this measuring technique into a novel technique for local stochastic optical reconstruction. One of the limits of the applicativity of stochastic techniques is the measuring process, needing a large number of images and therefore long measuring time and strong phototoxicity. Use of the PSIT technique according to at least one embodiment of the invention, which measures the position of a light emitter, at a resolution well above the Airy disk, at rates from micro or nanoseconds enables extension of stochastic techniques to many novel applications.

The images resulting from use of the PSIT method can also be processed using the generalised Hough method, for recognising structured objects, line, circle or other, in an image.

Recognition and Measurement of Two Points: A New Resolution Criterion

Consider now two nanoemitters of the same intensity positioned symmetrically about the centre at positions, $\rho$, $\theta$ and $\rho$, $-\theta$ in polar coordinates. We will use the system described in the previous paragraphs. Three descriptors give the following results:

The centroid measure the centroid of the light distribution, which will be the origin, The identifier $\rho$, measure the value of the common radial value of the two nanoemitters, The $\theta$ descriptor, which in the case of half-moons contains a degeneracy between $\theta$ and $-\theta$, will measure the value $\theta$.

As mentioned above, if the value of the descriptor $\rho$ is not zero, we know that the case study is not a point but two or more. In addition, descriptors $\rho$ and $\theta$ allow us to measure the characteristics of the two points at a much higher resolution than that defined by the Rayleigh criterion. Moreover, using a compound process it is possible to separate this case from the vast majority of cases of three or more points. An additional light distribution can be projected on the sample, a half-moon inclined at an angle $\theta$; the assumption of the presence of two points will be confirmed or refuted based on the results of this image. Indeed, the measured energy will be zero for two points, for a line or for a series of dots aligned in the direction of the angle $\theta$.

Measuring is not limited a priori. Of course, there is at first a practical resolution limit, linked to the quality of the signal, fluctuations and various imperfections. If practical limits are neglected, the resolution limit is associated with the number of photons detected.

In practice, the resolution of a system using PSIT and/or PDOS techniques therefore depends on the sample observed. For a sample sparsely marked (i.e., such that the fluorescent markers are positioned on non-dense structures of wall, membrane, filament, specific source type), the resolution obtained can exceed substantially the factor 2 (locally or even overall).

Dark Tracking

Conical diffraction could apply a whole family of super-resolution or superlocation techniques, the location of a single molecule. Reference is now made to FIG. 8 which schematically illustrates an original technique known as "Dark Tracking".

In reference to FIG. 8, 80 represents the initialisation phase, i.e., detection of the emitter using a confocal scanner or any other known optical method. 81 represents the positioning phase of the beam vortex on the emitter; 82 represents the case where the emitter moves relative to the centre of the vortex and is excited by a fraction of the beam creating fluorescence which can be detected; 83 represents the repositioning of the emitter at the centre of the beam vortex such that no fluorescence is created and detected (recorded position Xi,Yi) and 84 corresponds to a retroaction loop in which an independent location system repositions the element followed by a corrected position.

The light distributions used by this technique are vortices generated by conical diffraction. However this technique can utilise other vortices or other distributions generated by conical diffraction. It is supped that the molecule of interest has been marked by one or more fluorophores which can be excited at $\lambda$. The position of the molecule is first detected by a classic confocal image at $\lambda$. The position of the scanner is then adjusted to stimulate the sample such that the centre of the vortex coincides exactly with the position of the emitter. The fluorescence signal is detected by a highly sensitive camera (ex. EMCCD or sCMOS), or PMT, enabling detection of the signal of low amplitude of the emitter by way of considerable quantic efficacy. The location process is based on the absence of fluorescent signal when the emitter is exactly at the centre of the vortex. The fact that the intensity gradient is considerable near the centre of the vortex allows precise location of the emitter. If the emitter moves slightly the intensity it absorbs will no longer be zero, and it will emit a fluorescence signal whereof the position and intensity are deduced from the image. A retroaction loop recentres the vortex on the emitter and saves the position of the emitter. The retroaction loop can be executed at the speed of execution of the camera (up to 1 kHz) or the detector (several MHz), which tracks a molecule in real time and over an ensuing period of time. Since the aim is to always minimise signals emitted in fluorescence by minimising the signal exciting the emitter, the location can be led over a long time period, with bleaching being less likely to occur with such small doses of light. The precision of the location depends largely on the signal to noise ratio of the image, consequently the background noise (noise of the camera and self-fluorescence signal) must be considered. Suppose now that the sample is marked by two different fluorophores which can be excited at two different wavelengths, $\lambda_1$ and $\lambda_2$. Two beams with different topologies which depend on their wavelength are propagated together. The first ($\lambda_1$) has a classic Gaussian form and produces an overall confocal image of the sample. The second ($\lambda_2$) is a vortex beam used for Dark Tracking. By controlling the galvo mirror which scans the sample dark tracking can be performed each time a line for the image camera is scanned such that the position of the emitter is followed by a frequency much higher than the number of images per second. The main advantages of this technique, compared to another technique for tracking a single molecule, are the use of a single scan system and the power sent to the tracked molecules is extremely low. In practice, the use, alignment and shaping of these two beams is not a trivial task if conventional techniques for beam shaping are used, such as holograms generated by computers, spatial modulators or spiral wave plates, principally due to their inherent chromaticity. Conical diffraction can be used to simplify assembly. By using adapted optics a crystal can be adapted to generate a vortex with one wavelength and a Gaussian beam with another wavelength following the same optical path. This uses a simple optical path starting out from a fiber which resolves many practical problems. Dark tracking technology can be easily used to study a number of biological questions in which conventional tracking techniques of the position of a particle are penalised by bleaching of the particles.

Dark tracking has been described hereinabove in the case of use of a vortex. However, many variants using one or more distributions, for example but not limited to halfmoons or Stokes vectors, or any distribution having zero intensity and a gradient—if possible the strongest possible— as a function of one of the spatial dimensions, can carry out Dark Tracking and are considered part of this invention. The capacities of conical diffraction for creating many different light distributions make it a tool of choice for performing Dark Tracking.

Reference is now made to FIG. 6b which is a simplified schematic illustration of a modified LatSRCS optical module, achromatic or not, 700, according to an embodiment of the present invention. This module differs from the implementation of a LatSRCS optical module, 700, described previously and shown in FIG. 6a by the addition of several elements before the module:

lasers 79a, 79b and 79c optionally at different wavelengths, fiber optics 78a, 78b and 78c coming from lasers 79a, 79b and 79c, optionally, polarization control sub-modules 77a, 77b and 77c for statically or dynamically modifying polarization of the lasers 79a, 79b and 79c, the polarization control sub-modules able to be positioned before or after the fiber; however, in some implementations, for example using PM fibers, "polarization maintaining", the polarization control sub-modules 77a, 77b and 77c may not be necessary and polarization of the light coming from the fiber is determined by the relative position of the laser and the fiber, a laser combiner, 76a combining two or more source lasers optionally via fiber optic, 78a, 78b and 78c into a common output fiber 76b, an optical element 75 for transforming light coming from the fiber into collimated light which can be used by the rest of the LatSRCS module, 700, similarly to that described previously.

Many variations of this device, known to those skilled in the art, can be added to this scheme and are claimed in this invention: for example, the two optical elements 31 and 75 can be integrated into a single element, or even removed if the output parameters of the common fiber are adequate. Similarly, the common fiber, 76b, may not be necessary for some implementations.

In addition, the introduction, via a common fiber optic or directly by light spreading in space of two or more wavelengths having different polarizations produces a method and/or a device capable of performing RESOLFT or STED techniques in all their different modalities. In this method and/or device the excitation and depletion waves spread along a common path and the LatSRCS module 700 can be totally achromatic, or not in a simplified version, such as described previously.

In the simplest variant of this method, the excitation and depletion waves spread along two linear orthogonal polarizations and a quarter wave plate—optionally achromatic— is positioned at the entry of the system to transform these polarizations into circular orthogonal polarizations to obtain a fundamental wave for one and a vortex for the other.

In a novel variant of this method, the method integrative with unique polarization, described in detail later, the fiber is a birefringent fiber and creates a path difference greater than the coherence length of the depletion laser, creating incoherent superposition of the two orthogonal polarizations. Another solution is the use of a polarization submodule (not shown), for example comprising a thick uniaxial crystal with strong birefringence. Also, in the integrative method at the same polarization a polarization sub-module, (not shown), for control of intensity ratio can be used. This polarization sub-module for control of intensity ratio is different to the previous polarization submodule, but can potentially be integrated with it. It can potentially also be integrated into the laser combiner, 76a, positioned between the laser and the fiber optic. This polarization sub-module for control of intensity ratio can be used to control the intensity ratio between the two polarizations, and therefore, as will be described later, the intensity ratio between the 2D depletion beam (vortex) and the 3D depletion beam (black sphere). Reference is now made again to FIG. 6b. The polarization control sub-modules 77a, 77b and 77c, can be activated to create simultaneously sequences of light distributions, identical or different, for the excitation path and the depletion path. Also, the intensity of lasers can be modulated, creating a complex chronogram of the intensity of each laser, the sequence of excitation light distributions and the sequence of light depletion distributions.

In the preferred implementation, using a confocal microscope and an original or modified LatSRCS module, achromatic or not, the following are projected sequentially:

In first place an Airy distribution or an excitation fundamental simultaneously with a depletion vortex. The resulting emission image will be called the positive image.

In a second step, an excitation vortex, simultaneously with a depletion vortex. The resulting emission image will be called the negative image.

In a variant of the first step only one Airy distribution or one excitation fundamental is projected.

The image difference, consisting of weighted subtraction of these two images. However, this image difference can be digital processing more evolved than simple arithmetic difference and can incorporate a set of mathematical processing known to those skilled in the art for optimising the image resulting as a function, for example but non-limited, of the frequential content of the two images. If good parameters are selected, this image difference will have a size—in PSF terms—finer than a classic STED, needing only weaker depletion intensity. In fact, the aim of depletion of the vortex will no longer be to reduce the size of an Airy patch, requiring substantial energy, as in the classic STED or RESOLFT, but to reduce the surplus energy present in the excitation vortex relative to the Airy distribution or the fundamental. Also, depletion of the Airy or the fundamental will be associated with subtraction of the negative image created by the excitation vortex, equivalent to mathematical subtraction of two illuminations. The resulting reduction in size of the PSF will be the conjugation of these two effects.

Also, in some cases this embodiment can dispense with the need to trigger excitation as necessary in the "Gated STED". In fact, photons arriving before complete application of depletion can be considered by adequate choice of parameters without needing the addition of a complex and restricting system. Finally, the need to modulated STED, "ModSted" can also be avoided as the emission photons emitted by the depletion vortex hardly differ from those emitted by the excitation vortex and can also be compensated.

In a second embodiment, using a confocal microscope and an original or modified LatSRCS module a sequence of excitation beams, a sequence of depletion beams are projected simultaneously, the two sequences of beams able to differ by their polarization, creating light distributions of different topologies. This device produces a sequence of light distributions of sizes less than those which would have been obtained without the depletion beam. The SRCDA algorithm will be used in this implementation to determine the spatial distribution or the position of specific emitters. This embodiment, combining depletion and optics could allow an adequate compromise between the intensity of the projected depletion beam and the gain in resolution.

In another embodiment, using a confocal microscope and an original or modified LatSRCS module an excitation beam, in the form of an Airy and a depletion beam in the form of a vortex are projected simultaneously, the two beams differing by their polarization. Without dynamic elements this device creates a fully achromatic STED device.

Use of Distribution of Helicoidal Symmetry for the 3D STED

The solution implemented in STED or STED-3D systems uses optical distribution of zero intensity at the central point and remains zero along the axis, over a certain distance. Use for the STED-3D is proposed here of distribution having a position of zero intensity, this position of zero intensity having a helicoidal spatial variation as a function of the axial parameter. The preferred implementation of this distribution is use of conical diffraction by using optical distributions as referenced under the name of Stokes distribution. These distributions could be performed, in particular though not exclusively, by using techniques based on the devices cited earlier, including but not exclusively the SLM (Spatial Light Modulator) and segmented mirrors which produce distributions of phase and/or amplitude in the pupil. The use of distribution of helicoidal topology to create distribution containing zero intensity having helicoidal movement is said to form part of this invention. In particular implementation of these distributions by means of conical diffraction is one of the preferred implementations of this invention, but the implementations of these distributions by means of a SLM or a segmented mirror to create distributions of phase or amplitude in the pupil are also considered as one of the implementations described in this invention.

In a novel variant of this method, the integrative method of two polarizations, the parameters of the crystal are selected such that the fundamental wave creates a black sphere and the wave vortex creates a vortex. In these conditions, the two distributions, polarized orthogonally do not interfere and, with a single input beam, an incoherent superposition of both beams independently creates the two beams necessary for the STED 3D, the vortex and the black sphere. The possibility of creating the two beams by means of a single depletion input beam considerably simplifies the optical system. Also, as this system has a common path, it can be executed simply. A polarization sub-module (not shown), static or dynamic, positioned between the optic fiber and the crystal can be used to control the intensity ratio between the two polarizations and therefore the intensity ratio between the 2D depletion beam (vortex) and the 3D depletion beam (black sphere).

In a novel variant of this method and such as described previously, the integrative method of single polarization, a birefringent fiber—or a polarization sub-module—earlier created a path difference greater than the length of coherence of the depletion laser, for a CW laser, and/or the time of the drawing, for a drawn laser or for the gated STED, creating incoherent superposition of both orthogonal polarizations. In these conditions, the two distributions do not interfere; as the two distributions are orthogonal polarizations they will create on the same polarization, one a fundamental—which by choice of parameters of the crystal and of the optical system will be a black sphere, and the other a vortex. These two beams, derived from two incoherent distributions, as described earlier, do not interfere; with a single input beam, before the fiber, this device independently creates the two beams necessary for the STED 3D, the vortex and the black sphere. The possibility of creating the two beams by means of a single depletion input beam considerably simplifies the optical system. Also, as this system has a common path it can be executed simply. The differentiation between these two variants is in the output polarization of the two distributions, the black sphere and the vortex, which are orthogonal in the integrative method having two polarizations and identical to the integrative method having single polarization, each of the two variants having advantages for certain configurations.

In a novel variant of this method, using the conical diffraction compatible with all devices described previously, and potentially complementary to the two integrative methods, having two polarizations and single polarization, the element of conical diffraction is replaced by a sub-module consisting of two crystals of conical diffractions, of substantially equal value of the parameter of conical diffraction, separated by a polarization sub-module. The polarization sub-module is selected such that at the depletion wavelength, the polarization sub-module has no effect, and the action of the crystals is added, creating the vortex and/or the black sphere. At the excitation length the polarization sub-module creates rotation of the polarization by 90° or 180°, the effect of the two crystals is subtracted, and the transmitted beam is identical to the incident beam. This device prevents creating distributions which are too "exotic" on the excitation beam. In some devices the crystals could have different values of the parameter of conical diffraction to also create an effect on the excitation beam, but with a value of the parameter of conical diffraction different to that of the depletion beam. This variant can achieved at several depletion and excitation wavelengths by using the resources of polarization modules well known to those skilled in the art.

In a novel variant of this method, using conical diffraction compatible with all devices described previously, and potentially complementary to the two integrative methods having two polarizations and single polarization, and compatible also with the preceding implementation with reasonable modifications, the element of conical diffraction is replaced by a cascade of crystals having different spectral properties such as the LBO and the KTP (KTA) so as to enable realisation of a black sphere having several depletion wavelengths. In effect, the dispersion of the parameter characteristic of the effect of conical diffraction, $\rho_0$, fails to achieve some distributions having several wavelengths, in particular the black sphere, the form of which depends greatly on this parameter. The compensation of the dispersion of the characteristic parameter of the effect of conical diffraction, $\rho_0$, therefore enables realisation of a 3D STED of common optical path, having two or more wavelengths. Further still, the compensation of the dispersion of the characteristic parameter of the effect of conical diffraction, $\rho_0$, can be achieved over a wide range of wavelengths either as described previously by a combination of crystals, or by spectrally correcting the optical system to the second order, i.e. by creating a digital opening dependent on the wavelength to either compensate the dispersion of the parameter characteristic of the effect of conical diffraction, $\rho_0$, or correct compensation of the dispersion of the parameter characteristic of the effect of conical diffraction, $\rho_0$, created by a combination of crystals described previously.

In another embodiment, using a confocal microscope, an original or modified LatSRCS module and a LongSRCS module a sequence of excitation beams, a sequence of depletion beams are projected simultaneously, the two sequences of beams able to differ by their polarization, creating light distributions of different topologies. The LatSRCS module produces a sequence of light distributions of sizes less than those which would have been obtained without the depletion beam. The LongSRCS module implements the PDOS method so as to separate collimated light on different detectors, emerging from nanoemitters positioned on the focal plane of the objective lens, the non-collimated light emerging from nanoemitters located on the near side of or beyond the focal plane. The PDOS method in this implementation acquires essentially longitudinal information, i.e., the longitudinal position of each of the nanoemitters, complementary to lateral information obtained by means of the original or modified LatSRCS module.

The SRCDA algorithm will be used in this implementation to determine the spatial distribution or the position of specific emitters.

In another embodiment using one of the implementations described earlier and using a biaxial crystal to create the beam shaping, a dynamic polarization element is used before or after the biaxial crystal to correct the dynamic movement of the pupil which in some cases can be created during optical scanning of the confocal microscope. This effect of movement of the pupil is in some implementations of STED technologies one of the performance limits, without needing an additional scanning system. [35]

In another embodiment using a confocal microscope, two or more light distributions locale at different wavelengths are projected by means of an original or modified LatSRCS module. The first light distribution makes the scene sparse, i.e., isolates emitters by means of a physical effect, which dilutes the density of emitters capable of emitting fluorescence so as to create regions in which the sparsity hypothesis is valid, i.e., the presence of an isolated emitter or a small number of emitters. The physical effects which will produce this sparsity will be the same or will be derived effects, effects utilised to create sparsity for location microscopy techniques of single emitters. These techniques comprise for example PALM STORM, DSTORM, FPALM techniques and others. The second light distribution at another wavelength will produce fluorescence whereof the intensity will vary over time. This second light distribution will use one of the PSIT techniques, either a sequence of discrete distributions or a sequence of continuous distributions. In the case of discrete distributions, light will be detected either by a matrix detector or by a single detector. In the case of continuous distribution, even though it is also possible to use a matrix detector, the most probable implementation will be the use of a single detector; in this case the lateral information on position xy and potentially the longitudinal distribution information z could be obtained by ratios of intensity. One of the most interesting cases is the case of harmonic distributions over time in which electro-optical cells are actuated by sinusoidal voltage. In this case the position xy can be rediscovered by means of measurement of the temporal harmonics of the signal measured by the detector, which can be a single detector indirectly containing the information of lateral position.

Two crystals mounted in cascade (following each other) create an addition effect of effects of crystals (if oriented in the same direction), as described in Reference 46, or subtraction (if oriented at 180°). Adding a rotator between the two crystals, turning the polarization plane by 180°, reverses this effect creating a subtraction effect in place of addition. In the case of a system having two identical crystals, using the addition effect of effects of crystals can have two crystals whereof the effects are added. Using a chromatic rotator which turns at different angles, ideally at angles being different multiples of 180°, at different wavelengths, can have a module in which the effects of two crystals are cancelled out at a wavelength and are added to the other wavelength. The rotator in question can be a single crystal (ex: quartz) whereof the thickness is optimised as a function of the rotatory powers of the crystal at two wavelengths of optimisation to obtain a difference in rotation of 180° between the two beams. In the case of a system having two conical crystals two biaxial crystals of different material can be used; if subtraction of the effects of crystals is used and if these effects depend on the wavelength differently for the two crystals, the module can be optimised to have two crystals whereof the effects are cancelled out at one wavelength and are not cancelled out at another wavelength. This process of systems having N crystals whereof the effects are compensated or added can be generalised to optimise the parameter $\rho_0$ for N wavelength.

The energy ratio in the 3D STED created by a conical crystal is fixed, the energy of the vortex being borne by (circular) polarization and the energy of the black sphere being borne by the other polarization. Use of a dichroic element—in the first dichroic direction or an element selectively absorbing the polarizations—modifies this ratio. This element can be either a circular dichroic element or a linear dichroic element needing the addition of a polarization element before and optionally after the dichroic. Dichroic elements representative but non-limiting are Brewster plates or some dichroic glasses comprising elongated metallic nanoparticles oriented homogeneously, enclosed in superficial layers of glass.

Many other implementations of this general method will be clear to those skilled in the art, for example:

Some of the distributions created by the LatSRCS module, 700, are superoscillations. In FIG. 7b, the cases in FIGS. $7b_{00}$ and $7b_{11}$ are superoscillations. It consists of a naturally small spot enclosed by a wide and intense ring. As it projects a depletion ring onto this superoscillation, it will be possible to prevent, at an energetically low cost, fluorophores contained in the ring from emitting and the size of the spot will be the size of the central spot of the superoscillation The creation successively or simultaneously of two—or more—depletion light distributions can advantageously replace the depletion vortex in all RELSOFT or STED modalities. One of the possible effects is improvement in the form of the depletion light distribution given the vectorial effects. It is also possible to create a number bigger than 2 of distributions called "half-moons" to explore different states of polarization.

Alternative Implementations

The embodiments of the invention described can be integrated on a fluorescence confocal microscope. Superresolution system according to embodiments of the invention is a new method of measurement, in addition to or in replacement of existing methods of microscopy. However, the superresolution system according to embodiments of the invention may equally be integrated on other microscopy platforms. These microscopy platforms, as described as examples, include but are not limited to: wide field microscopes, dark field microscopes, polarization microscopes, phase difference microscopes, differential interference contrast microscopes, stereo microscopes, Raman microscopes, microscopes dedicated to a specific task, such as live cell imaging, cell sorting, cell motility or any other instrument optical microscopy.

In another embodiment the microscope platform which has been described is coupled to an electronic microscopy system (CLEM—Correlative Light Electron Microscopy), or any other similar system such as TEM (Transmission Electron Microscopy), or EBM (Electron Beam Microscopy), or SEM (Scanning Electron Microscopy).

In another embodiment of the invention, the microscope platform is a complete SRCDP platform, and comprises a LongSRCS module, implementing the PDOS method and using the SRCDA algorithm.

In another embodiment of the invention, the microscope platform is a partial SRCDP platform, and uses the SRCDA algorithm.

In another embodiment of the invention, the microscope platform is a partial SRCDP platform, and uses the control module.

In another embodiment of the invention, the microscope platform also comprises a LongSRCS module, implementing the PDOS method.

As to a further discussion of the manner of usage and operation of the invention, it should be apparent from the above description. Therefore, any discussion on the form of the use and operation will not be described.

In this respect, before explaining at least one embodiment of the invention in detail, it is understood that the invention is not limited in its application to the details of construction and arrangements of the components set forth in the following description or illustrated in the drawing. The invention is capable of other embodiments and can be practiced and carried out in various ways. In addition, it is understood that the phraseology and terminology employed herein are for the purpose of description and should not be regarded as limiting.

References cited herein teach many principles that are applicable to the present invention. Therefore, the entire contents of these publications are incorporated herein by reference, as appropriate to the teachings of additional or alternative details, features and/or technical information.

The advantageous use of fiber optics is transmission of the fundamental mode, $TEM_{00}$ mode and only it. However, some configurations of fiber optics, mainly, though not exclusively based on fibers called "Photonic Crystal Fiber" enables transmission simultaneous or not of more complex modes, including vortex modes. It would therefore be possible to deport the optical distributions created by conical refraction by means of fiber optics, enabling major simplification of the optical system.

Also, some fibers "dual-core photonic crystal fibers", [16], allow interaction between two modes, one of them being a vortex, and provide an additional physical mechanism to create diversified transfer functions.

Many superresolution techniques are based on measuring point sources of a size less than a wavelength fraction. The superresolution techniques according to embodiments described enable measuring of point sources, but also of structured objects, for example and mainly segments of lines, circles or even continuous objects. In Biology, this extension will allow measuring of major biological entities such as filaments, neurones and some microtubules.

Even though the descriptions of embodiments, to simplify comprehension of the invention, present applications in Microscopy, more specifically in Biology, and even more specifically in Fluorescence Biology, applications can be extended to general applications of Microscopy and to the whole field of Vision, including artificial Vision.

Embodiments of the invention can be applied, by selecting a different optical system, to many medical applications, for example but without being limited, to ophthalmologic observation. This field of application corresponds to the measuring of biological or medical objects of micronic resolution, the resolution being between 1 and 10 µm.

Also, embodiments of the invention can be applied, as explained later, via fiber optics. This allows many additional applications, for example but without being limited, to gastric or gastroenterological observation, and to observation of the colon and urinary tracts.

It is understood that the invention is not limited in its application to the details stated in the description contained here or illustrated in the diagrams. The invention is capable of other embodiments and being practised and carried out in various ways. Those skilled in the art will easily understand that various modifications and changes can be applied to the embodiments of the invention such as described previously without departing from its field of application, defined in and by the appended claims.

REFERENCES

1. L. Schermelleh, R. Heintzmann, and H. Leonhardt, "A guide to super-resolution fluorescence microscopy," The Journal of cell biology 190, 165-175 (2010).
2. M. V. Berry, "Conical diffraction asymptotics: fine structure of Poggendorff rings and axial spike," Journal of Optics A-Pure and Applied Optics 6, 289-300 (2004).
3. http://en.wikipedia.org/wiki/Superresolution
4. J. F. Nye and M. V. Berry, "Dislocations in Wave Trains," Proceedings of the Royal Society of London. Series A, Mathematical and Physical Sciences (1934-1990) 336, 165-190 (1974).
5. S. W. Hell and J. Wichmann, "Breaking the diffraction resolution limit by stimulated emission: stimulated-emission-depletion fluorescence microscopy," Optics letters 19, 780-782 (1994).
6. W. R. Hamilton, "Third Supplement to an Essay on the Theory of Systems of Rays," Trans. Royal Irish. Acad., pp 1-144 (1833).
7. H. Llyold, "On the Phenomena presented by Light in its Passage along the Axes of Biaxial Crystals," The London and Edinburgh Philosophical Magazine and Journal of Science ii, 112-120 (1833).
8. C. Phelan, D. O'Dwyer, Y. Rakovich, J. Donegan, and J. Lunney, "Conical diffraction and Bessel beam formation with a high optical quality biaxial crystal," J. Opt. A, Pure Appl. Opt 7, 685-690 (2009).
9. M. Berry and M. Jeffrey, "Conical diffraction: Hamilton's diabolical point at the heart of crystal optics," Progress in Optics 50, 13 (2007).
10. A. Geivandov, I. Kasianova, E. Kharatiyan, A. Lazarev, P. Lazarev, and S. Palto, "Printable Thin Birefringent Film Retarders for LCD."
11. B. Acharya, et al., "The elusive thermotropic biaxial nematic phase in rigid bent-core molecules," Pramana 61, 231-237 (2003).
12. D. H. Goldstein and E. Collett, *Polarized light* (CRC, 2003), Vol. 83.
13. J. B. Pawley, *Handbook of biological confocal microscopy* (Springer Verlag, 2006).
14. M. Bass, *Handbook of optics* (McGraw-Hill, 2001).
15. M. Minsky, "Microscopy Apparatus," U.S. Pat. No. 3,013,467 (1961).

16. P. Li, J. Zhao, S. Liu, X. Gan, T. Peng, and X. Jiao, "Dynamic behaviors of optical vortices in dual-core photonic crystal fibers," Optics Communications (2012).
17. Stefan Hell and Jan Wichmann "Process and device for optically measuring a point on a sample with high local resolution", U.S. Pat. No. 5,731,588 A,
18. Vicidomini G, Schönle A, Ta H, Han K Y, Moneron G, et al. (2013) STED Nanoscopy with Time-Gated Detection: Theoretical and Experimental Aspects. PLoS ONE 8(1)
19. Katrin I. Willig, Lars Kastrup, U. Valentin Nagerl, Stefan W. Hell: "STED Microscopy: Different Approaches and Applications"
20. Angus John BAIN and Richard John MARSH «Improvements relating to fluorescence microscopy", WO 2013008033 A1, Application number PCT/GB2012/051680, Filing date Jul. 13, 2012
21. Christian Eggeling et al. "Sted microscopy with pulsed excitation, continuous stimulation, and gated registration of spontaneously emitted fluorescence light", application WO 2012069076 A1, Application PCT/EP2010/067956, Nov. 22, 2010
22. Emiliano Ronzitti et al.: "Frequency dependent detection in a STED microscope using modulated excitation light", Optics Express, Vol. 21, Issue 1, pp. 210-219 (2013)
23. D. Wildanger et al. "A STED microscope aligned by design", Opt. Exp. 17, 16100-16110 (2009).
24. N. Bokor et al. "Compact fluorescence depletion microscope system using an integrated optical element", Opt. Comm. 281, 1850 (2008).
25. Juergen Hoeffman, "Apparatus for illuminating a specimen and confocal fluorescence scanning microscope", U.S. Pat. No. 6,555,826 and "Scanning microscope with a detector and light source for exciting an energy state in a specimen and module for a scanning microscope", U.S. Pat. No. 6,958,470
26. R. Menon, P. Rogge, and H.-Y. Tsai, "Design of diffractive lenses that generate optical nulls without phase singularities" J. Opt. Soc. Am. A 26(2), 297-304 (2009).
27. M. Reuss et al. "Birefringent device converts a standard scanning microscope into a STED microscope that also maps molecular orientation", Opt. Exp. 18, 1049-1058 (2010)
28. http://www abberior.com/products/productlist/cat/optical-components/prod/easydonut—phaseplate/29.
29. Y. Zhang, "Generation of three-dimensional dark spots with a perfect light shell with a radially polarized Laguerre-Gaussian beam," Applied optics 49, 6217-6223 (2010).
30. J. Besag, "Towards Bayesian Image Analysis". Journal of Applied Statistics, vol. 16, pp. 395-407, 1989.
31. C. Louchet, L. Moisan, "Total Variation denoising using posterior expectation". *Proceedings of the European Signal Processing Conference* (Eusipco), 2008.
32. C. Louchet, L. Moisan, "Posterior Expectation of the Total Variation model: Properties and Experiments". *SIAM Journal on Imaging Sciences*, vol. 6, n. 4, pp. 2640-2684, 2013.
33. L. Tierney, "Markov Chains for exploring posterior distributions". *The Annals of Statistics*, vol. 22, n. 4, pp. 1701-1728, 1994.
34. W. K. Hastings, "Monte Carlo Sampling Methods Using Markov Chains and Their Applications". *Biometrika, vol. 57, n. 1*, pp. 97-109, 1970.
35. Johann Engelhardt, "Method and device for dynamically shifting a light beam relative to an optic which focuses the light beam", application PCT WO2010069987 A1.
36. Three-Dimensional Nanoscopy of Colloidal Crystals, Benjamin Harke, Chaitanya K. Ullal, Jan Keller, and Stefan W. Hell, Nano Letters 2008 8 (5), 1309-1313
37. French patent No 10/04067, issued May 3, 2013, granted to Bioaxial
38. Scientific Background on the Nobel Prize in Chemistry 2014, publication of the Royal Swedish Academy of Science, Nobel Foundation, 8 Oct. 2014
39. C. Louchet, L. Moisan. Total Variation denoising using iterated conditional expectation, proceedings of the European Signal Processing Conference (Eusipco), 2014.
40. C. Sheppard, S. Mehta, R. Heintzmann. Superresolution by image scanning microscopy using pixel reassignment, Optics Letters, 38(15):2889-2892, 2013.
41. C. Müller, J. Enderlein. Image Scanning Microscopy, Physical Review Letters, 104: 198101, 2010.
42. D. L. Donoho. Superresolution via sparsity constraints, SIAM J. Math. Anal., 23(5): 1309-1331, 1992.
43. E. J. Candès and C. Fernandez-Granda. Towards a mathematical theory of super-resolution, Commun. Pure Appl. Math., 67(6):906-956, 2014.
44. L. Demanet, N. Nguyen. The recoverability limit for superresolution via sparsity, preprint, 2014.
45. Gould et al.: "Adaptive optics enables 3D STED microscopy in aberrating specimens", Opt Express. 2012, 20(19): 20998-21009.
46. Sirat, WO2008/047245, 24 Apr. 2008.

What is claimed is:

1. An optical measuring process for determining information selected from the group consisting of a spatial distribution and a location of at least one re-emitting source disposed on a sample, wherein re-emission by each of the at least one re-emitting source is determined by a law relating reemission of light as a function of light projected onto the sample, the optical measuring process comprising:
   projecting light onto the sample by means of a projection module, the light characterized by a wavelength aligned to an excitation wavelength of each re-emitting source, so as to produce a sequence of compact light distributions of mutually distinct topology;
   detecting light re-emitted by said at least one re-emitting source disposed on the sample for each of the compact light distributions of mutually distinct topology and for any scanning points of the sample;
   acquiring, from the detected re-emitted light, for each scanning point, a set of images, the set having at least one member, each image of the set corresponding to one of the compact light distributions of mutually distinct topologies;
   reconstructing properties of the sample from the set of images, the properties selected from the group consisting of the sample itself, its spatial properties, its temporal properties, its spectral properties, and combinations thereof, based upon a reverse Bayesian problem leading to definition of a distribution a posteriori, by way of Bayes law;
   a posteriori combining a probabilistic formulation of a noise model, and any a priori on a light distribution created in the sample by projection;
   applying a MAP algorithm; and
   representing results, based on the MAP algorithm, in a form selected from the group consisting of an image, digital data, graphic data, and combinations thereof.

2. The optical measuring process according to claim 1, further comprising scanning the sample optically.

3. The optical measuring process according to claim 1, wherein the MAP algorithm includes regularization with positivity constraint.

4. The optical measuring process according to claim 1, wherein the MAP algorithm also contains a frequency band limitation restriction.

5. The optical measuring process according to claim 1, wherein the MAP algorithm includes an accelerated digital diagram of Nesterov type.

6. The optical measuring process according to claim 1, wherein the sequence of images employs a redundancy in frequency information due to different frequency characteristics of different distributions projected onto the sample, for compensating any impact of missing points or scanning irregularities.

7. The optical measuring process in accordance with claim 1, wherein the MAP algorithm is adapted to resolve an inverse problem relating to a sum of terms.

8. The optical measuring process in accordance with claim 7, wherein the sum of terms includes at least one of a low-frequency component and a sparse component that is sparser than the low-frequency component.

9. The optical measuring process in accordance with claim 1, wherein the MAP algorithm is adapted to impose a non-local redundancy restriction on a solution thereof.

10. The optical measuring process in accordance with claim 9, wherein imposition of the non-redundancy restriction includes calculating weights on images or on different digital masks and applying a non-local tree of similarities to the solution as regularization.

11. The optical measuring process of claim 1, further comprising using a mask of variable size in a detection plane to obtain images having either different axial characteristics, or different or optimized rejection capacities of parasite light, overall or locally.

12. The optical measuring process according to claim 1, wherein detecting light includes using a detector module selected from the group consisting of camera, a set of photon counting modules, and combinations thereof.

13. An optical measuring device for determining information selected from the group consisting of a spatial distribution, a location of a set of re-emitting sources disposed on a sample, and combinations thereof, the device comprising:
- a first light source, whereof a wavelength is aligned to an excitation wavelength of said re-emitting source, the first light source adapted to project a compact excitation distribution;
- a second light source characterized by a wavelength aligned to a wavelength, of said set of re-emitting sources, the wavelength selected from the group consisting of a depletion wavelength and an activation wavelength, the second light source adapted to project a sequence of compact light distributions of mutually distinct topology;
- a scanning module for scanning the sample optically;
- a detector module for detecting light re-emitted by said set of re-emitting sources;
- an image acquisition module for acquiring, from the detected re-emitted light, for each scanning point, a set of images, the set having at least one member, each image of the set corresponding to one of the compact light distributions of mutually distinct topologies; and
- a processor configured to execute an algorithm to reconstruct properties of the sample from the set of images, the properties selected from the group consisting of the sample itself its spatial properties, its temporal properties, its spectral properties, and combinations thereof, based on a reverse Bayesian problem leading to definition of a distribution a posteriori, by way of Bayes law, and a posteriori combining a probabilistic formulation of a noise model, as well as any a priori on a light distribution created in the sample by projection.

14. The optical measuring device according to claim 13, wherein the detector module is selected from the group consisting of camera, a set of photon counting modules, and combinations thereof.

15. An optical measuring device for determining information selected from the group consisting of a spatial distribution and a location of a set of re-emitting sources on a sample, the sample comprising at least one re-emitting source, excited by light projected on the sample and re-emitting light according to a law determined as a function of the projected light, the device comprising:
- a projection module containing a laser, whereof the wavelength is aligned to an excitation wavelength of said set of re-emitting sources to create a sequence of the compact light distributions of different topology,
- a detection module for detecting the light re-emitted by said set of re-emitting sources on the sample for the or for each of the compact light distributions of different topology and for each of the scanning points of the sample;
- an image acquisition module for acquiring, from the detected re-emitted light, for each scanning point a set of images, the set having at least one member, each image corresponding to one of the compact light distributions of different topologies;
- an algorithm module configured to reconstruct properties of the sample from the set of images, the properties selected from the group consisting of the sample itself, its spatial properties, its temporal properties, its spectral properties, and combinations thereof, based on a reverse Bayesian problem leading to definition of a distribution a posteriori by way of Bayes law, and a posteriori combining the probabilistic formulation of a noise model, as well as any a priori on a light distribution created in the sample by projection,
- a MAP algorithm module configured to apply a MAP algorithm; and
- a representation module configured to represent results, based on the MAP algorithm, in a form selected from the group consisting of an image, digital data, graphic data, and combinations thereof.

16. The optical measuring device according to claim 15, wherein the detector module is selected from the group consisting of camera, a set of photon counting modules, and combinations thereof.

* * * * *